US007974448B2

(12) United States Patent
Shinzaki et al.

(10) Patent No.: US 7,974,448 B2
(45) Date of Patent: Jul. 5, 2011

(54) PERSONAL AUTHENTICATION SYSTEM USING BIOMETRICS INFORMATION

(75) Inventors: Takashi Shinzaki, Kawasaki (JP); Yusaku Fujii, Kawasaki (JP)

(73) Assignee: Fujitsu Limted, Kawasaki (JP)

( * ) Notice: Subject to any disclaimer, the term of this patent is extended or adjusted under 35 U.S.C. 154(b) by 509 days.

(21) Appl. No.: 11/336,927

(22) Filed: Jan. 23, 2006

(65) Prior Publication Data

US 2006/0120577 A1 Jun. 8, 2006

Related U.S. Application Data

(62) Division of application No. 09/639,892, filed on Aug. 15, 2000, now Pat. No. 7,020,308.

(30) Foreign Application Priority Data

Sep. 14, 1999 (JP) .................................. 11-260224

(51) Int. Cl.
G06K 9/46 (2006.01)
G03B 29/00 (2006.01)
(52) U.S. Cl. ........... 382/124; 382/237; 382/274; 396/15
(58) Field of Classification Search .......... 382/115–127, 382/277, 278, 286, 294, 298, 99, 300, 305, 382/168–172, 217–223, 237, 270–274; 283/68, 283/69; 348/77, 231.3, 231.6, 254; 396/15; 356/71
See application file for complete search history.

(56) References Cited

U.S. PATENT DOCUMENTS

| 4,086,567 A | 4/1978 | Crane et al. |
| 4,210,899 A | 7/1980 | Swonger et al. |
| 4,811,414 A | 3/1989 | Fishbine et al. |
| 4,993,068 A | 2/1991 | Piosenka et al. |
| 5,063,603 A | 11/1991 | Burt |
| 5,642,431 A | 6/1997 | Poggio |
| 5,825,924 A | 10/1998 | Kobayashi |
| 5,909,501 A | 6/1999 | Thebaud |
| 5,910,999 A | 6/1999 | Mukohzaka |
| 5,930,804 A | 7/1999 | Yu et al. |

(Continued)

FOREIGN PATENT DOCUMENTS

EP 63150781 6/1988

(Continued)

OTHER PUBLICATIONS

English Language Abstract of JP 03248278 A to Igaki et al.*

(Continued)

*Primary Examiner* — Matthew C Bella
*Assistant Examiner* — Anthony Mackowey
(74) *Attorney, Agent, or Firm* — Staas & Halsey LLP

(57) ABSTRACT

A personal authentication system using biometrics information, which identifies or authenticates an individual by verifying to-be-verified biometrics characteristic data against previously registered biometrics characteristic data. The system includes a biometrics information inputting section having a function to acquire the to-be-verified biometrics information; a biometrics information converting section converting said to-be-verified biometrics information, acquired through said biometrics information inputting section, into a state to be acquired on a predetermined acquisition condition, said predetermined acquisition condition being a same condition under which the registered biometric information was acquired; and a biometrics characteristic data extracting section extracting to-be-verified biometrics characteristics data from the to-be-verified biometrics information obtained by the conversion in said biometrics information converting section.

1 Claim, 35 Drawing Sheets

U.S. PATENT DOCUMENTS

| | | | | |
|---|---|---|---|---|
| 5,982,914 | A * | 11/1999 | Lee et al. | 382/124 |
| 5,990,804 | A | 11/1999 | Koyama | |
| 5,991,431 | A * | 11/1999 | Borza et al. | 382/127 |
| 6,002,499 | A * | 12/1999 | Corboline et al. | 359/2 |
| 6,049,621 | A | 4/2000 | Jain et al. | |
| 6,052,475 | A | 4/2000 | Upton | |
| 6,134,340 | A | 10/2000 | Hsu | |
| 6,173,068 | B1 | 1/2001 | Prokoski | |
| 6,175,922 | B1 * | 1/2001 | Wang | 713/182 |
| 6,243,502 | B1 * | 6/2001 | Christensen et al. | 382/305 |
| 6,259,804 | B1 | 7/2001 | Setlak et al. | |
| 6,282,304 | B1 * | 8/2001 | Novikov et al. | 382/125 |
| 6,381,347 | B1 * | 4/2002 | Teng et al. | 382/127 |
| 6,426,771 | B1 * | 7/2002 | Kosugi | 348/222.1 |
| 6,430,308 | B1 | 8/2002 | Ogawa et al. | |
| 6,526,160 | B1 * | 2/2003 | Ito | 382/117 |
| 6,600,840 | B1 * | 7/2003 | McCrossin et al. | 382/302 |
| 6,675,210 | B1 | 1/2004 | Takeo et al. | |

FOREIGN PATENT DOCUMENTS

| | | | |
|---|---|---|---|
| EP | 0 650 137 A2 | | 4/1995 |
| EP | 0935221 A2 | | 8/1999 |
| JP | 58-144280 | | 8/1983 |
| JP | 60-101679 | | 6/1985 |
| JP | 63150781 | | 6/1988 |
| JP | 63-228271 | | 9/1988 |
| JP | 1-2888980 | | 11/1989 |
| JP | 1-321576 | | 12/1989 |
| JP | 2-27484 | | 1/1990 |
| JP | 03248278 A | * | 11/1991 |
| JP | 3-296873 | | 12/1991 |
| JP | 7-121712 | | 5/1995 |
| JP | 9-81727 | | 3/1997 |
| JP | 10-150542 | | 6/1998 |
| JP | 10-187980 | | 7/1998 |
| JP | 2001-14462 | | 1/2001 |
| WO | WO 98/11501 | | 3/1998 |
| WO | WO 98/58346 | | 12/1998 |

OTHER PUBLICATIONS

Japanese Notice of Reasons for Rejection dated Feb. 1, 2005 in corresponding Japanese Patent Application No. HEI 11-260224.

K. Nakayama, "Present Situation and Direction of Biometrics API," Interop Magazine, Japan Softbank Publishing Co., Ltd., vol. 9, No. 6, p. 171, Aug. 1, 1999.

M. Kurata, "Preventing In-Company Illegal Access by Fingerprint Authentication System," Nikkei Byte, Japan, Nikkei BP Co., Ltd., No. 187, p. 156-159, Jan. 22, 1999, pp. 158-159.

Gunawardena et al., "Coincedent Sequencing for Fingerprint Verfication," Circuits and Systems, 1990, Proceedings of the $33^{rd}$ Midwest Symposium on Calgary, Alta., Canada Aug. 12-14, 1990, New York, NY, USA, IEEE, US, Aug. 12, 1990, pp. 845-848.

European Search Report dated Apr. 28, 2004 for corresponding EP Application No. 00307211.3.

Anonymous: "Press Release: Mentalix Provides the First IAFIS-Certified Latent Print Scanning Solution for Windows" XP-002136495, Jul. 23, 1999.

Office Action issued in corresponding Japanese Patent Application No. 2005-093980, mailed on Nov. 6, 2007.

Office Action issued in corresponding Japanese Patent Application No. 2005-093980, mailed on Aug. 14, 2007.

Restriction Requirement issued Aug. 7, 2003 in corresponding U.S. Patent No. 7,020,308.

Office Action issued May 19, 2004 in corresponding U.S. Patent No. 7,020,308.

Office Action issued Mar. 10, 2005 in corresponding U.S. Patent No. 7,020,308.

Advisory Action issued Aug. 4, 2005 in corresponding U.S. Patent No. 7,020,308.

Notice of Allowance issued Oct. 21, 2005 in corresponding U.S. Patent No. 7,020,308.

Japanese Office Action issued Apr. 8, 2010 in corresponding Japanese Application No. 2008-090279.

* cited by examiner

F I G. 12
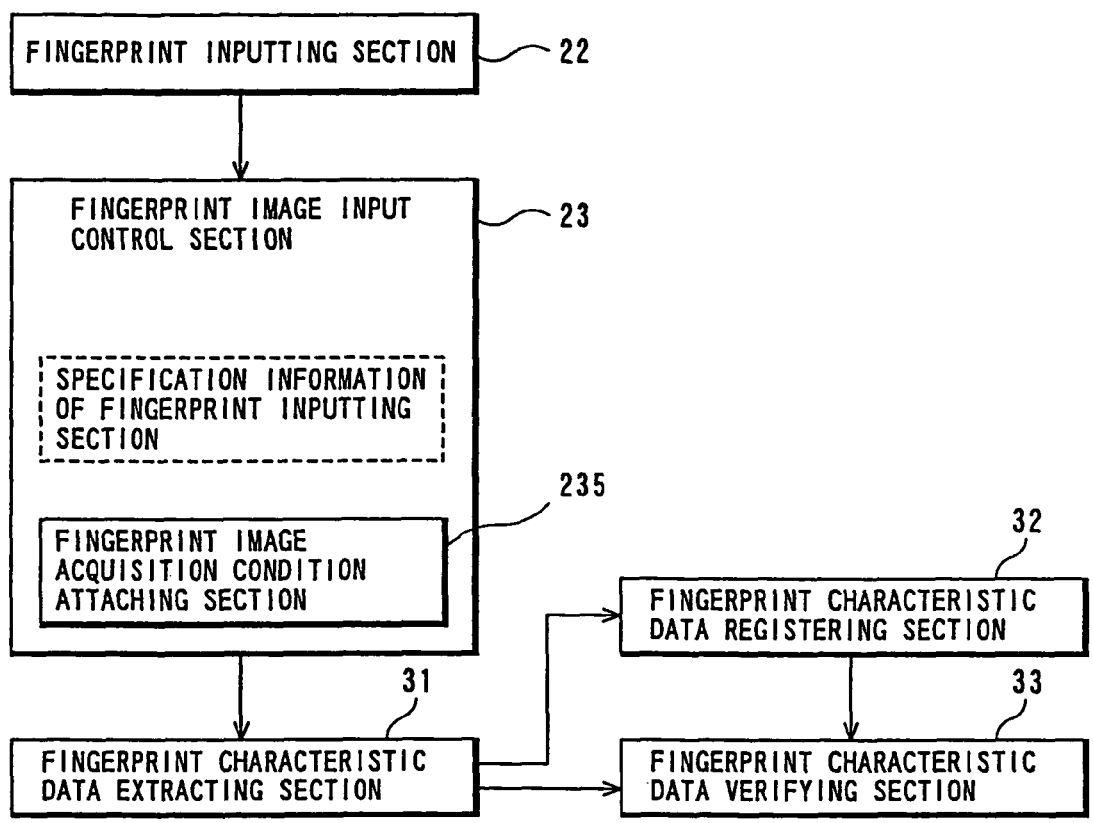

F I G. 26
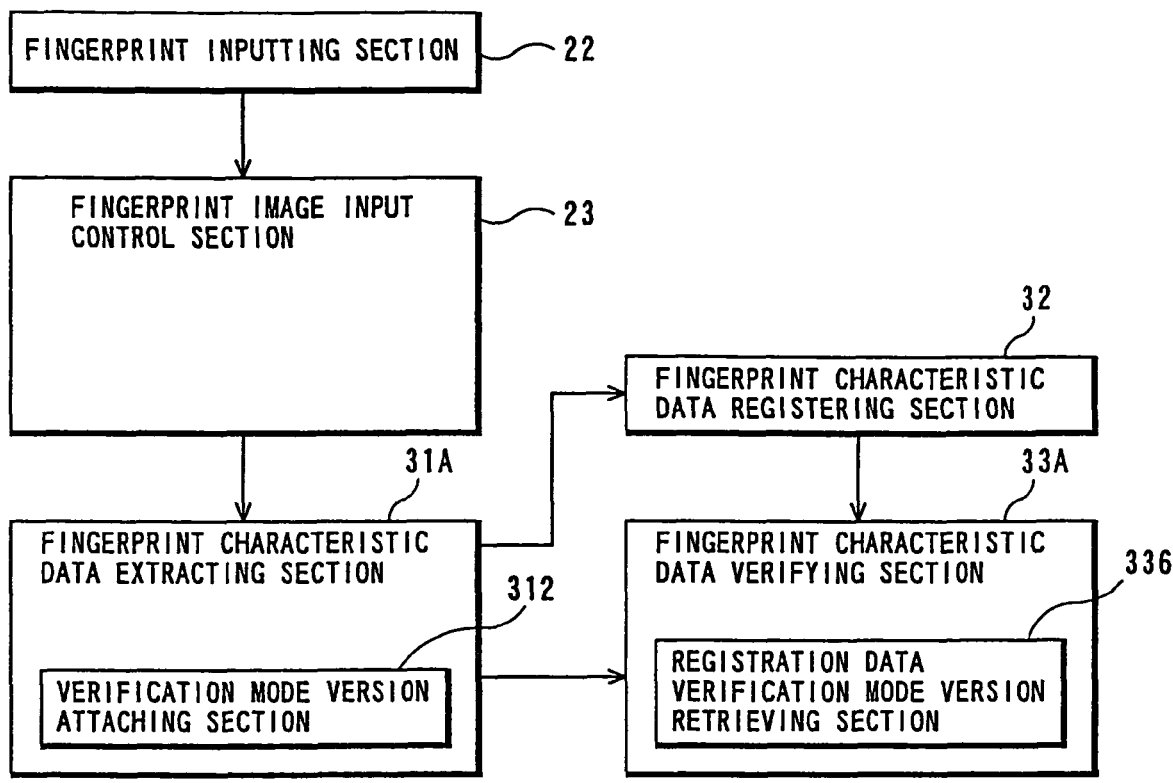

F I G. 32
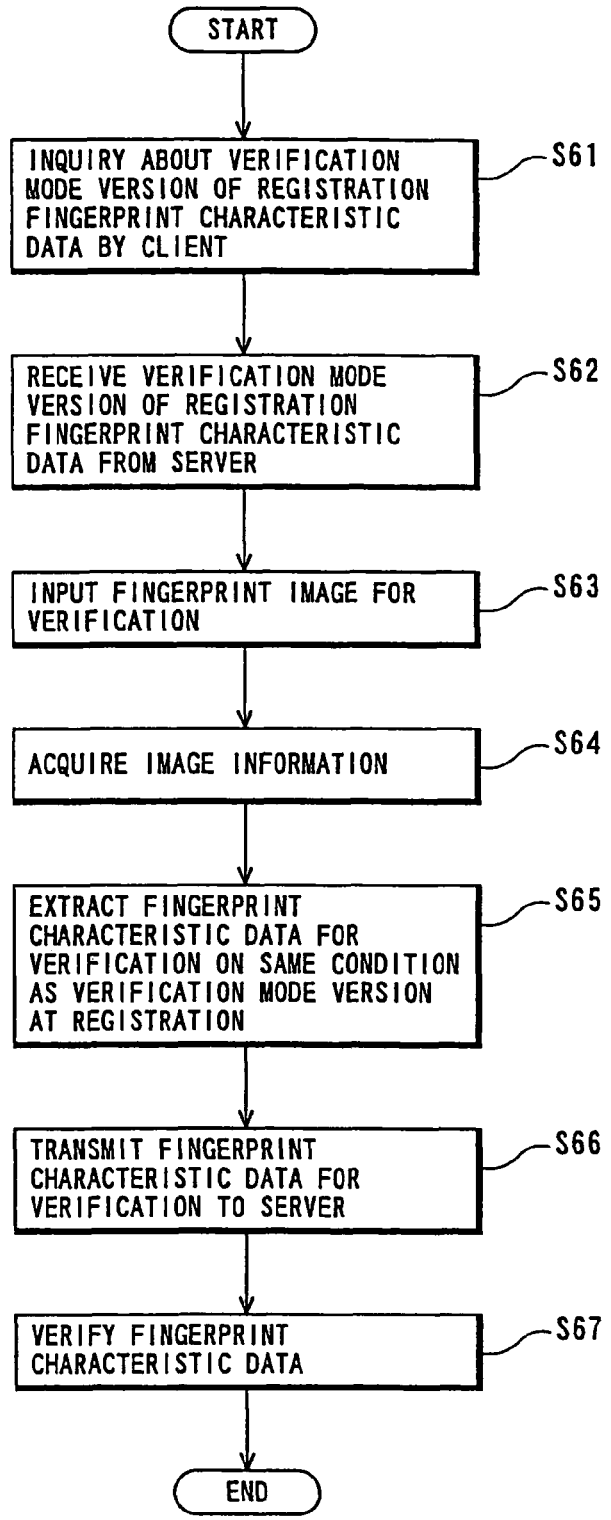

PERSONAL AUTHENTICATION SYSTEM USING BIOMETRICS INFORMATION

CROSS-REFERENCE TO RELATED APPLICATION

This application claims benefit under 35 U.S.C §120 as a divisional of application Ser. No. 09/639,892, filed Aug. 15, 2000 now U.S. Pat. No. 7,020,308, and entitled "PERSONAL AUTHENTICATION SYSTEM USING BIOMETRICS INFORMATION," which is hereby incorporated by reference in its entirety into this application.

BACKGROUND OF THE INVENTION

1) Field of the Invention

The present invention relates to a personal identification/authentication system using biometrics information (for example, fingerprint, voice, iris, retina, blood vessel, palm configuration, and signature) to be captured as image data or biometrics information (for example, voice, keystroke and dynamic signature) constituting time series data.

In the recent years, various types of apparatus have been developed to accomplish personal identification/authentication using biometrics information. In addition, such apparatus have increasingly been employed as a personal authentication system on a network. In a case in which this system is used as a person-concerned authentication system on a network, registered fingerprint data tend to be managed collectively (in a lump) in an apparatus called the "authentication server". For example, in the case of the confirmation of the person concerned using fingerprint, a client side equipped with a fingerprint inputting device extracts fingerprint characteristic (or peculiarity) information and transfers the characteristic information to a server. The server side verifies the characteristic information to perform the processing such as access permission when confirming that the fingerprint pertains to the person concerned.

In such a personal authentication system, taking into consideration a possibility of altering the specification of the fingerprint inputting device at maintenance or update of version, a desire exists for handling a plurality of types of fingerprint inputting devices (fingerprint scanners).

Simultaneously, it is desired that the update of version or the like of a data verifying system can smoothly be made without re-registering biometrics characteristic information.

2) Description of the Related Art

Since a conventional personal authentication apparatus using biometrics information, such as a fingerprint verifying apparatus, has been developed for use in standalone applications, that apparatus manufacturing companies (vendors) employ their peculiar standards or formats for fingerprint verification. For this reason, for example, difficulty has been encountered in accomplishing the interface among systems employing fingerprint verifying apparatus manufactured by different companies.

In addition, the conventional personal authentication system depends greatly on a device for inputting biometrics information, and in the case of the fingerprint or the like, if the mode of reading in a scanner (biometrics information inputting device) or the resolution of a fingerprint image to be read by a scanner varies, difficulty is experienced in using personal fingerprint characteristic data [data extracted from fingerprint image data (biometrics information)] registered in advance for use in verification, which requires re-registration of all the fingerprint characteristic data using a new scanner.

Still additionally, also in a case in which a change of verification mode (method) of biometrics information takes place, the data structure to be used varies accordingly, which also makes it difficult to use the personal fingerprint characteristic data registered in advance for use in the verification, which requires the re-registration of all the fingerprint characteristic data according to a method agreeing with a new verifying mode whenever the verifying mode changes.

That is, in the conventional art, the biometrics information inputting device and the verification mode of the biometrics information are only in one-to-one relation, and the verification mode of the biometrics information and the biometrics characteristic data (data extracted from biometrics information) needed for that verification mode of the biometrics information are also in one-to-one correspondence. Accordingly, a change of the biometrics information inputting device or the verification mode of the biometrics information inhibits the use of the biometrics characteristic data extracted previously from the biometrics information and registered, and requires the re-registration of all the fingerprint characteristic data.

Referring here to FIGS. 34 and 35, a description will be given of a general configuration of a personal authentication system using biometrics information. FIG. 34 is a block diagram showing a configuration of a personal authentication system for use in entrance/exit management, while FIG. 35 is a block diagram showing a configuration of a personal computer connected type personal authentication system.

In FIG. 34, a personal authentication system 120 is for accomplishing personal identification/authentication through the use of fingerprint as biometrics information, and an electric lock control section 110 reads a personal fingerprint in the form of image data to, when fingerprint characteristic data (biometrics characteristic data) extracted from that image data matches fingerprint characteristic data registered in advance, unlock an electric lock (not shown) of a door 100 so that the door 100 is openable.

This personal authentication system 120 is made up of a control section 121, a fingerprint inputting section 122, a fingerprint image input control section 123, a fingerprint characteristic data extracting section 124, a fingerprint characteristic data registering section 125, a fingerprint characteristic data verifying section 126, a fingerprint verification result outputting section 127, and an ID number inputting section 128.

The control section 121 is made to generally manage and control the personal authentication system 120, the fingerprint inputting section 122 is made to acquire or collect a fingerprint as biometrics information in the form of image data, and the fingerprint image input control section 123 is designed to control the fingerprint capturing operation (inputting operation) of the fingerprint inputting section 122.

Furthermore, the fingerprint characteristic data extracting section 124 is for extracting fingerprint characteristic data from fingerprint image data captured through the fingerprint inputting section 122, the fingerprint characteristic data registering section 125 is for previously registering and retaining the registration fingerprint characteristic data extracted from the fingerprint image data, and the fingerprint characteristic data verifying section 126 is for verifying that verification fingerprint characteristic data on a person forming a subject of verification, obtained by the fingerprint inputting section 122 and the fingerprint characteristic data extracting section 124, matches the registration fingerprint characteristic data registered and retained in advance in the fingerprint characteristic data registering section 125.

Still furthermore, the fingerprint verification result outputting section 127 is for outputting the verification result from the fingerprint characteristic data verifying section 126 to the electric lock control section 110. If the verification result from the fingerprint verification result outputting section 127 indicates the correspondence (or equality), the electric lock control section 110 controls an electric lock of the door 100 into the unlatched condition. The ID number inputting section 128 is for inputting an ID number to the control section 121, for example, when the registration fingerprint characteristic data is registered in the fingerprint characteristic data verifying section 126 or when the data registered and retained in the fingerprint characteristic data verifying section 126 is altered/edited.

With the above-mentioned configuration, the personal authentication system 120, shown in FIG. 34, can be put to use for the personal authentication at the opening of the door 100 of a room in the entrance/exit management. When an entering/leaving person opens the door 100, the entering/leaving person makes the fingerprint inputting section 122 read his fingerprint so that the fingerprint is inputted to the personal authentication system 120 in the form of image data. The image data captured through the fingerprint inputting section 122 is inputted through the fingerprint image input control section 123 to the fingerprint characteristic data extracting section 124, where verification fingerprint characteristic data is extracted from the fingerprint image data. In the fingerprint characteristic data verifying section 126, this verification fingerprint characteristic data is compared with the registration fingerprint characteristic data on the subject of verification (entering/leaving person), previously registered and retained in the fingerprint characteristic data registering section 125. If these fingerprint characteristic data correspond, the fingerprint verification result outputting section 127 gives an unlatching instruction to the electric lock control section 110 which in turn, unlatches an electric lock (not shown) of the door 100 so that the door 100 is openable.

On the other hand, a personal authentication system 140, shown in FIG. 35, is designed to perform personal identification/authentication using a fingerprint as the biometrics in a condition connected to a personal computer 130. The a personal authentication system 140 is made up of a control section 141, a fingerprint inputting section 142, a fingerprint image input control section 143, a fingerprint characteristic data extracting section 144, a fingerprint characteristic data registering section 145, a fingerprint characteristic data verifying section 146, a fingerprint verification result outputting section 147, and an I/O control section 148.

In this configuration, the control section 141, the fingerprint inputting section 142, the fingerprint image input control section 143, the fingerprint characteristic data extracting section 144, the fingerprint characteristic data registering section 145, the fingerprint characteristic data verifying section 146 and the fingerprint verification result outputting section 147 correspond to the sections 121 to 127 in the above-mentioned personal authentication system 120, respectively, and the detailed description thereof will be omitted for brevity. The I/O control section 148 functions as an interface with respect to the personal computer 130 under the control of the control section 141 to send the fingerprint verification result, outputted from the fingerprint verification result outputting section 147, to the personal computer 130.

With the aforesaid configuration, in the personal authentication system 140 shown in FIG. 35, a person being a subject of verification also can make the fingerprint inputting section 142 read his fingerprint so that the fingerprint is inputted as image data. The fingerprint image data captured through the fingerprint inputting section 142 is inputted through the fingerprint image input control section 143 to the fingerprint characteristic data extracting section 144, where verification fingerprint characteristic data is extracted from the fingerprint image data. In the fingerprint characteristic data verifying section 146, this verification fingerprint characteristic data is verified with the registration fingerprint characteristic data on the same subject person of verification, registered and retained in advance in the fingerprint characteristic data registering section 145. The fingerprint verification result is fed through the fingerprint verification result outputting section 147 and the I/O control section 148 to the personal computer 130.

A description will be given hereinbelow of objects on the operation of a system employing a fingerprint-based personal authentication mode. At the initial use, a user registers his/her own biometrics information (fingerprint image data). At this time, a means to confirm the person himself/herself is necessary. Thus, in general, the registration of biometrics information is made in the presence of a super user having authority for management, alternatively the registration of biometrics information is done through the use of an expendable password issued first. In either case, the essential matter is the confirmation of correspondence between the registered biometrics information and the person himself/herself, and repetition of the biometrics information registering work causes very inconvenience, and even, as the number of times of re-registration increases, the probability of impersonation increases. In this case, the "impersonation" signifies that another person impersonates one specified person and registers his/her own fingerprint as the fingerprint of that specified person.

Meanwhile, not only the performance of a fingerprint capturing device (fingerprint inputting device or fingerprint scanner), including its size, has shown yearly improvement, but also the price thereof has shown a significant decrease. For the extension of the system introduced, it is preferable to employ a fingerprint capturing device low in cost and high in performance, whereas the conventional fingerprint verification system (personal authentication system) mentioned above depends greatly upon a device for inputting biometrics information, and difficulty has frequently been experienced in directly using the latest fingerprint capturing device.

In addition, the dependency of the system performance on specific hardware creases a problem in that the user side is required to secure the same devices while the system is in operation.

More specifically, in the case of the fingerprint capturing device, the correspondence between the resolutions of the fingerprint images respectively producing the verification data and the registered data is of the essence, and a need exists in that that the relationship in brightness (light intensity) between ridges (crests) and troughs (valleys) of a fingerprint image, depending on the fingerprint capturing mode, does not vary between the verification data and the registered data. Although a police organization such as the FBI has its own standard for the collection of fingerprints, seldom does a commercial low-cost apparatus conform to this standard.

Accordingly, if a fingerprint capturing device produced by a different device vendor is employed in update of system version or in system extension, then the re-registration of the fingerprints of all the users becomes essential as stated above. Likewise, a change of the verifying mode or the characteristic information for use in the verification leads to alterations in data structure to be used and, therefore, the re-registration of the fingerprints of all the users also becomes necessary as mentioned above. Such re-registration work involves the recollection of the fingerprints of all the users and costs extremely much labor, and even, can create a undesirable chance of a wrongful act such as the aforesaid impersonation.

The above-mentioned objects also arise in the case of a combination of personal authentication techniques using a plurality of biometrics information such as fingerprint, voice, iris and face.

SUMMARY OF THE INVENTION

Accordingly, the present invention has been developed with a view to eliminating the above-mentioned problems, and it is therefore an object of the invention to provide a personal authentication system using biometrics information, capable of facilitating update of system version without requiring a user for re-registration of biometrics information irrespective of alterations of biometrics characteristic data being used at a change of biometrics information acquiring device, at a change of biometrics information acquiring mode, or at verification.

For this purpose, in accordance with the invention, there is provided a personal authentication system using biometrics information, comprising a biometrics information inputting section having a function to acquire biometrics information, a biometrics information converting section for converting the biometrics information, acquired through the biometrics information inputting section, into a state to be acquired on a predetermined acquisition condition, and a biometrics characteristic data extracting section for extracting biometrics characteristic data from the biometrics information obtained by the conversion in the biometrics information converting section.

In this case, when the biometrics information inputting section is of a type capturing the biometrics information as image data, it is also appropriate that the biometrics information converting section converts the biometrics information, acquired through the biometrics information inputting section, into image data with a predetermined resolution included in the aforesaid predetermined acquisition condition, that the biometrics information converting section converts the biometrics information, acquired through the biometrics information inputting section, into image data with a predetermined resolution and predetermined numbers of pixels in vertical/horizontal directions, included in the aforesaid predetermined acquisition condition, or that the biometrics information converting section converts the biometrics information, acquired through the biometrics information inputting section, into image data with a predetermined image characteristic included in the aforesaid predetermined acquisition condition.

In addition, if the biometrics information inputting section is made to acquire the biometrics information as time series data, it is also appropriate that the biometrics information converting section converts the biometrics information, acquired through the biometrics information inputting section, into time series data with a predetermined sampling period, included in the aforesaid predetermined acquisition condition.

Still additionally, when the biometrics information inputting section is of a type acquiring fingerprint information as the biometrics information in the form of image data, it is also preferred that the biometrics information converting section converts the fingerprint information, acquired through the biometrics information inputting section, into image data with a predetermined relationship in brightness between ridge lines and trough lines, included in the aforesaid acquisition condition. In this case, it is also acceptable that a brightness relationship judging section is provided to judge a relationship in brightness between ridge lines and trough lines in the fingerprint information acquired through the biometrics information inputting section so that the biometrics information converting section conducts conversion processing of image data in accordance with the judgment of the brightness relationship judging section.

Furthermore, in accordance with this invention, a personal authentication system comprises a biometrics information inputting section having a function to acquire biometrics information, a biometrics characteristic data extracting section for extracting biometrics characteristic data from the biometrics information acquired through the biometrics information inputting section, an acquisition condition attaching section for attaching (or adding), to the biometrics information to be inputted from the biometrics information inputting section to the biometrics characteristic data extracting section, an acquisition condition related to the biometrics information, and a biometrics information converting section for, before the extraction of the biometrics characteristic data from the biometrics information in the biometrics characteristic data extracting section, converting the biometrics information into a state to be acquired on a predetermined acquisition condition, in accordance with the acquisition condition attached to the biometrics information.

In this case, when the biometrics information inputting section is made to capture the biometrics information as image data, it is also appropriate that the acquisition condition attaching section attaches a resolution as the acquisition condition to the biometrics information while the biometrics information converting section converts the biometrics information into image data with a predetermined resolution on the basis of the resolution attached to the biometrics information, or that the acquisition condition attaching section attaches a resolution and the numbers of pixels in vertical/horizontal directions, as the acquisition condition, to the biometrics information while the biometrics information converting section converts the biometrics information into image data with a predetermined resolution and predetermined numbers of pixels in vertical/horizontal directions, on the basis of the resolution and the numbers of pixels in vertical/horizontal directions attached to the biometrics information.

If the biometrics information inputting section is made to acquire the biometrics information as time series data, it is also appropriate that the acquisition condition attaching section attaches a sampling period as the acquisition condition to the biometrics information while the biometrics information converting section converts the biometrics information into time series data with a predetermined sampling period, on the basis of the sampling period attached to the biometrics information.

If the biometrics information inputting section is made to acquire fingerprint information as the biometrics information in the form of image data, it is also preferred that the acquisition condition attaching section attaches, to the fingerprint information as the acquisition condition, a relationship in brightness between ridge lines and trough lines in the fingerprint information while the biometrics information converting section converts the fingerprint information into image data with a predetermined brightness relationship, on the basis of the brightness relationship attached to the fingerprint information.

Still furthermore, in accordance with this invention, a personal authentication system comprises, in addition a biometrics information inputting section and a biometrics characteristic data extracting section similar to those stated above, a biometrics characteristic data registering section for previously preserving registration biometrics characteristic data extracted from biometrics information, a biometrics characteristic data verifying section for verifying that verification biometrics characteristic data on a person forming a subject of verification, obtained through the biometrics information inputting section and the biometrics characteristic data extracting section, matches the registration biometrics characteristic data on the same verification person registered and preserved previously in the biometrics characteristic data registering section, an acquisition condition attaching section for attaching, to biometrics characteristic data to be inputted from the biometrics characteristic data extracting section to one of the biometrics characteristic data registering section and the biometrics characteristic data verifying section, an acquisition condition related to the biometrics information being an extraction source of that biometrics characteristic data, and a biometrics characteristic data converting section for, before verifying that verification biometrics characteristic data and the registration biometrics characteristic data in the biometrics characteristic data verifying section, converting at least one of the verification biometrics characteristic data and the registration biometrics characteristic data in accordance with the acquisition condition attached to the verification biometrics characteristic data and the registration biometrics characteristic data to convert the verification biometrics characteristic data and the registration biometrics characteristic data into data to be obtained on the same acquisition condition.

Moreover, in accordance with this invention, a personal authentication system using biometrics information, comprises, in addition to a biometrics information inputting section, a biometrics characteristic data extracting section, a biometrics characteristic data registering section and a biometrics characteristic data verifying section similar to those mentioned above, a verification mode version attaching section for attaching, to biometrics characteristic data to be inputted from the biometrics characteristic data extracting section to one of the biometrics characteristic data registering section and the biometrics characteristic data verifying section, a version of verification mode related to that biometrics characteristic data, and a biometrics characteristic data converting section for, before verifying that verification biometrics characteristic data matches the registration biometrics characteristic data in the biometrics characteristic data verifying section, converting at least one of the verification biometrics characteristic data and the registration biometrics characteristic data on the basis of the version of the verification mode attached to the verification biometrics characteristic data and the registration characteristic data to convert the verification biometrics characteristic data and the registration biometrics characteristic data into data corresponding to the same version of verification mode.

Still moreover, in accordance with this invention, a personal authentication system using biometrics information, comprises, in addition to a biometrics information inputting section, a biometrics characteristic data extracting section, a biometrics characteristic data registering section and a biometrics characteristic data verifying section similar to those mentioned above, a biometrics characteristic data converting section for, when a change of verification mode in the biometrics characteristic data verifying section takes place, converting collectively all the registration biometrics characteristic data, registered in the biometrics characteristic data registering section, into biometrics characteristic data corresponding to the verification mode after the change.

Furthermore, in accordance with this invention, a personal authentication system using biometrics information, comprises, in addition to a biometrics information inputting section and a biometrics characteristic data extracting section similar to those mentioned above, a biometrics characteristic data registering section for previously preserving auxiliary biometrics characteristic data besides the biometrics characteristic data essential to the identification and authentication as registration biometrics characteristic data extracted from biometrics information, and a biometrics characteristic data restructuring section for, when the kind of the biometrics characteristic data to be used for the identification and authentication is changed, restructuring new registration biometrics characteristic data according to the change through the use of the essential biometrics characteristic data and the auxiliary biometrics characteristic data.

Still furthermore, in accordance with this invention, a personal authentication system comprises, in addition to a biometrics information inputting section and a biometrics characteristic data extracting section similar to those mentioned above, a biometrics characteristic data registering section for previously preserving registration biometrics characteristic data extracted from the biometrics information and the biometrics information being an extraction source of that registration biometrics characteristic data, and a biometrics characteristic data restructuring section for, when the kind of the biometrics characteristic data to be used for the identification and authentication is changed, extracting and restructuring new registration biometrics characteristic data from the biometrics information being the extraction source of the registration biometrics characteristic data according to the change.

It is also appropriate that each of the personal authentication systems stated above includes a biometrics characteristic data verifying section made to handle a plurality of verification modes, and made to verify that verification biometrics characteristic data on a person forming a subject of verification, obtained through the biometrics information inputting section and the biometrics characteristic data extracting section, matches registration biometrics characteristic data on the same subject person, previously registered and preserved in the biometrics characteristic data registering section, and a verification mode version attaching section for attaching, to biometrics characteristic data to be inputted from the biometrics characteristic data extracting section to one of the biometrics characteristic data registering section and the biometrics characteristic data verifying section, a verification mode version related to that biometrics characteristic data, wherein, when the verification mode versions respectively attached to the verification biometrics characteristic data and the registration biometrics characteristic data between which verification is made in the biometrics characteristic data verifying section does not agree with each other, the biometrics characteristic data restructuring section restructures one of the verification biometrics characteristic data and the registration biometrics characteristic data into biometrics characteristic data needed for a verification mode corresponding to the other verification mode version.

In addition, in accordance with this invention, a personal authentication system comprises a verification mode version attaching section for attaching a verification mode version to biometrics characteristic data extracted from the biometrics information, and a biometrics characteristic data verifying section for performing verification processing using the biometrics characteristic data in a verification mode corresponding to the verification mode version attached to the biometrics characteristic data.

Still additionally, in accordance with this invention, a personal authentication system using biometrics information comprises a biometrics information inputting section having a function to acquire biometrics information, a biometrics characteristic data extracting section for extracting biometrics characteristic data, to be needed in a plurality of verification modes, from the biometrics information acquired through the biometrics information inputting section, a biometrics characteristic data registering section for previously preserving registration biometrics characteristic data extracted from the biometrics information, a biometrics characteristic data verifying section made to handle the plurality of verification modes, for verifying that verification biometrics characteristic data on a person forming a subject of verification, obtained through the biometrics information inputting section and the biometrics characteristic data extracting section, matches the registration biometrics characteristic data on the same subject person, previously preserved in the biometrics characteristic data registering section, and a verification mode version attaching section for attaching, to registration biometrics characteristic data to be inputted from the biometrics characteristic data extracting section to the biometrics characteristic data registering section, a verification mode version related to that registration biometrics characteristic data, wherein the biometrics characteristic data extracting section extracts, as the verification biometrics characteristic data, biometrics characteristic data to be needed in a verification mode corresponding to the verification mode version attached to the registration biometrics characteristic data, from the biometrics information acquired through the biometrics information inputting section.

At this time, it is appropriate that the biometrics characteristic data verifying section verifies that the registration biometrics characteristic data matches the verification biometrics characteristic data extracted by the biometrics characteristic data extracting section, and when a verification result in the biometrics characteristic data verifying section shows a matching rate equal to or larger than a predetermined value and the verification mode version is older than a predetermined version, the biometrics characteristic data extracting section extracts biometrics characteristic data for the latest verification mode from the biometrics information so that the extracted biometrics characteristic data is re-registered as new registration biometrics characteristic data in the biometrics characteristic data registering section.

Moreover, in accordance with this invention, a personal authentication system using biometrics information comprises a biometrics information inputting section having a function to acquire biometrics information, a biometrics characteristic data extracting section for extracting biometrics characteristic data from the biometrics information acquired through the biometrics information inputting section, a biometrics characteristic data registering section for previously preserving registration biometrics characteristic data extracted from the biometrics information, a biometrics characteristic data verifying section made to handle a plurality of verification modes, for verifying that verification biometrics characteristic data on a person forming a subject of verification, obtained through the biometrics information inputting section and the biometrics characteristic data extracting section, matches the registration biometrics characteristic data on the same subject person, previously registered and preserved in the biometrics characteristic data registering section, and a verification mode version attaching section for attaching, to biometrics characteristic data to be inputted from the biometrics characteristic data extracting section to the biometrics characteristic data registering section and the biometrics characteristic data verifying section, a verification mode version related to that biometrics characteristic data, wherein the biometrics characteristic data extracting section extracts separately dependence data depending on a verification mode and common data common to any verification mode without depending on a verification mode, while, when the verification mode version attached to the verification biometrics characteristic data does not match the verification mode version attached to the registration biometrics characteristic data, the biometrics characteristic data verifying section conducts the verification using the common data in these biometrics characteristic data.

In addition, a personal authentication system using biometrics information according to this invention is constructed as a client-server type personal authentication system in which a client side extracts verification biometrics characteristic data from biometrics information on an individual while a server side verifies biometrics characteristic data verification for identification and authentication of the individual, the client side comprising a biometrics information inputting section having a function to acquire biometrics information, a biometrics characteristic data extracting section for extracting biometrics characteristic data, to be needed in a plurality of verification modes, from the biometrics information acquired through the biometrics information inputting section, and a verification mode version attaching section for attaching, to registration biometrics characteristic data to be sent from the biometrics characteristic data extracting section to the server side, a verification mode version related to that registration biometrics characteristic data, while the server side comprising an biometrics characteristic data registering section for previously preserving the registration biometrics characteristic data from the client side together with the verification mode version, and a biometrics characteristic data verifying section made to handle a plurality of verification modes, for verifying that verification biometrics characteristic data on a person forming a subject of verification from the client side matches registration biometrics characteristic data on the same subject person previously preserved in the biometrics characteristic data registering section, wherein the verification mode version attached to the registration biometrics characteristic data is communicated from the server side to the biometrics characteristic data extracting section on the client side, and the biometrics characteristic data extracting section extracts biometrics characteristic data, to be needed in a verification mode corresponding to the verification mode version communicated from the server side, as the verification biometrics characteristic data from the biometrics information acquired through the biometrics information inputting section.

Still additionally, a personal authentication system using biometrics information according to this invention is constructed as a client-server type personal authentication system in which a client side extracts verification biometrics characteristic data from biometrics information on an individual while a server side verifies biometrics characteristic data verification for identification and authentication of the individual, the client side comprising a biometrics information inputting section having a function to acquire biometrics information, a biometrics characteristic data extracting section for extracting biometrics characteristic data from the biometrics information acquired through the biometrics information inputting section, and an acquisition condition attaching section for attaching, to registration biometrics characteristic data to be sent from the biometrics characteristic data extracting section to the server side, an acquisition condition related to that registration biometrics characteristic data in the biometrics information inputting section, while the server side comprising an biometrics characteristic data registering section for previously preserving the registration biometrics characteristic data from the client side together with the acquisition condition, and an biometrics characteristic data verifying section for verifying that verification biometrics characteristic data on a person forming a subject of verification from the client side matches registration biometrics characteristic data on the same subject person previously preserved in the biometrics characteristic data registering section, wherein the acquisition condition attached to the registration biometrics characteristic data is communicated from the server side to the biometrics characteristic data extracting section on the client side, and the biometrics characteristic data extracting section extracts biometrics characteristic data under the acquisition condition communicated from the server side, as the verification biometrics characteristic data from the biometrics information acquired through the biometrics information inputting section.

The personal authentication systems thus constructed according to this invention can offer the following effects and advantages.

(1) It is possible to eliminate the biometrics information reregistering work which has been carried on by users so far in conjunction with a change of biometrics information inputting device (biometrics information inputting section), a change of biometrics information acquisition condition (resolution, image aspect, gradation, relationship in brightness between ridges and troughs, and others) or a change of biometrics characteristic data to be used at verification. Accordingly, not only the update of system version becomes easy, but also a chance of a wrongful act such as impersonation is eliminable, and even the system security ability (safety) is significantly improvable.

(2) Biometrics information inputting devices employing different acquisition modes are usable in the same system, which considerably facilitates system extension.

(3) A change of type of biometrics information inputting device becomes easy, which facilitates the employment of a new low-cost biometrics information inputting device at system enlargement to lead to a decrease in system cost.

(4) The re-registration of biometrics information by users involved in a change or update of version for verification mode biometrics characteristic data becomes unnecessary, which cuts maintenance cost.

(5) The elimination of the re-registration work and the facilitation of the update of version of the verification mode facilitates the replacement with the advanced verification mode so that the user side can experience the latest authentication function at all times.

BRIEF DESCRIPTION OF THE DRAWINGS

FIG. 12 is a block diagram showing a configuration of an essential part of a personal authentication system using biometrics information according to the fifth embodiment of the invention;

FIG. 26 is a block diagram showing a configuration of an essential part of a personal authentication system using biometrics information according to the eleventh embodiment of the invention;

FIG. 32 is a flow chart available for describing an operation of the personal authentication system according to the thirteenth embodiment;

DESCRIPTION OF THE PREFERRED EMBODIMENTS

Embodiments of the present invention will be described hereinbelow with reference to the drawings.

An arrangement for interchange of information regarding inputting scanner specifications, registration/verification (collation) engine specifications and biometrics characteristic data specifications is required to cope with, for example, alteration of acquisition mode, resolution, image aspect ratio (ratio of numbers of pixels in vertical/horizontal directions) and gradation of a biometrics information inputting section (fingerprint inputting scanner or the like), or change of characteristic points to be extracted as biometrics characteristic data from acquired data (fingerprint image data or the like). This arrangement will be described hereinbelow in detail as first to third embodiments. In each of these embodiments, let it be assumed that the biometrics information is fingerprint image data and a personal authentication is made on the basis of fingerprints.

Fingerprint characteristic data includes the coordinates of branch points (characteristic points), end points (characteristic points) and intersections of ridge lines of a fingerprint, central coordinates of a fingerprint, delta coordinates of a fingerprint, directions of ridge lines of a fingerprint, distances between characteristic points, number of ridge lines between fingerprint characteristic points, and others, most of which are represented by coordinates. Accordingly, the fingerprint characteristic data undergoes large influence of the resolution of a fingerprint image acquired through a scanner.

Furthermore, in the following description of embodiments, for convenience only, as examples, a personal authentication is made in a manner that fingerprint image data is acquired as biometrics information. However, it is also appropriate to acquire and use image data on iris, face, retina, blood vessel, palm configuration, signature, or the like as biometrics information, or to acquire and use time series data such as voice, keystroke or dynamic signature.

[0] Description of Basic Configuration of Personal Authentication System

Figure 1:
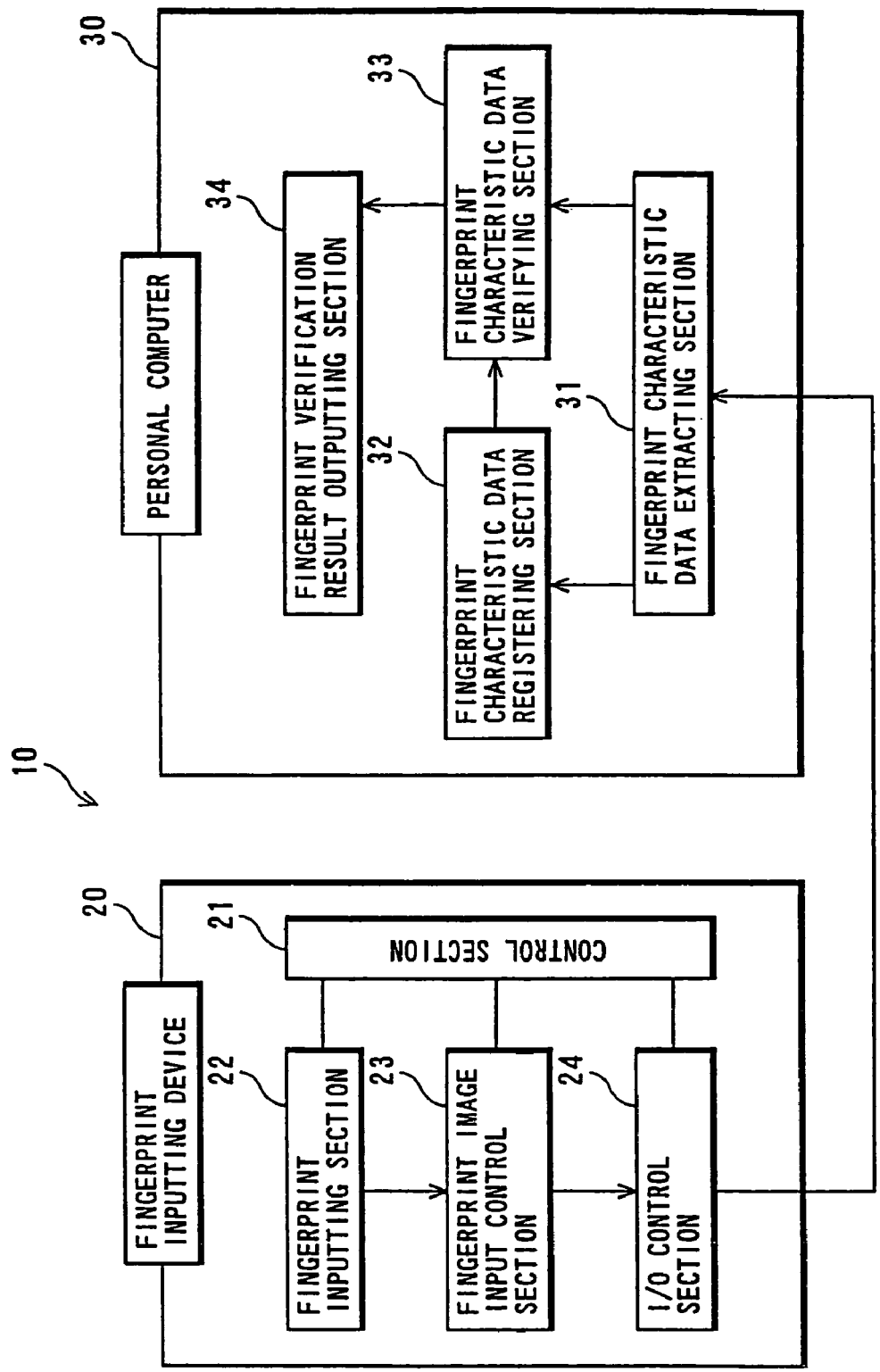
FIG. 1 is a block diagram showing a basic configuration of personal authentication systems (personal computer connected type fingerprint verifying apparatus) using biometrics information according to first and twelfth embodiments of the present invention.

First of all, referring to FIG. 1, a description will be given hereinbelow of a basic configuration of personal authentication systems (personal computer connected type fingerprint verifying apparatus) using biometrics information according to first to twelfth embodiments of the present invention. FIG. 1 is a block diagram thereof, and as shown in FIG. 1, a personal authentication system 10 using biometrics information according to the embodiments is a personal computer connected type fingerprint verifying apparatus in which a fingerprint inputting device (fingerprint scanner) 20 forming a biometrics information inputting device is connected to a personal computer 30.

The fingerprint inputting device 20 internally includes a control section 21, a fingerprint inputting section 22, a fingerprint image input control section 23 and an I/O control section 24, while the personal computer 30 functions as a fingerprint characteristic data extracting section 31, a fingerprint characteristic data registering section 32, a fingerprint characteristic data verifying section 33 and a fingerprint verification result outputting section 34.

In the fingerprint inputting device 20, the control section 21 is for managing and controlling the fingerprint inputting device 20 as a whole, and the fingerprint inputting section (biometrics information inputting section) 22 is for acquiring a fingerprint as biometrics information in the form of image data. Additionally, the fingerprint image input control section 23 is for controlling the acquisition operation (inputting operation) of a fingerprint in the fingerprint inputting section 22, or for making a decision on capturing image data, while the I/O control section 24 acts as an interface with the personal computer 30 under the control of the control section 21, and fulfills a function to send fingerprint image data, acquired through the fingerprint inputting section 22 and the fingerprint image input control section 23, to the personal computer 30.

Furthermore, in the personal computer 30, the fingerprint characteristic data extracting section (biometrics characteristic data extracting section) 31 is for extracting fingerprint characteristic data from fingerprint image data sent from the fingerprint inputting device 20, and the fingerprint characteristic data registering section (biometrics characteristic data registering section) 32 is for previously registering and preserving registration fingerprint characteristic data extracted from the fingerprint image data. Additionally, the fingerprint characteristic data verifying section (biometrics characteristic data verifying section) 33 is for verifying that verification fingerprint characteristic data (fingerprint characteristic data for verification) on a person being a subject of verification, extracted through the fingerprint characteristic data extracting section 31, matches registration fingerprint characteristic data on the same subject person, previously registered and preserved in the fingerprint characteristic data registering section 32. Still additionally, the fingerprint verification result outputting section 34 is for outputting a verification result in the fingerprint characteristic data verifying section 33.

The personal authentication system according to the present invention can also be constructed as a client-server type as well as a thirteenth embodiment which will be described later with reference to FIG. 31. In a personal authentication system 50 shown in FIG. 31, a client 60 and a server 70 are connected through a communication section 71 as will be mentioned later. Additionally, the client 60 side is equipped with a fingerprint inputting section 22, a fingerprint image input control section 23, a fingerprint characteristic data extracting section 31A (31) and a communication section 61, and verification fingerprint characteristic data is extracted from fingerprint image data and the extracted verification fingerprint characteristic data is transmitted through the communication section 61 to the server 70. Meanwhile, the server 70 side is provided with a fingerprint characteristic data registering section 32, a fingerprint characteristic data verifying section 33A (33) and a communication section 71, thus conducting verification processing with the verification fingerprint characteristic data received through the communication section 71. Incidentally, it is also preferred that the client 60 side performs the fingerprint characteristic data verification while the server 70 side only preserves registration fingerprint characteristic data.

Such a client-server type personal authentication system is employed in only the thirteenth, while the first to twelfth embodiments employ a personal computer connected type fingerprint verifying apparatus described above with reference to FIG. 1. However, the personal authentication systems according to the first to twelfth embodiments can also be of a client-server type shown in FIG. 31.

[1] Description of First Embodiment

Figure 2:
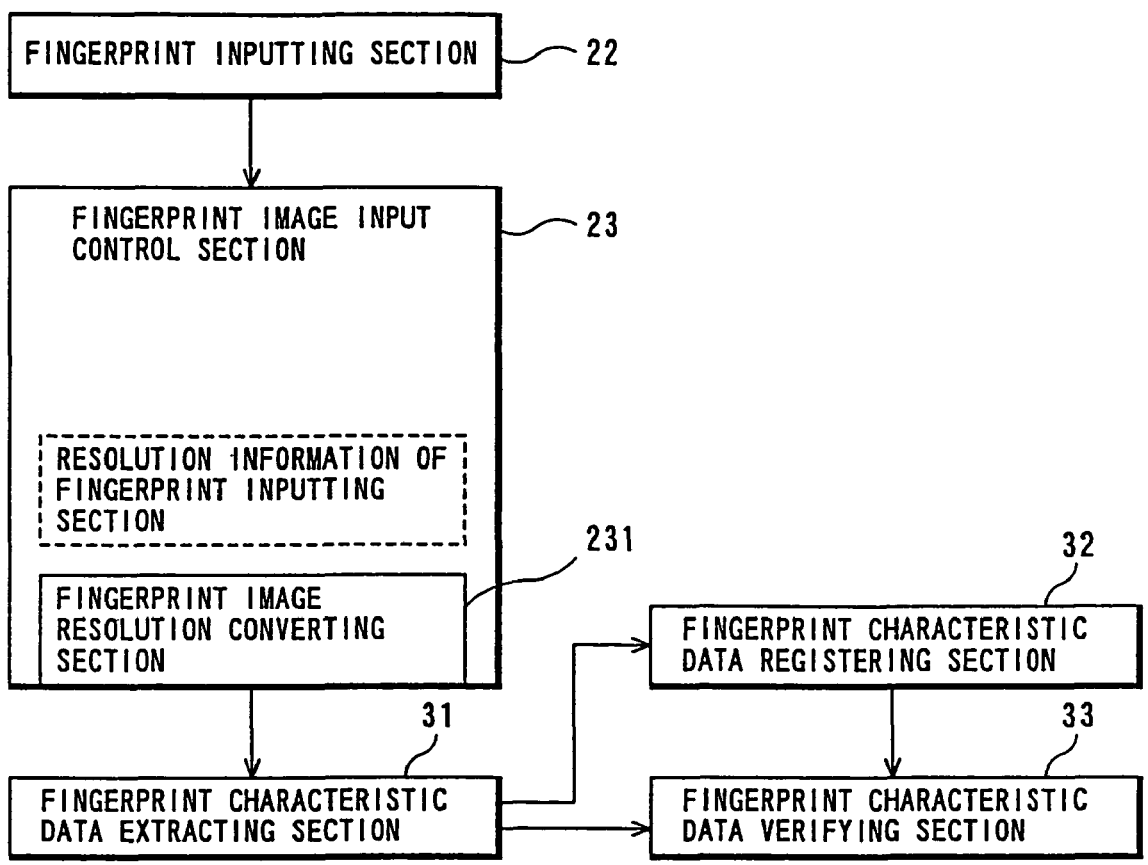
FIG. 2 is a block diagram showing a configuration of an essential part of a personal authentication system using biometrics information according to the first embodiment of the invention.

FIG. 2 is a block diagram showing a configuration of an essential part of a personal authentication system using biometrics information according to the first embodiment of the present invention. In FIG. 2, the same reference numerals as those used above designate the same or substantially same parts, and the detailed description thereof will be omitted for brevity. Additionally, the control section 21, the I/O control section 24 and the fingerprint verification result outputting section 34 shown in FIG. 1 are omitted from the illustration of FIG. 2.

As FIG. 2 shows, the fingerprint image input control section 23 of the personal authentication system according to the first embodiment is equipped with a fingerprint image resolution converting section (biometrics information converting section) 231. This fingerprint image resolution converting section 231 is made to convert fingerprint image data acquired through the fingerprint inputting section 22 into a state acquired at a predetermined resolution (predetermined acquisition condition), that is, image data with a predetermined resolution. The fingerprint characteristic data extracting section 31 extracts fingerprint characteristic data from the image data after the conversion by the fingerprint image resolution converting section 231.

Figure 3:
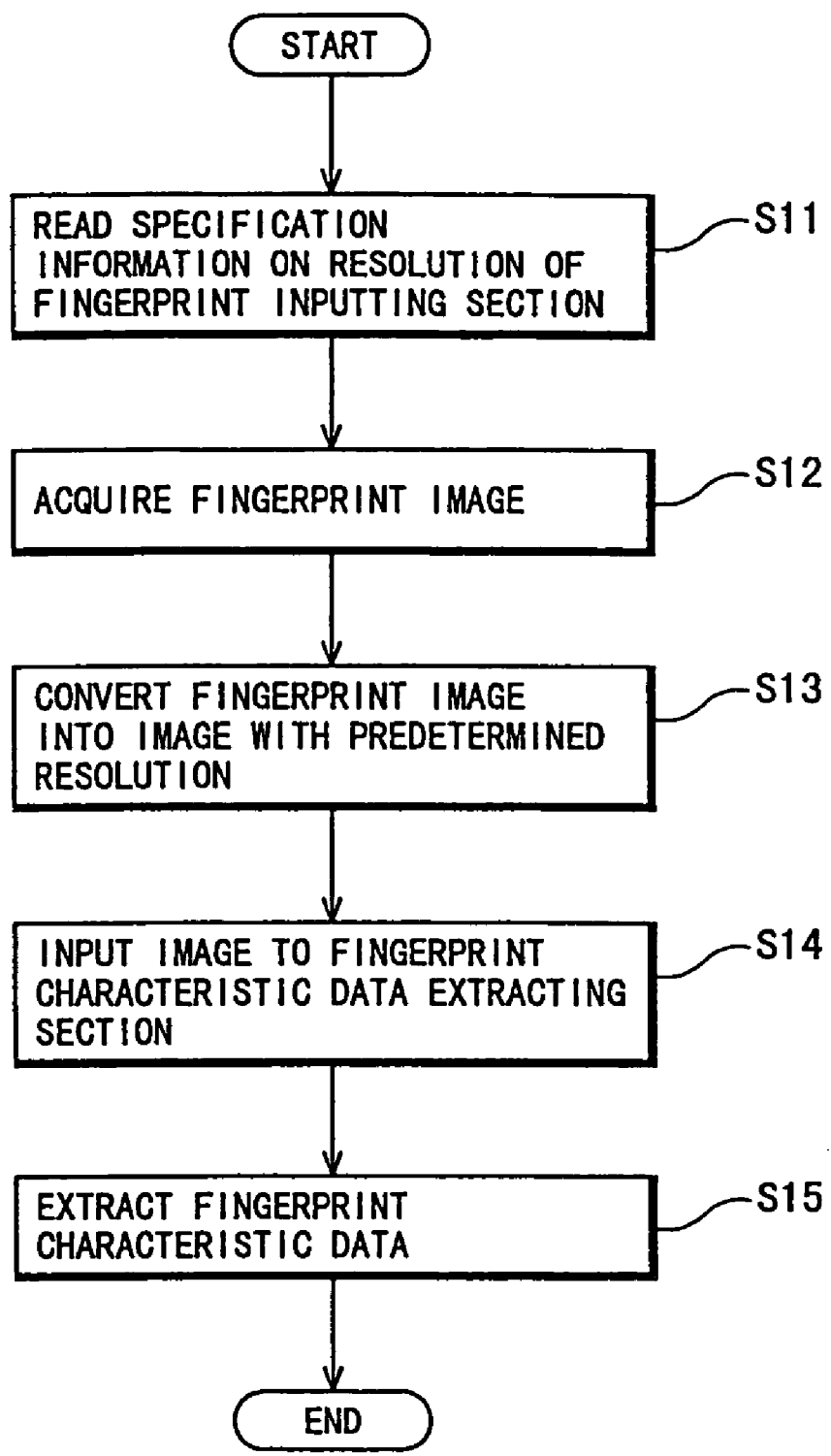
FIG. 3 is a flow chart useful for explaining an operation of the personal authentication system according to the first embodiment.

Secondly, an operation of the personal authentication system according to the first embodiment will be described hereinbelow with reference to a flow chart of FIG. 3.

First of all, the fingerprint image input control section 23 reads resolution specification information in the fingerprint inputting section 22 (step S11) and subsequently controls the fingerprint inputting section 22 to acquire fingerprint image data therefrom (step S12).

The fingerprint image resolution converting section 231 of the fingerprint image input control section 23 converts the acquired fingerprint image data into image data with a predetermined resolution (step S13) and inputs it to the fingerprint characteristic data extracting section 31 (step S14), with the fingerprint characteristic data extracting section 31 extracting fingerprint characteristic data from the image data (step S15).

In this way, fingerprint data with a constant resolution is inputted to the fingerprint characteristic data extracting section 31 at all times, and even if a change of resolution specifications of the fingerprint inputting section 22 takes place, it is possible to forward a fingerprint image with a constant resolution to the fingerprint characteristic data extracting section 31. Accordingly, the fingerprint characteristic data extracted by the fingerprint characteristic data extracting section 31 does not depend upon the resolution specifications of the fingerprint inputting section 22, and even if a fingerprint inputting section 22 having a different resolution is put to use, this produces interchangeability in verification.

As mentioned above, in the personal authentication system according to the first embodiment, since the resolution of the fingerprint image data to be inputted to the fingerprint characteristic data extracting section 31 assumes a predetermined value at all times, not only the registration fingerprint characteristic data (registration biometrics characteristic data) to be previously registered and preserved in the fingerprint characteristic data registering section 32 but also the verification fingerprint characteristic data (fingerprint characteristic data for verification biometrics characteristic data) to be supplied to the fingerprint characteristic data verifying section 33 are extracted from image data with the same resolution. Accordingly, even if a change of resolution of the fingerprint inputting section (fingerprint inputting device 20) takes place, there is no need to make a request for fingerprint (biometrics information) re-registration work to a user so that easy update of system version is feasible.

Incidentally, although, in the first embodiment, fingerprint image data is acquired and used as biometrics information, it is also possible to acquire and use time series data such as voice, keystroke or dynamic signature. In this case, instead of the fingerprint inputting section 22, a biometrics information inputting section is provided to obtain the time series data as biometrics information. Additionally, since the sampling period (sampling frequency) of the time series data corresponds to the resolution of image data, in place of the fingerprint image resolution converting section 231, a biometrics information converting section is provided to convert the acquired time series data into time series data with a predetermined sampling period.

[2] Description of Second Embodiment

Figure 4:
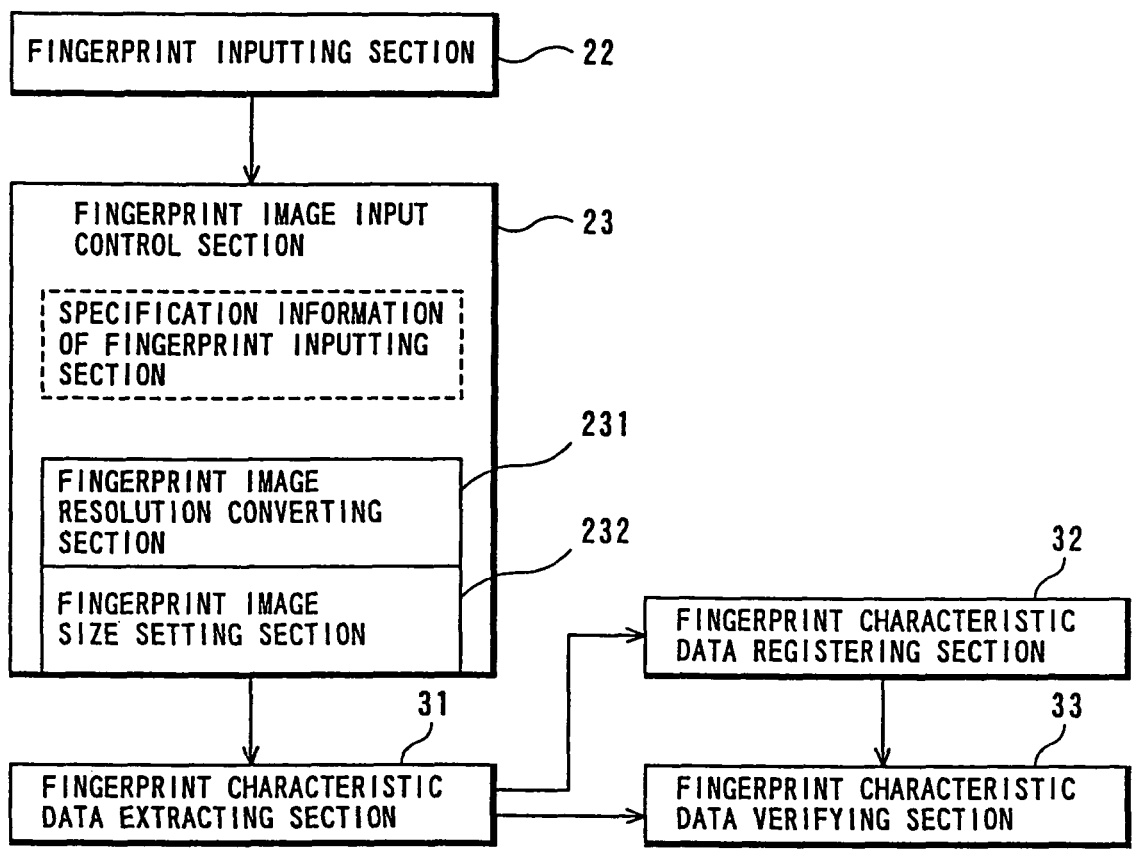
FIG. 4 is a block diagram showing a configuration of an essential part of a personal authentication system using biometrics information according to the second embodiment of the invention.

FIG. 4 is a block diagram showing a configuration of an essential part of a personal authentication system using biometrics information according to the second embodiment of the present invention. In FIG. 4, the same reference numerals as those used above designate the same or substantially same parts, and the detailed description thereof will be omitted for brevity. In addition, the control section 21, the I/O. control section 24 and the fingerprint verification result outputting section 34 shown in FIG. 1 are omitted from the illustration.

As FIG. 4 shows, a fingerprint image input control section of the personal authentication system according to the second embodiment includes a fingerprint image resolution converting section (biometrics information converting section) 231 and a fingerprint image size setting section (biometrics information converting section) 232. The fingerprint image resolution converting section 231 is for converting fingerprint image data acquired through a fingerprint inputting section 22 into a state acquired at a predetermined resolution (predetermined acquisition, condition), that is, image data with a predetermined resolution, while the fingerprint image size setting section 232 is for converting fingerprint image data acquired through the fingerprint inputting section 22 into image data with predetermined numbers of pixels in vertical/horizontal directions (Y direction/X direction) (or an aspect ratio; a predetermined acquisition condition) and foe setting that image data. That is, in the second embodiment, the fingerprint image resolution converting section 231 and the fingerprint image size setting section 232 are designed to convert fingerprint image data into image data always having a predetermined resolution and predetermined numbers of pixels in vertical direction/horizontal direction. In addition, in the second embodiment, the fingerprint characteristic data extracting section 31 extracts fingerprint characteristic data from the image data undergoing the aforesaid conversion in the fingerprint image input control section 23.

Figure 5:
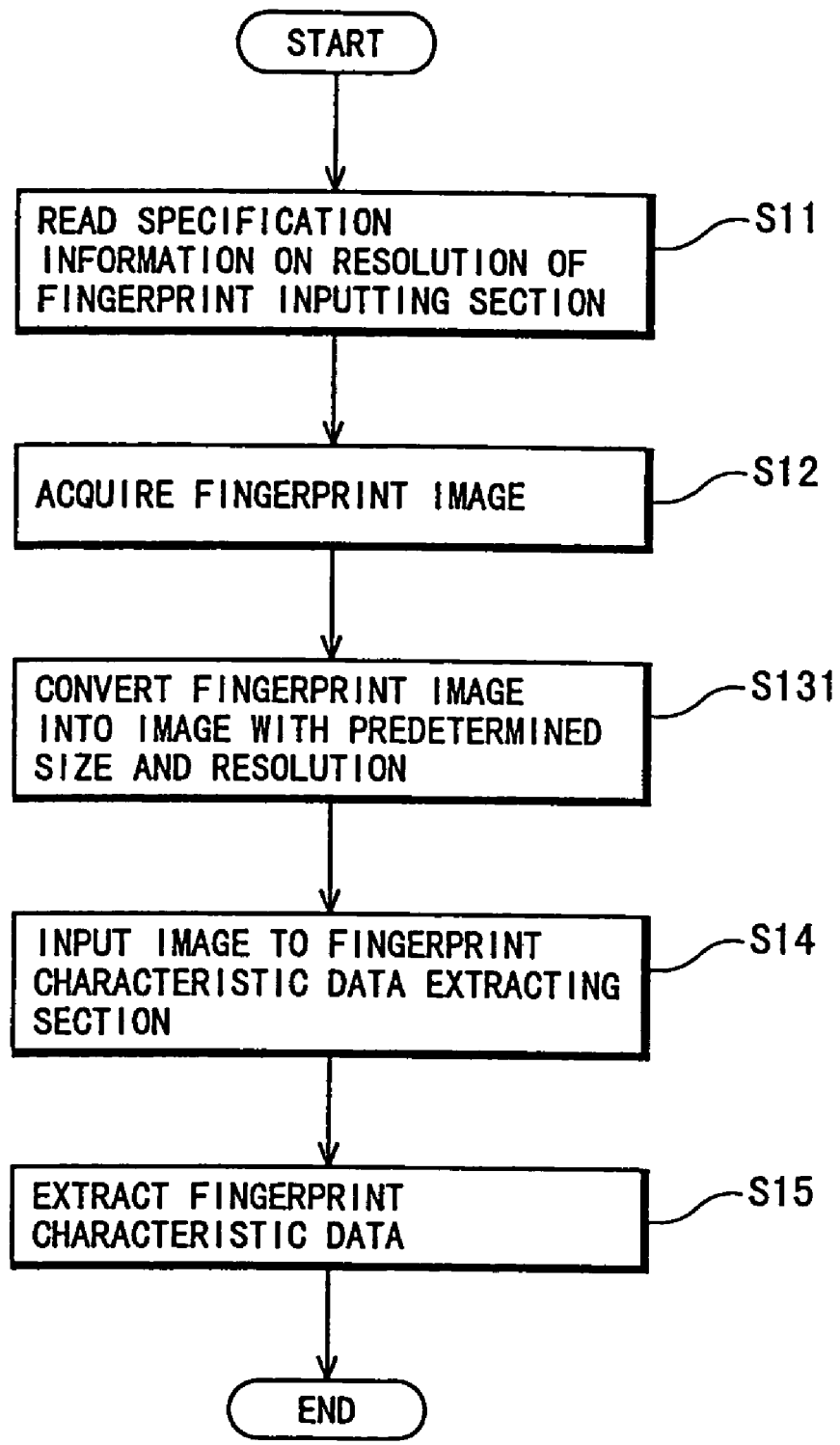
FIG. 5 is a flow chart useful for explaining an operation of the personal authentication system according to the second embodiment.

Secondly, referring to a flow chart of FIG. 5, a description will be given hereinbelow of an operation of the authentication system according to the second embodiment.

First, as in the case of the first embodiment, the fingerprint image input control section 23 reads resolution specification information from the fingerprint inputting section 22 (step S11), and controls the fingerprint inputting section 22 to acquire fingerprint image data (step S12).

The finger print image resolution converting section 231 of the fingerprint image input control section 23 converts the fingerprint image data acquired into image data with a predetermined resolution, and the fingerprint image size setting section 232 converts it into image data with predetermined numbers of pixels in vertical/horizontal directions (aspect ratio) (step S131), and then puts the converted image data in the fingerprint characteristic data extracting section 31 (step S14) where fingerprint characteristic data is extracted from the image data (step S15).

In this way, fingerprint image data with a constant resolution and constant numbers of pixels in vertical/horizontal directions is always inputted to the fingerprint characteristic data extracting section 31, and even if the specifications of the fingerprint inputting section 22 on the resolution or aspect ratio undergo a change, a fingerprint image according to constant specifications can be sent to the fingerprint characteristic data extracting section 31. Accordingly, the fingerprint characteristic data extracted in the fingerprint characteristic data extracting section 31 does not depend upon the specifications regarding the resolution and aspect ratio of the fingerprint inputting section 22, and even if a fingerprint inputting section 22 having a different resolution/aspect ratio is put to use, this provides the interchangeability in verification.

As stated above, in the personal authentication system according to the second embodiment, since the fingerprint image data to be inputted to the fingerprint characteristic data extracting section 31 is not only converted into a predetermined resolution at all times but also converted through the fingerprint image size setting section 232 into a predetermined size, the result is that both the registration fingerprint characteristic data (registration biometrics characteristic data) to be previously registered and preserved in the fingerprint characteristic data registering section 32 and verification fingerprint characteristic data (verification biometrics characteristic data) to be supplied to the fingerprint characteristic data verifying section 33 are extracted from image data of the same resolution and the same size. Accordingly, even if a change of specifications of the fingerprint inputting section 22 (fingerprint inputting device 20) regarding the resolution and aspect ratio takes place, there is no need to request for fingerprint (biometrics information) re-registration work to a user, which facilitates update of system version.

Also in the second embodiment, although fingerprint image data is acquired and used as biometrics information, it is also possible to acquire and use time series data such as voice, keystroke or dynamic signature. In this case, as mentioned above, the sampling period (sampling frequency) of the time series data corresponds to the resolution of the image data, while the acquisition time (measurement time length) of the time series data corresponds to the image size of the image data.

[3] Description of Third Embodiment

Figure 6:
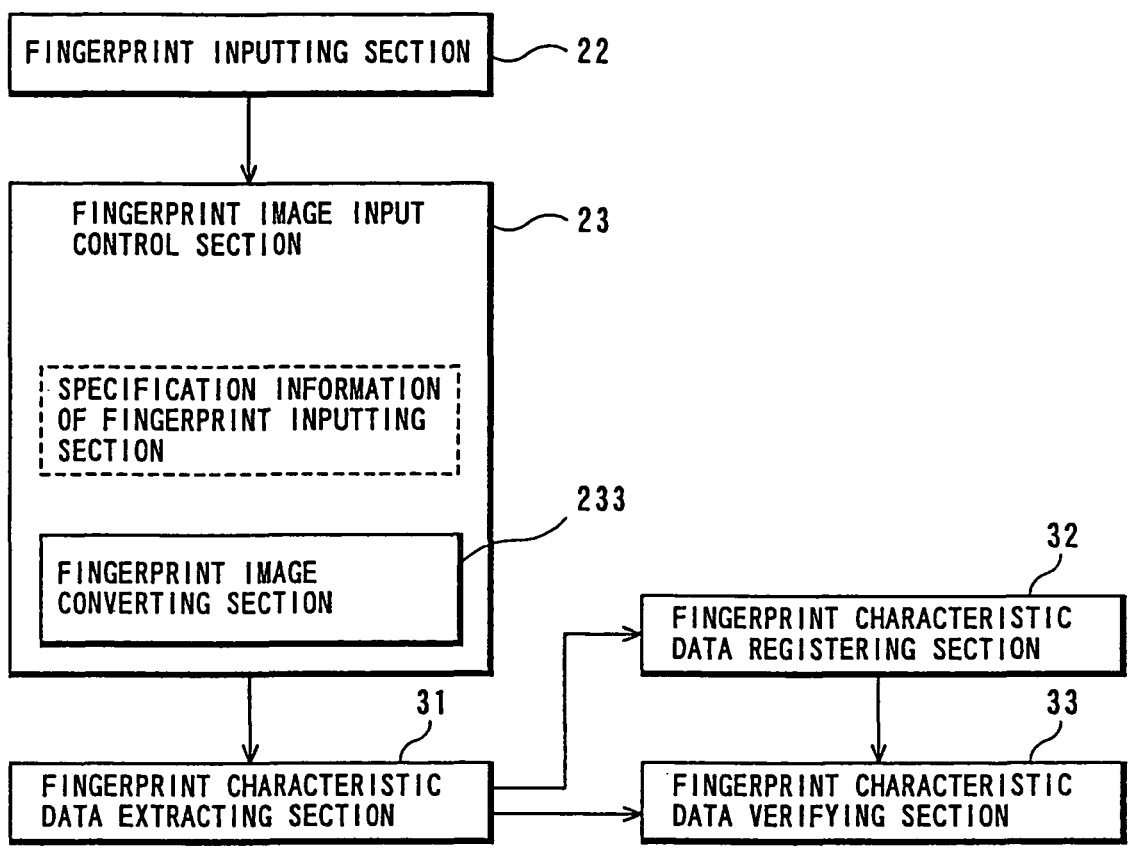
FIG. 6 is a block diagram showing a configuration of an essential part of a personal authentication system using biometrics information according to the third embodiment of the invention.

FIG. 6 is a block diagram showing a configuration of an essential part of a personal authentication system using biometrics information according to the third embodiment of the present invention. In FIG. 6, the same reference numerals as those used above designate the same or substantially same parts, and the detailed description thereof will be omitted for brevity. In addition, the control section 21, the I/O control section 24 and the fingerprint verification result outputting section 34 shown in FIG. 1 are omitted from the illustration.

As FIG. 6 shows, a fingerprint image input control section 23 of the personal authentication system according to the third embodiment includes a fingerprint image converting section (biometrics information converting section) 233. This fingerprint image converting section 233 is made to convert fingerprint image data, acquired through a fingerprint inputting section 22, into image data with a predetermined image property (for example, an image gradation or an image gain coefficient; a predetermined acquisition condition). As this fingerprint image converting section 233 is used an image preprocessor (image preparation section) contained in a fingerprint inputting device 20. Additionally, a fingerprint characteristic data extracting section 31 in the third embodiment is made to extract fingerprint characteristic data from image data undergoing conversion by the fingerprint image converting section 233.

Figure 7:
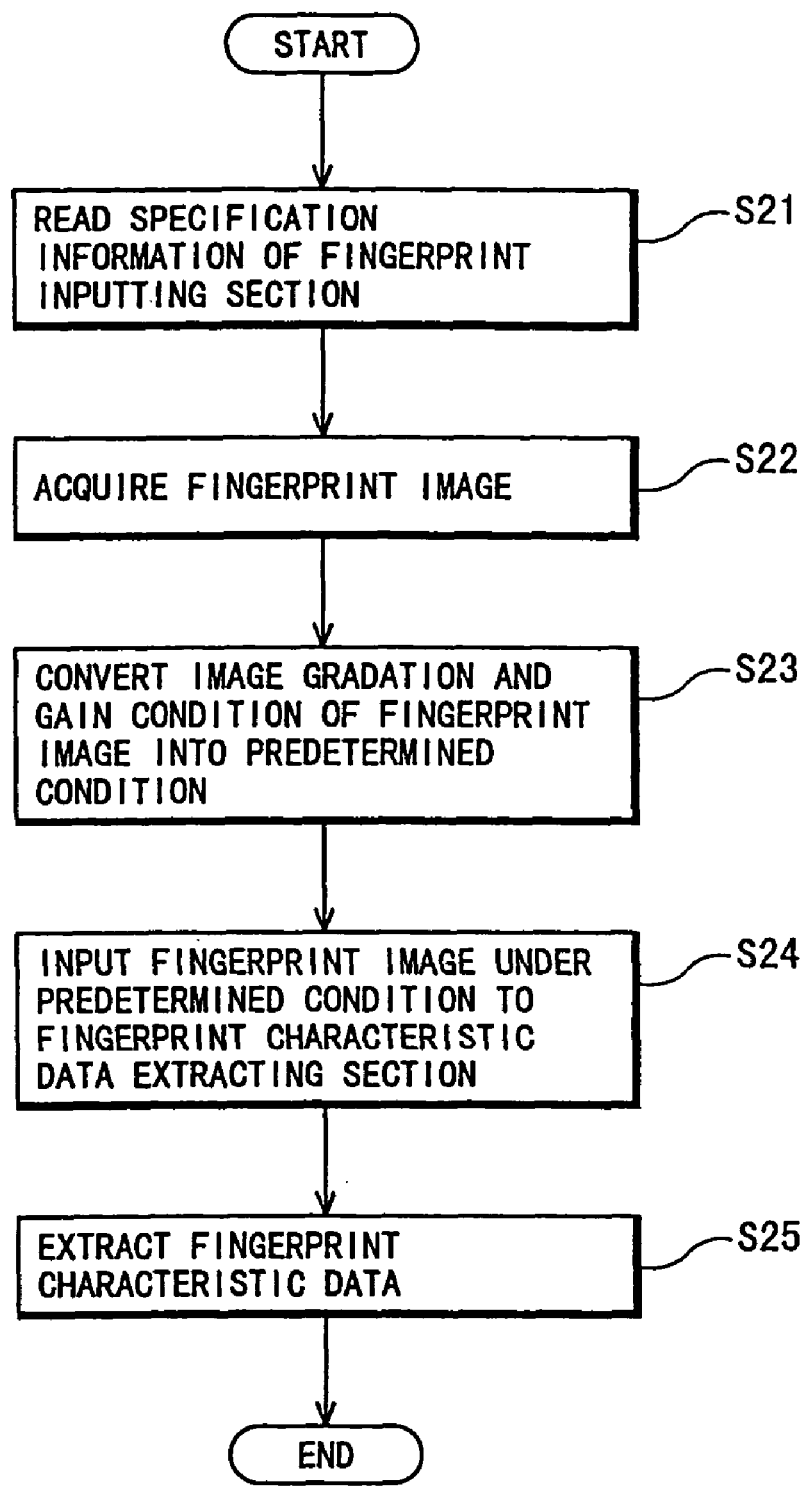
FIG. 7 is a flow chart useful for explaining an operation of the personal authentication system according to the third embodiment.

Secondly, referring to a flow chart of FIG. 7, a description will be given hereinbelow of an operation of the personal authentication system according to the third embodiment.

First, the fingerprint image input control section 23 reads information on specifications of the fingerprint inputting section 22 (step S21), and subsequently controls the fingerprint inputting section 22 to acquire fingerprint image data (step S22).

The fingerprint image converting section 233 of the fingerprint image input control section 23 converts the acquired fingerprint image data into image data with a predetermined image property (an image gradation and a gain condition) on the basis of the information on the specifications of the fingerprint inputting section 22 (step S23), and then puts it in the fingerprint characteristic data extracting section 31 (step S24), where fingerprint characteristic data is extracted from the image data (step S25).

In this way, since fingerprint image data with a constant image property is inputted to the fingerprint characteristic data extracting section 31 at all times, even if a change of specifications of the fingerprint inputting section 22 related to the image properties takes place, it is possible to forward a fingerprint image with a constant image property to the fingerprint characteristic data extracting section 31. Accordingly, since the fingerprint characteristic data extracted in the fingerprint characteristic data extracting section 31 does not depend upon the specifications of the fingerprint inputting section 22 related to the image properties, even if a fingerprint inputting section 22 having a different image property is put to use, the interchangeability in verification is obtainable.

As stated above, in the personal authentication system according to the third embodiment, since the image gradation or image gain coefficient of the fingerprint image data to be inputted to the fingerprint characteristic data extracting section 31 always assumes a predetermined value, the result is that both the registration fingerprint characteristic data (registration biometrics characteristic data) to be previously registered and preserved in the fingerprint characteristic data registering section 32 and verification fingerprint characteristic data (verification biometrics characteristic data) to be supplied to the fingerprint characteristic data verifying section 33 are extracted from image data of the same resolution and the same size.

Accordingly, even if a change of specifications of the fingerprint inputting section 22 regarding the image property (for example, image data acquisition mode) takes place, there is no need to request for fingerprint (biometrics information) re-registration work to a user, which facilitates update of system version. More specifically, with the personal authentication system according to the third embodiment of the present invention, the verification decision on an fingerprint image captured according to an optical method and a fingerprint image captured according to a capacitance method can be made through the use of the same system.

[4] Description of Fourth Embodiment

Figure 8:
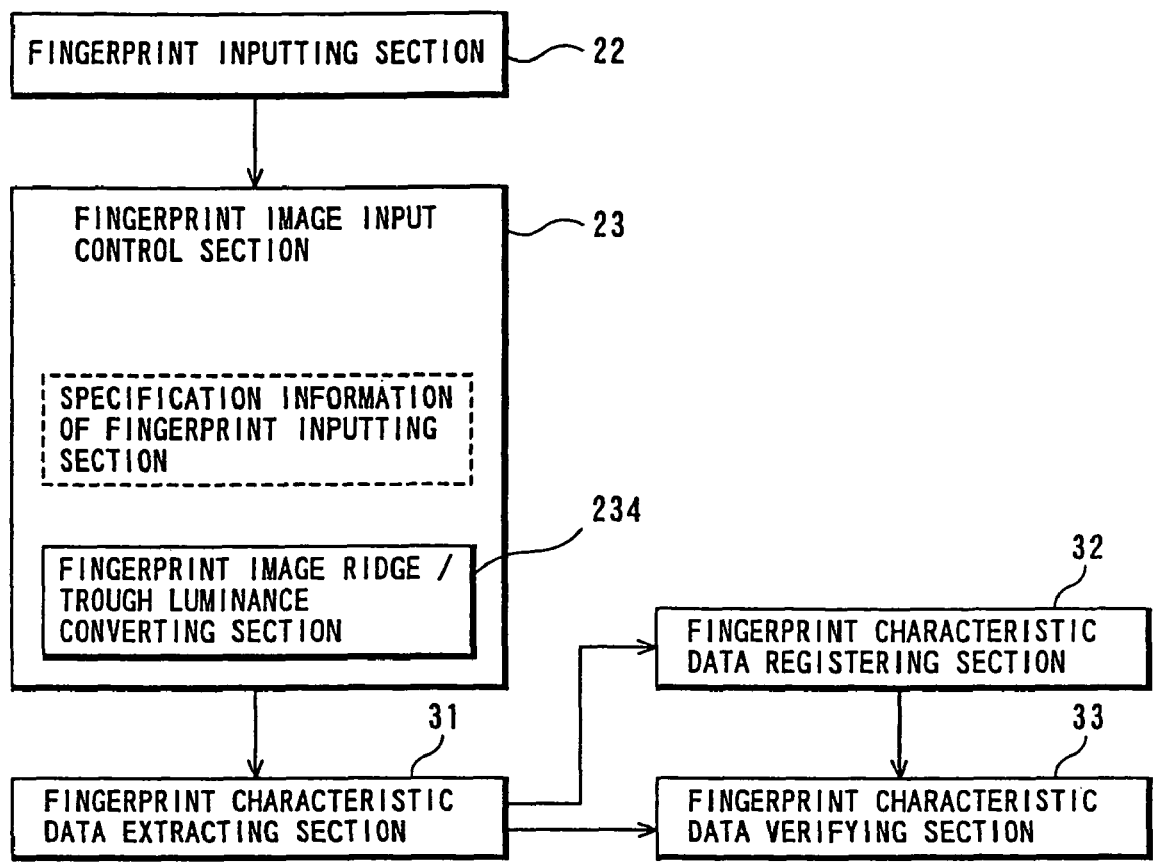
FIG. 8 is a block diagram showing a configuration of an essential part of a personal authentication system using biometrics information according to the fourth embodiment of the invention.

FIG. 8 is a block diagram showing a configuration of an essential part of a personal authentication system using biometrics information according to the fourth embodiment of the present invention. In FIG. 8, the same reference numerals as those used above designate the same or substantially same parts, and the detailed description thereof will be omitted for simplicity. Likewise, the control section 21, the I/O control section 24 and the fingerprint verification result outputting section 34 are omitted from the illustration of FIG. 8.

As FIG. 8 shows, a fingerprint image input control section 23 of the personal authentication system according to the fourth embodiment incorporates a fingerprint image ridge/trough luminance converting section (biometrics information converting section) 234. This fingerprint image ridge/trough luminance converting section 234 is for converting fingerprint image data captured through a fingerprint inputting section 22 into image data with a predetermined ridge-trough brightness relationship (relationship in luminance; for example, light indicates ridge lines while darkness indicates trough lines, or darkness indicates ridge lines while light indicates trough lines). Additionally, a fingerprint characteristic data extracting section 31 in the fourth embodiment extracts fingerprint characteristic data from the image data undergoing the conversion by the fingerprint image ridge/trough luminance converting section 234.

Figure 11A:
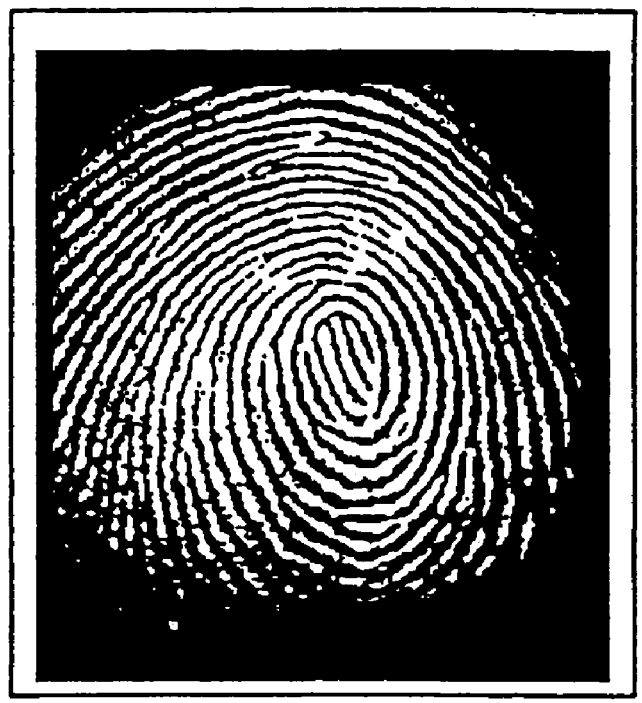
FIGS. 11A and 11B are illustrations of concrete examples of fingerprint.
Figure 11B:

A description of this fourth embodiment relates to an example peculiar to a fingerprint image. As fingerprint acquisition methods, there have been known various modes, such as a prism mode (exemplified by Japanese Patent Laid-Open No. SHO 63-228271) in which darkness indicates fingerprint ridge lines while light indicates fingerprint trough lines, a prism mode (exemplified by Japanese Patent Laid-Open No. SHO 58-144280) in which light indicates fingerprint ridge lines while darkness indicates fingerprint trough lines, a parallel flat-plate mode (exemplified by Japanese Patent Laid-Open No. HEI 1-321576) in which light indicates fingerprint ridge lines while darkness indicates fingerprint trough lines, a mode of detecting irregularities of a fingerprint by means of capacitance and a mode of detecting irregularities of a fingerprint using an ultrasonic wave. Thus, the brightness relationship (relationship in luminance) between ridge lines (high) and trough lines in a fingerprint image captured through the fingerprint inputting section 22 varies with a fingerprint image acquiring device of each maker. FIG. 11A shows a concrete example of a fingerprint image in which light represents ridge lines (crests) while darkness represents trough lines, and FIG. 11B illustrates a concrete example of a fingerprint image in which darkness represents ridge lines (crests) while light represents trough lines.

For the fingerprint verification, a common way is using fingerprint characteristic points on ridge lines, and in a case in which the luminance relationship inverts, there is a possibility of detecting trough-line characteristic points in a fingerprint image.

For this reason, for putting a fingerprint verifying system into operation under environments in which there exist various fingerprint image acquiring devices (fingerprint inputting sections 22) provided by makers, there is a need to understand certainly the relationship in luminance between fingerprint ridge lines and fingerprint trough lines. Accordingly, as in this embodiment, if a fingerprint image is made to be sent from the fingerprint image input control section 23 to the fingerprint characteristic data extracting section 31 in a predetermined luminance relationship, the foregoing problems are preventable.

Figure 9:
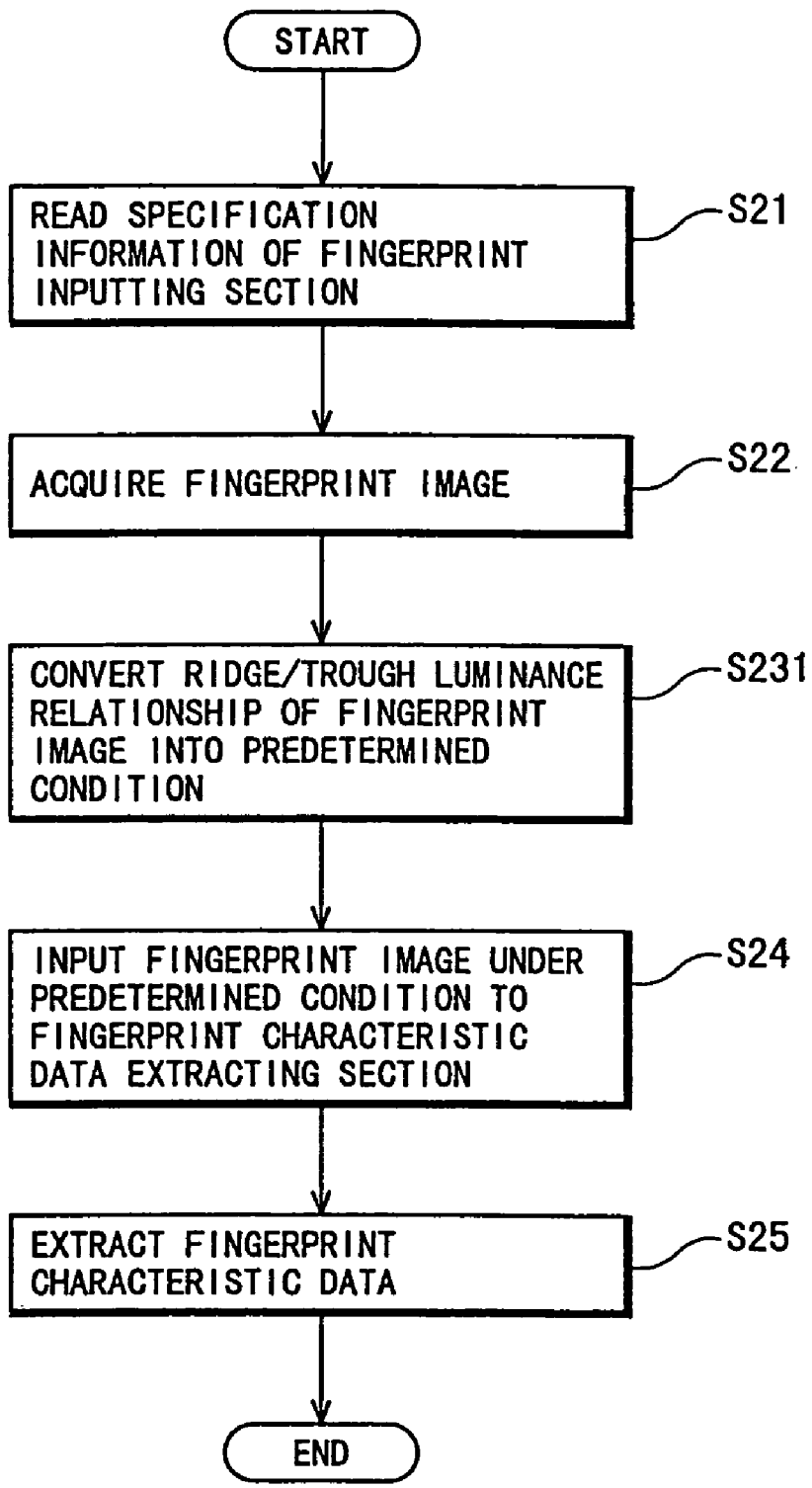
FIG. 9 is a flow chart useful for explaining an operation of the personal authentication system according to the fourth embodiment.

Secondly, with reference to a flow chart of FIG. 9, a description will be given hereinbelow of an operation of the personal authentication system according to the fourth embodiment.

First, the fingerprint image input control section 23 reads information on specifications of the fingerprint inputting section 22 (step S21), and subsequently controls the fingerprint inputting section 22 to acquire fingerprint image data (step S22).

The fingerprint image ridge/trough luminance converting section 234 of the fingerprint image input control section 23 converts, on the basis of the information on specifications of the fingerprint inputting section 22, the acquired fingerprint image data into image data involving a predetermined ridge-trough brightness relationship (step S231), and then puts it in the fingerprint characteristic data extracting section 31 (step S24), where fingerprint characteristic data is extracted from the image data (step S25).

In this way, since fingerprint image data with a constant relationship in brightness between ridge lines and trough lines is inputted to the fingerprint characteristic data extracting section 31, even if a change of the specifications (fingerprint image acquiring device itself) of the fingerprint inputting section 22 takes place, a fingerprint image showing a constant brightness relationship can be fed to the fingerprint characteristic data extracting section 31. Accordingly, the fingerprint characteristic data extracted in the fingerprint characteristic data extracting section 31 does not depend upon the specifications of the fingerprint inputting section 22 or makers, which provides the interchangeability in verification also in the case of using a fingerprint inputting section 22 of different specifications/makers.

As described above, in the personal authentication system according to the fourth embodiment, since the ridge lines/trough lines in a fingerprint image to be inputted to the fingerprint characteristic data extracting section 31 show a predetermined brightness relationship at all times, it is possible to prevent certainly the detection of trough line characteristic points in a fingerprint image in error, and even if a change of specification/maker of the fingerprint inputting section 22 takes place, a need for re-registration work of fingerprints (biometrics information) to users does not exist, which facilitates update of system version.

In the above-described fourth embodiment, although the fingerprint image input control section 23 reads the information about the specifications of the fingerprint inputting section 22 and makes a decision on the ridge-trough brightness relationship in a fingerprint image captured through the fingerprint inputting section 22, it is also appropriate that the fingerprint image input control section 23 has a function of a brightness relationship deciding section to make a decision on the ridge-trough brightness relationship in the fingerprint image captured through the fingerprint inputting section 22 and the fingerprint image ridge/trough luminance converting section 234 performs image data conversion in accordance with the decision result of the brightness relationship deciding section. At this time, concretely, the brightness relationship deciding section measures the difference in luminance between an image captured when a finger is not placed on a fingerprint inputting surface and an image captured when a finger is placed on the fingerprint inputting surface, and makes a decision on the luminance relationship between ridge lines and trough lines.

Figure 10:
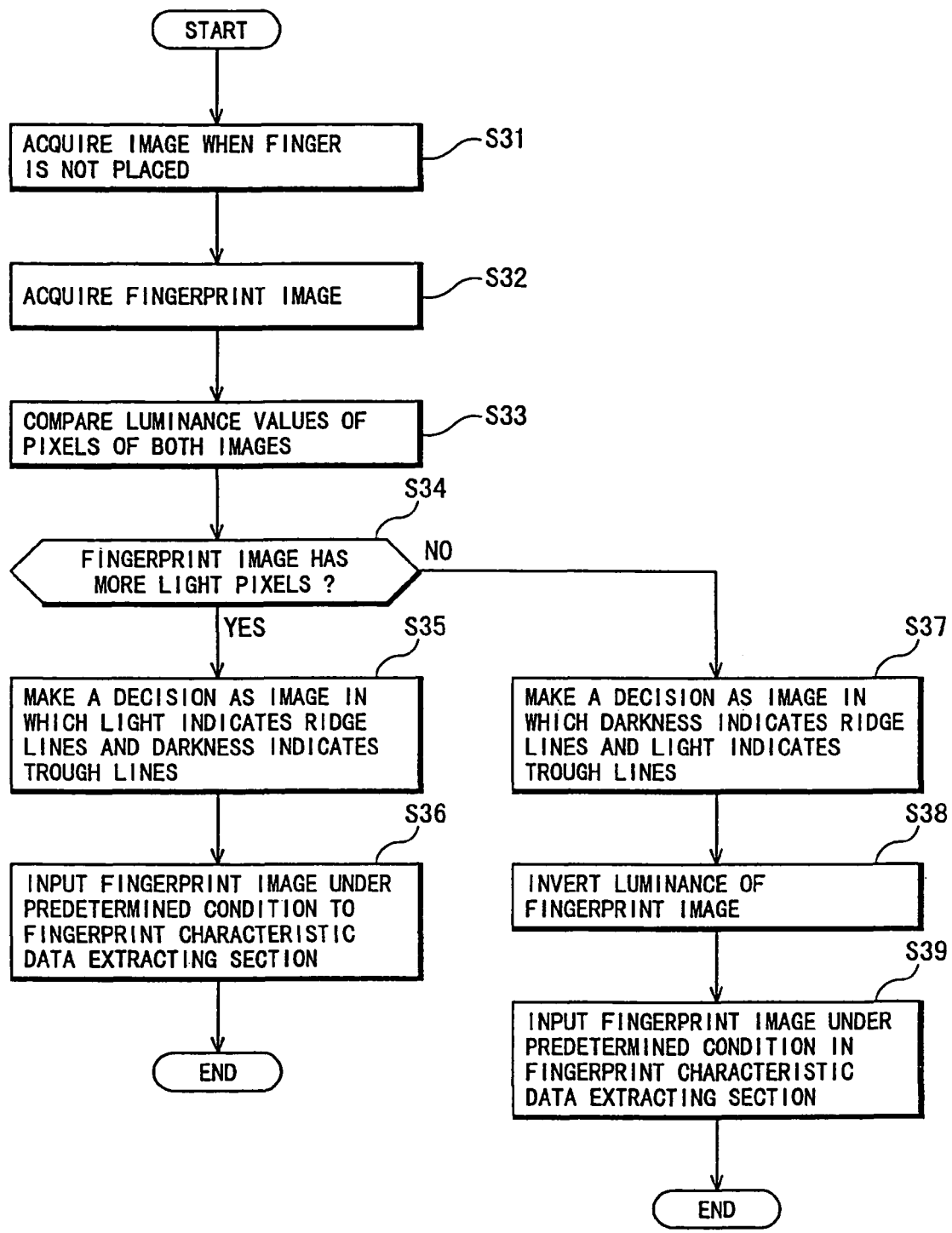
FIG. 10 is a flow chart useful for explaining an operation of a modification of the personal authentication system according to the fourth embodiment.

With reference to a flow chart of FIG. 10, a description will be given hereinbelow of an operation of a personal authentication system incorporating such a brightness relationship deciding section. In FIG. 10, a predetermined brightness relationship is shown such that light denotes ridge lines while darkness denotes trough lines.

First, the fingerprint image input control section 23 acquires an image when a ginger is not placed on the fingerprint inputting surface of the fingerprint inputting section 22 (step S31) and controls the fingerprint inputting section 22 to acquire image data on a fingerprint (step S32).

Furthermore, the fingerprint image input control section 23 makes a comparison in luminance between both the images acquired in the steps S31 and S32 (step S33), and when the fingerprint image acquired in the step S32 has more light pixels (YES route from step S34), makes a decision that, in the fingerprint image, ridge lines are light while trough lines are dark (step S35), and further puts that fingerprint image directly in the fingerprint characteristic data extracting section 31 (step S36) which in turn, extracts fingerprint characteristic data from the image data.

On the other hand, when the image acquired in the step S31 has more light pixels (NO route from step S34), the fingerprint image input control section 23 makes a decision that, in the fingerprint image, the ridge lines are dark while trough lines are light (step S37), and inversely converts the brightness relationship (luminance relationship) in that fingerprint image through the use of the fingerprint image ridge/trough luminance converting section 234 (step S38), and further puts the fingerprint image in the fingerprint characteristic data extracting section 31 (step S39) which in turn, extracts fingerprint characteristic data from the image data.

Also in this case, the effects similar to those of the above-described fourth embodiment are obtainable.

Incidentally, in the example shown in FIG. 10, although the conversion of the fingerprint image is made so that light indicates ridge lines while darkness indicates trough lines, naturally the brightness relationship can also be set reversely.

[5] Description of Fifth Embodiment

FIG. 12 is a block diagram showing a configuration of an essential part of a personal authentication system using biometrics information according to the fifth embodiment of the present invention. In FIG. 12, the same reference numerals as those used above designate the same or almost same parts, and the detailed description thereof will be omitted for simplicity. Likewise, the control section 21, the I/O control section 24 and the fingerprint verification result outputting section 34 are omitted from the illustration of FIG. 12.

The personal authentication system according to the fifth embodiment is characterized in that an image acquisition condition is attached to a fingerprint image when that fingerprint image is sent to a fingerprint characteristic data extracting section 31, instead of the resolutions or sizes of fingerprint images being set to each other in the fingerprint image input control section 23 before the transmission of the fingerprint images to the fingerprint characteristic data extracting section 31 as in the case of the first and second embodiments. In this case, the image acquisition condition involves, for example, resolution, gradient, number of vertical/horizontal pixels (image size, aspect ratio) or image gain characteristic. This image acquisition condition is selected properly according to the verification mode. Additionally, in the fifth embodiment, the fingerprint characteristic data extracting section 31 internally conducts an image conversion of an inputted fingerprint image in accordance with the acquisition condition attached thereto and starts the characteristic extraction under a predetermined image condition made.

Therefore, as FIG. 12 shows, a fingerprint image input control section 23 of the personal authentication system according to the fifth embodiment is equipped with a fingerprint image acquisition condition attaching section (acquisition condition attaching section) 235. This fingerprint image acquisition condition attaching section 235 is for attaching or affixing, to a fingerprint image captured through a fingerprint inputting section 22 and to be inputted to the fingerprint characteristic data extracting section 31, an image acquisition condition (in this embodiment, resolution and numbers of vertical/horizontal pixels) related to or for that fingerprint image. Additionally, in the fifth embodiment, the fingerprint characteristic data extracting section 31 functions as a biometrics information converting section to, before extracting fingerprint characteristic data from the fingerprint image, convert the fingerprint image into a state to be acquired under a predetermined image acquisition condition, on the basis of the image acquisition condition attached to the fingerprint image. In this embodiment, the function of this biometrics information converting section accomplishes a conversion of a fingerprint image into image data with a predetermined resolution and predetermined numbers of pixels in vertical/horizontal directions.

Figure 13:
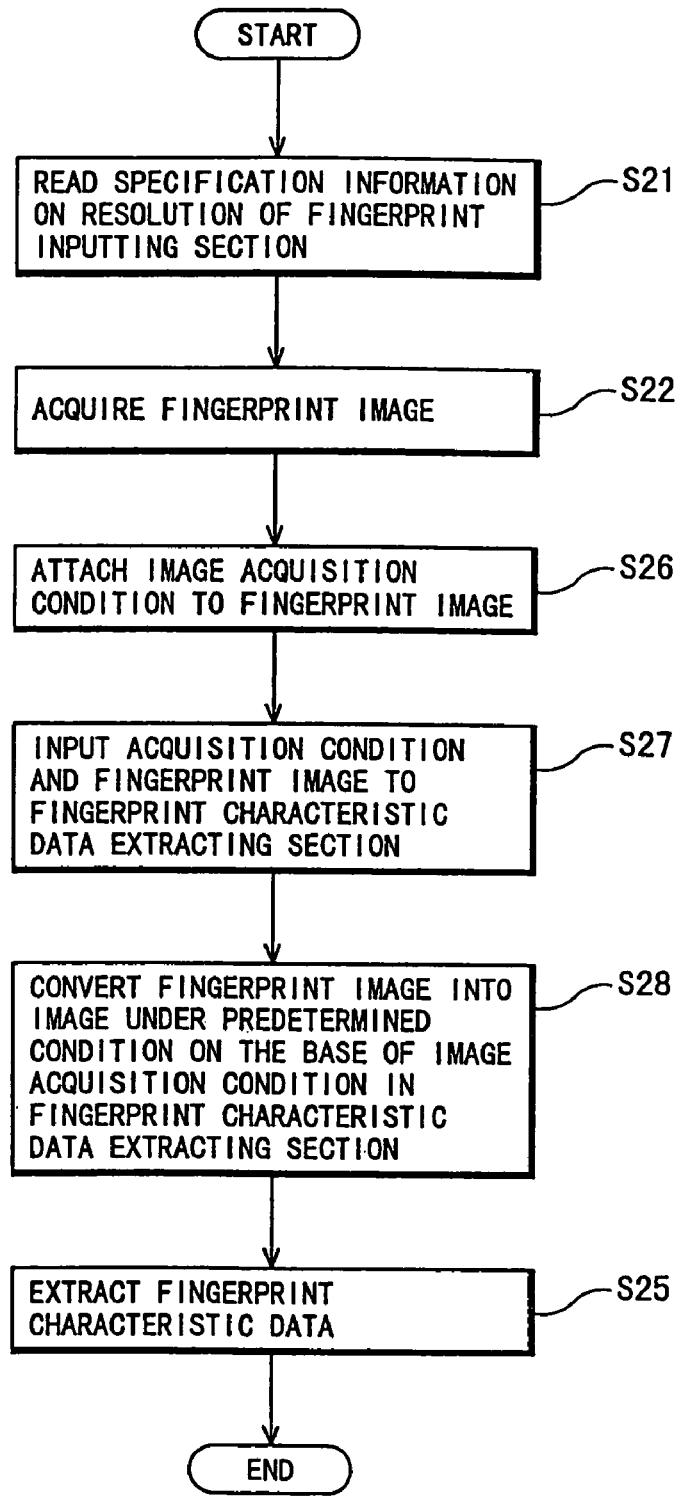
FIG. 13 is a flow chart useful for explaining an operation of the personal authentication system according to the fifth embodiment.

Secondly, with reference to a flow chart of FIG. 13, a description will be given hereinbelow of an operation of the personal authentication system according to the fifth embodiment.

First, the fingerprint image input control section 23 reads the information on specifications of the fingerprint inputting section 22 (step S21) and then controls the fingerprint inputting section 22 to acquire fingerprint image data (fingerprint image) (step S22), while the fingerprint image acquisition condition attaching section 235 attaches an image acquisition condition (resolution and numbers of vertical/horizontal pixels) included in the aforesaid specification information to a fingerprint image (step S26) and puts that fingerprint image in the fingerprint characteristic data extracting section 31 (step S27).

Furthermore, in the fingerprint characteristic data extracting section 31, the aforesaid function as a biometrics information converting section converts the fingerprint image into image data having a predetermined resolution and predetermined numbers of pixels in vertical/horizontal directions, on the basis of the resolution and numbers of vertical/horizontal pixels attached to that fingerprint image (step S28), with fingerprint characteristic data being extracted from the converted fingerprint image (step S25).

In this way, since the fingerprint image having a predetermined resolution and predetermined number of pixels in vertical/horizontal directions is obtainable at all times in the fingerprint characteristic data extracting section 31, even if a change of specifications of the fingerprint inputting section 22 regarding the resolution or aspect ratio takes place, fingerprint characteristic data is extractable from a fingerprint image with constant specifications. Accordingly, the extracted fingerprint characteristic data does not depend upon the specifications of the fingerprint inputting section 22 regarding the resolution and the aspect ratio, and even if a fingerprint inputting section 22 having a different resolution/aspect ratio is put to use, this provides interchangeability in verification.

As stated above, in the personal authentication system according to the fifth embodiment, since both the registration fingerprint characteristic data (registration biometrics characteristic data) to be previously registered and preserved in the fingerprint characteristic data registering section 32 and verification fingerprint characteristic data (verification biometrics characteristic data) to be supplied to the fingerprint characteristic data verifying section 33 are extracted from image data of the same resolution and the same size, even if a change of specifications of the fingerprint inputting section 22 (fingerprint inputting device 20) regarding the resolution and the aspect ratio takes place, there is no need to request for fingerprint (biometrics information) re-registration work to a user, which facilitates update of system version.

Incidentally, although the above description of the fifth embodiment has been made in the case in which fingerprint image data is acquired and used as biometrics information, it is also possible that time series data such as voice, keystroke or dynamic signature is acquired and used as the biometrics information. In this case, as mentioned above, the sampling period (sampling frequency) of the time series data corresponds to the resolution of the image data, while the acquisition time (measurement time length) of the time series data corresponds to the image size of the image data. Moreover, it is also appropriate that, if the time series data is a voice, a band width is further taken as the acquisition condition in addition to the aforesaid sampling period and acquisition time.

Furthermore, although the above description of the fifth embodiment has been made in the case in which the fingerprint image acquisition condition involves resolution and numbers of pixels in vertical/horizontal directions, it is also appropriate that the fingerprint image acquisition condition attaching section 235 attaches a brightness relationship between ridge lines and trough lines in a fingerprint image as an acquisition condition to that fingerprint image and the fingerprint characteristic data extracting section 31, before extracting fingerprint characteristic data from the fingerprint image, converts the fingerprint image into a fingerprint image with a predetermined brightness relationship on the basis of the brightness relationship attached to the fingerprint image.

Figure 14:
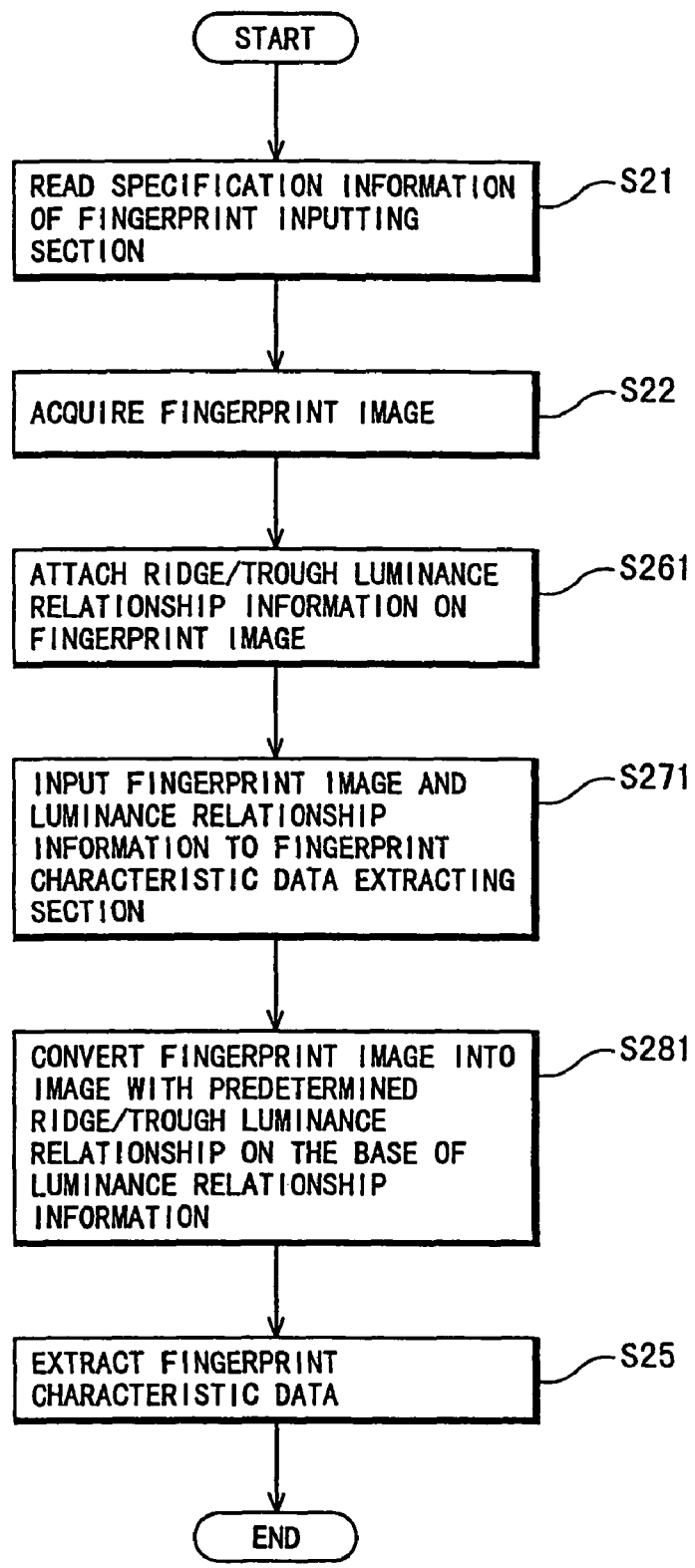
FIG. 14 is a flowchart useful for explaining an operation of a modification of the personal authentication system according to the fifth embodiment.

An operation of the personal authentication system with this arrangement will be described hereinbelow with reference to a flow chart of FIG. 14.

First, the fingerprint image input control section 23 reads the information on specifications of the fingerprint inputting section 22 (step S21) and controls the fingerprint inputting section 22 to acquire fingerprint image data (fingerprint image) (step S22), while the fingerprint image acquisition condition attaching section 235 attaches to the fingerprint image the ridge-trough brightness relationship in the fingerprint image included in the specification information (step S261) and then puts that fingerprint image in the fingerprint characteristic data extracting section 31 (step S271). Further, in the fingerprint characteristic data extracting section 31, a function thereof forming the aforesaid biometrics information converting section converts that fingerprint image into a fingerprint image having a predetermined brightness relationship on the basis of the brightness relationship attached to that fingerprint image (step S281), with fingerprint characteristic data being extracted from the converted fingerprint image (step S25).

In this way, in the fingerprint characteristic data extracting section 31, since a fingerprint image having a constant brightness relationship between ridge lines and trough lines is obtainable at all times, even if a change of the specifications (fingerprint image acquisition device itself) of the fingerprint inputting section 22 takes place, the extraction of fingerprint characteristic data from the fingerprint image with a constant brightness relationship becomes possible. That is, since the extracted fingerprint characteristic data does not depend upon the specifications of the fingerprint inputting section 22 or makers, a fingerprint inputting section 22 of a different specification/maker is put to use, this provides interchangeability in verification. Accordingly, it is possible to certainly prevent a mistaken detection of trough line characteristic points, and irrespective of a change of specification/maker of the fingerprint inputting section 22, a user is nor required to perform fingerprint (biometrics information) re-registration work, which facilitates update of system version.

[6] Description of Sixth Embodiment

Figure 15:
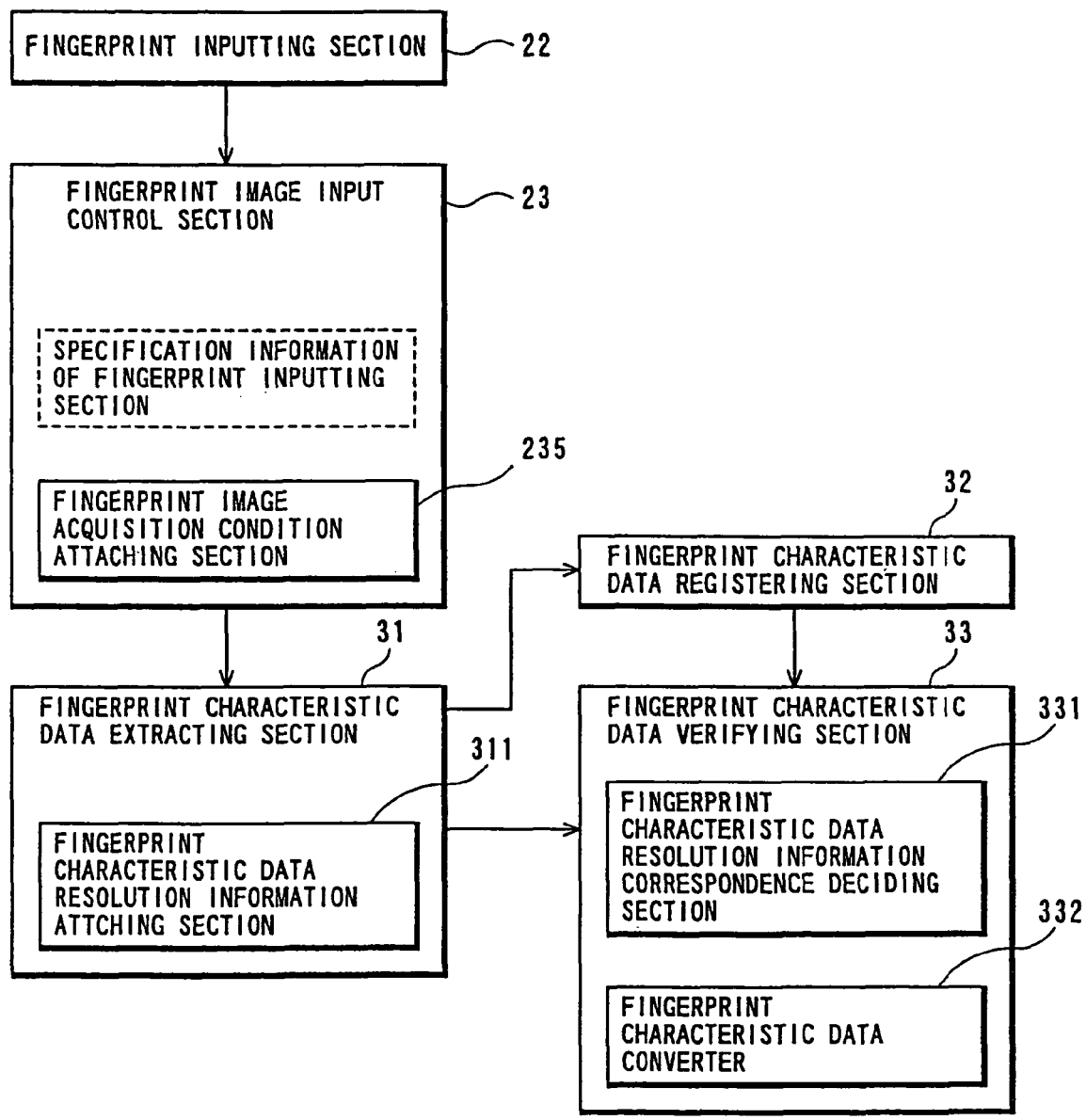
FIG. 15 is a block diagram showing a configuration of an essential part of a personal authentication system using biometrics information according to the sixth embodiment of the invention.

FIG. 15 is a block diagram showing a configuration of an essential part of a personal authentication system using biometrics information according to the sixth embodiment of the present invention. In FIG. 15, the same reference numerals as those used above designate the same or almost same parts, and the detailed description thereof will be omitted for simplicity. Likewise, the control section 21, the I/O control section 24 and the fingerprint verification result outputting section 34 are omitted from the illustration of FIG. 15.

As FIG. 15 shows, in the personal authentication system according to the sixth embodiment, a fingerprint image input control section 23 is equipped with a fingerprint image acquisition condition attaching section 235 similar to that in the above-described fifth embodiment, while a fingerprint characteristic data extracting section 31 is equipped with a fingerprint characteristic data resolution information attaching section (acquisition condition attaching section) 311, and even a fingerprint characteristic data verifying section 33 is provided with a fingerprint characteristic data resolution information correspondence deciding section 331 and a fingerprint characteristic data converter (biometrics characteristic data converting section) 332.

In the sixth embodiment, the fingerprint image acquisition condition attaching section 235 is for attaching, to a fingerprint image acquired through the fingerprint inputting section 22 and to be inputted to the fingerprint characteristic data extracting section 31, a resolution as an image acquisition condition for that fingerprint image.

The fingerprint characteristic data resolution information attaching section 311 is for attaching, to fingerprint characteristic data to be inputted from the fingerprint characteristic data extracting section 31 to the fingerprint characteristic data registering section 32 or the fingerprint characteristic data verifying section 33, a resolution of a fingerprint image from which that fingerprint characteristic data is extracted (an extraction source of that fingerprint characteristic data), as an image acquisition condition. The resolution to be attached here is the resolution attached to an fingerprint image by the fingerprint image acquisition condition attaching section 235.

The fingerprint characteristic data resolution information correspondence deciding section 331 is for making a decision, at a verification of fingerprint characteristic data, on whether or not the resolution attached to verification fingerprint characteristic data from the fingerprint characteristic data extracting section 31 and the resolution attached to registration fingerprint characteristic data from the fingerprint characteristic data registering section.32 are correspondent with (equal to) each other.

The fingerprint characteristic data converter 332 is for, when the decision result of the fingerprint characteristic data resolution information correspondence deciding section 331 indicates no correspondence, before verifying that verification fingerprint characteristic data matches registration fingerprint characteristic data, converting the verification fingerprint characteristic data and the registration fingerprint characteristic data into data identical in resolution to each other, on the basis of the resolutions attached to these fingerprint characteristic data.

At this time, it is also preferred that the fingerprint characteristic data converter 332 converts both the verification fingerprint characteristic data and registration fingerprint characteristic data into data having an appropriate resolution set in advance in order to achieve the correspondence between the resolution of the verification fingerprint characteristic data and the resolution of the registration fingerprint characteristic data, that the fingerprint characteristic data converter 332 converts the verification fingerprint characteristic data into data with a resolution identical to that of the registration fingerprint characteristic data, or that the fingerprint characteristic data converter 332 converts the registration fingerprint characteristic data into data with a resolution equal to that of the verification fingerprint characteristic data. In the following operation description, the fingerprint characteristic data converter 332 is made to convert the verification fingerprint characteristic data into data with a resolution equal to that of the registration fingerprint characteristic data.

Secondly, referring to flow charts of FIGS. 16 and 17, a description will be given hereinbelow of an operation of the authentication system according to the sixth embodiment.

Figure 16:
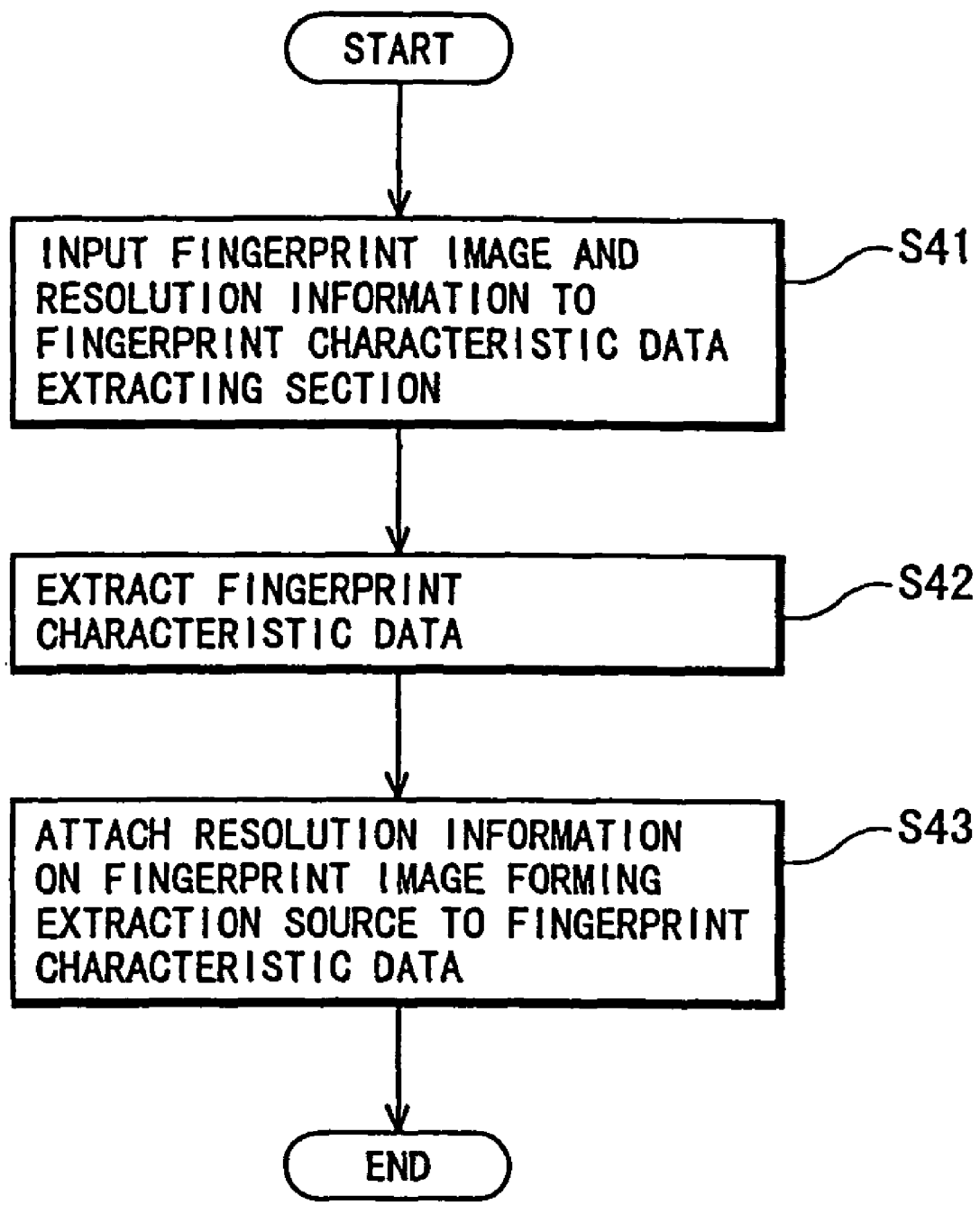
FIGS. 16 and 17 are flow charts useful for explaining an operation of the personal authentication system according to the sixth embodiment.
Figure 17:
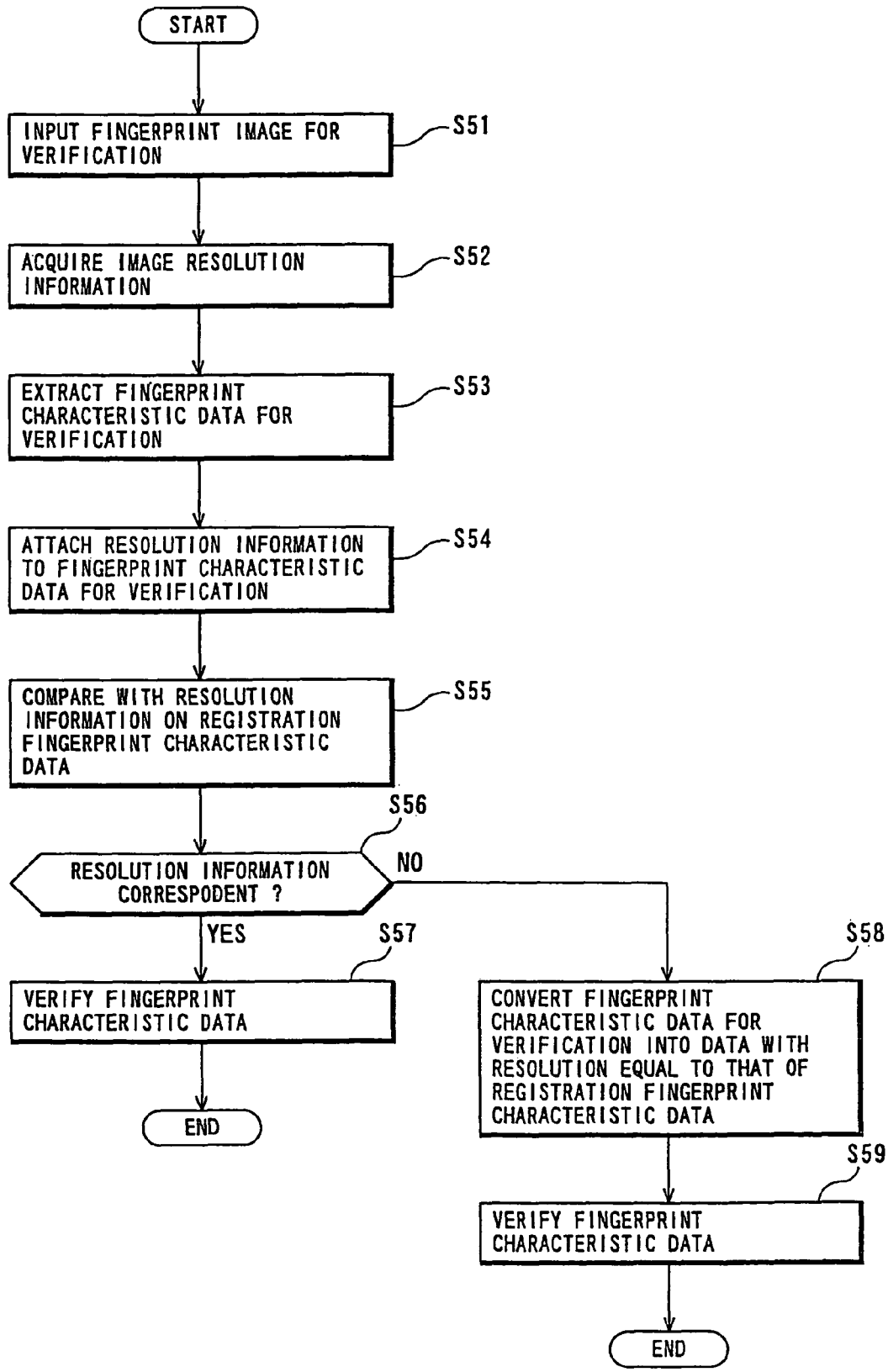

In the fingerprint characteristic data extracting section 31, as FIG. 16 shows, when a fingerprint image having an image acquisition condition (resolution) attached is inputted from the fingerprint image input control section 23 (step S41), fingerprint characteristic data is extracted from that fingerprint image (step S42) and, subsequently, the fingerprint characteristic data resolution information attaching section 311 attaches, to the fingerprint characteristic data, a resolution attached in the fingerprint image input control section 23 (step S43) and puts that fingerprint characteristic data in the fingerprint characteristic data registering section 32 or the fingerprint characteristic data verifying section 33.

Furthermore, the operation of the authentication system according to the sixth embodiment will be described hereinbelow with reference to FIG. 17. When a verification fingerprint image to which an image acquisition condition (resolution) is attached is inputted to the fingerprint characteristic data extracting section 31 (step S51), the resolution of the verification fingerprint image is known from the image acquisition condition (step S52) and verification characteristic data is extracted from that verification fingerprint image (step S53). Additionally, the fingerprint characteristic data resolution information attaching section 311 attaches the resolution, acquired in the step S52, to the verification fingerprint characteristic data (step S54) and then puts that verification fingerprint characteristic data in the fingerprint characteristic data verifying section 33.

The fingerprint characteristic data verifying section 33 reads out registration fingerprint characteristic data on a person forming a subject of verification, registered and preserved in advance in the fingerprint characteristic data registering section 32, and compares the resolution attached to the registration fingerprint characteristic data with the resolution attached to the verification fingerprint characteristic data (step S55), while the fingerprint characteristic data resolution information correspondence deciding section 331 makes a decision as to whether or not these resolutions are equal to each other (step S56).

If these resolutions are equal to each other (YES route from step S56), the comparison and verification between the registration fingerprint characteristic data and the verification fingerprint characteristic data are made without conducting the conversion processing in the fingerprint characteristic data converter 332 (step S57). On the other hand, if no equality takes place (NO route from step S56), the fingerprint characteristic data converter 332 converts the verification fingerprint characteristic data into data with a resolution identical to that of the registration fingerprint characteristic data so that the resolution of the verification fingerprint characteristic data becomes equal to the resolution of the registration fingerprint characteristic data (step S58), thereafter making comparison between the registration fingerprint characteristic data and the verification fingerprint characteristic data (step S59). When the result of the comparison in the fingerprint characteristic data verifying section 33 shows that the matching rate between the registration fingerprint characteristic data and the verification fingerprint characteristic data is equal to or larger than a predetermined value, for example, the access to a database or an electronic settlement system is permissible.

In this way, in the sixth embodiment, in the fingerprint characteristic data verifying section 33, for the verification of two fingerprint characteristic data extracted from fingerprint images different in resolution from each other, the resolution of the verification fingerprint characteristic data is equalized to the resolution of the registration fingerprint characteristic data on the basis of the resolution information attached to the fingerprint characteristic data before the verification processing.

Accordingly, even if a change of specifications on resolution of the fingerprint inputting section 22 takes place, the request for the fingerprint (biometrics information) re-registration work to a user is eliminable, which facilitates update of system version.

Incidentally, although the above description of the sixth embodiment has been made in the case in which fingerprint image data is acquired and used as biometrics information, it is also possible to use time series data such as voice, keystroke or dynamic signature.

In addition, although the above description of the sixth embodiment has been made in the case in which the acquisition condition to be attached to fingerprint characteristic data is a resolution, it is also appropriate that the fingerprint image acquisition condition attaching section 235 and the fingerprint characteristic data resolution information attaching section 311 attach numbers of pixels in vertical/horizontal directions (image size) or a relationship in brightness between ridge lines and trough lines in a finger image as an acquisition condition to a fingerprint image and a fingerprint characteristic data while the fingerprint characteristic data converter 332 conducts the conversion processing in accordance with the acquisition condition attached.

[7] Description of Seventh Embodiment

Figure 18:
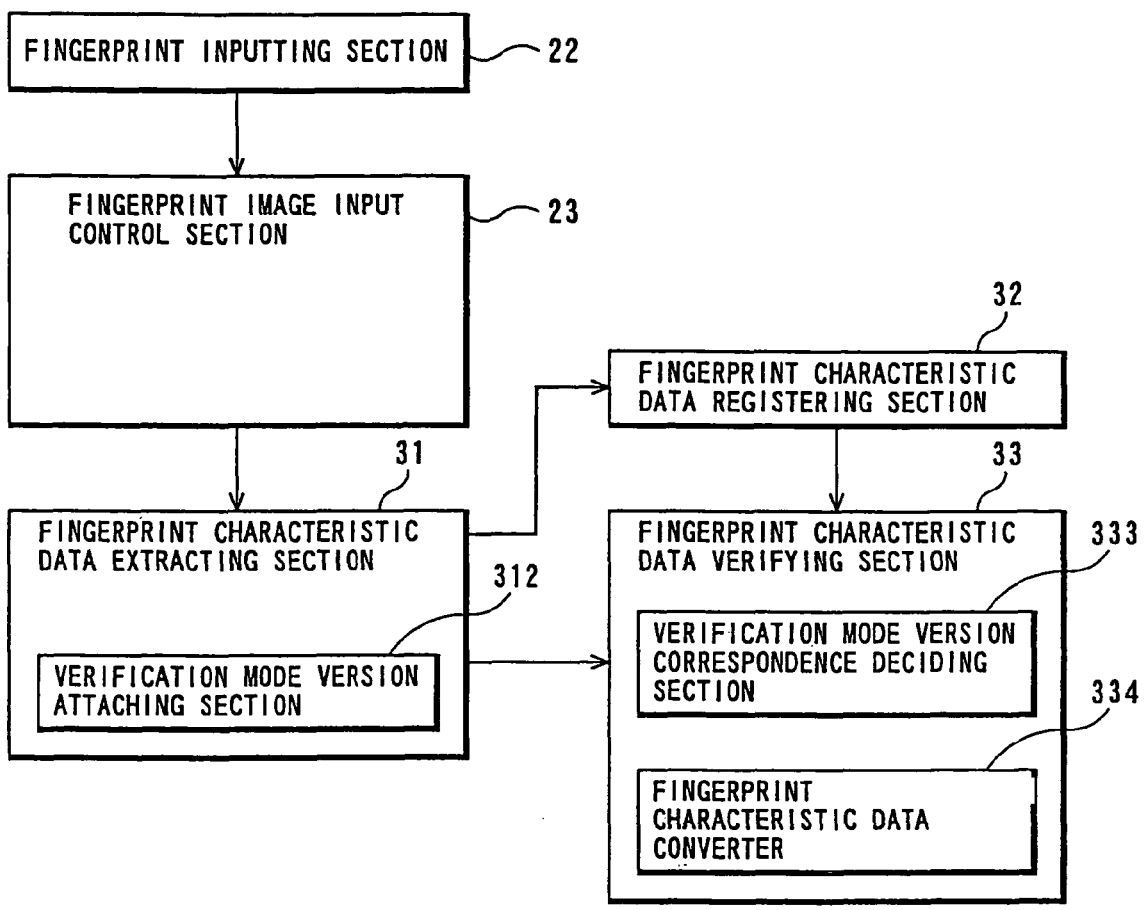
FIG. 18 is a block diagram showing a configuration of an essential part of a personal authentication system using biometrics information according to the seventh embodiment of the invention.

FIG. 18 is a block diagram showing a configuration of an essential part of a personal authentication system using biometrics information according to the seventh embodiment of the present invention. In FIG. 18, the reference numerals as those used above designate the same or almost same parts, and the detailed description thereof will be omitted for brevity. Similarly, the control section 21, the I/O control section 24 and the fingerprint verification result outputting section 34 are omitted from the illustration of FIG. 18.

In the personal authentication system according to the seventh embodiment, as FIG. 18 shows, a fingerprint characteristic data extracting section 31 includes a verification mode version attaching section 312, while a fingerprint characteristic data verifying section 33 includes a verification mode version correspondence deciding section 333 and a fingerprint characteristic data converter (biometrics characteristic data converting section) 334.

The verification mode version attaching section 312 is for attaching, to fingerprint characteristic data to be inputted from the fingerprint characteristic data extracting section 31 to the fingerprint characteristic data registering section 32 or the fingerprint characteristic data verifying section 33, a verification mode version related to that fingerprint characteristic data.

In this case, the verification mode version is information for specifying a verification mode in the fingerprint characteristic data verifying section 33, and the kind of fingerprint characteristic data to be needed at verification varies with the type of verification mode. Thus, the fingerprint characteristic data (fingerprint center, fingerprint characteristic point coordinates, distance between fingerprint characteristic points, direction of fingerprint ridge line, number of ridge lines between fingerprint characteristic points, and others) to be extracted from a fingerprint image by the fingerprint characteristic data extracting section 31 varies with the type of verification mode.

In this embodiment, the fingerprint characteristic data extracting section 31, when receiving the present verification mode version designated by the fingerprint characteristic data verifying section 33, extracts the fingerprint characteristic data needed for that verification mode version, and the verification mode version attaching section 312 attaches the aforesaid present verification mode version to the extracted fingerprint characteristic data.

The verification mode version correspondence deciding section 333 is for making a decision, at verifying fingerprint characteristic data, as to whether or not the verification mode version attached to verification fingerprint characteristic data from the fingerprint characteristic data extracting section 31 corresponds with the verification mode version attached to registration fingerprint characteristic data from the fingerprint characteristic data registering section 32.

The fingerprint characteristic data converter 334 is for, when the decision result of the verification mode version correspondence deciding section 333 shows no correspondence, before verifying that verification fingerprint characteristic data matches registration fingerprint characteristic data, converting the verification fingerprint characteristic data and the registration fingerprint characteristic data into data corresponding to the same verification mode version on the basis of the verification mode versions attached to these fingerprint characteristic data.

At this time, it is also appropriate that the fingerprint characteristic data converter 334 converts both the verification fingerprint characteristic data and registration fingerprint characteristic data into data corresponding to a predetermined verification mode version in order to verify that correspondence the verification mode version for the verification fingerprint characteristic data matches the verification mode version for the registration fingerprint characteristic data, that the fingerprint characteristic data converter 334 converts the verification fingerprint characteristic data into data corresponding to the verification mode version of the registration fingerprint characteristic data, or that the fingerprint characteristic data converter 334 converts the registration fingerprint characteristic data into data corresponding to the verification mode version of the verification fingerprint characteristic data. In the following operation description, the fingerprint characteristic data converter 334 is made to convert the verification fingerprint characteristic data into data corresponding to the verification mode version of the registration fingerprint characteristic data. For example, the data undergoing the conversion by the fingerprint characteristic data converter 334 is fingerprint center, fingerprint characteristic point coordinates, distance between fingerprint characteristic points, direction of fingerprint ridge line, or the like.

Secondly, referring to flow charts of FIGS. 19 and 20, a description will be given hereinbelow of an operation of the personal authentication system according to the seventh embodiment.

Figure 19:
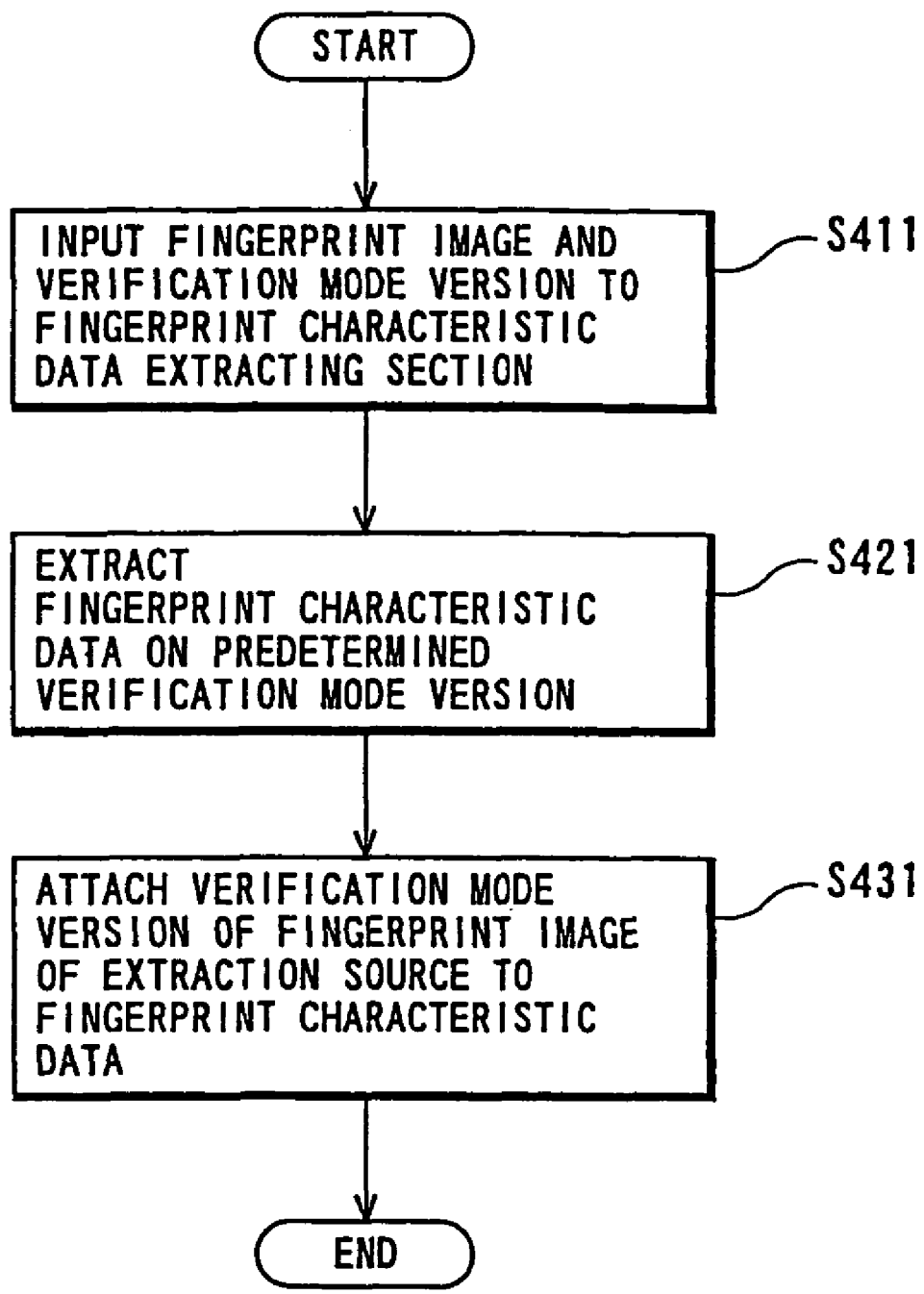
FIGS. 19 and 20 are flow charts useful for explaining an operation of the personal authentication system according to the seventh embodiment.
Figure 20:
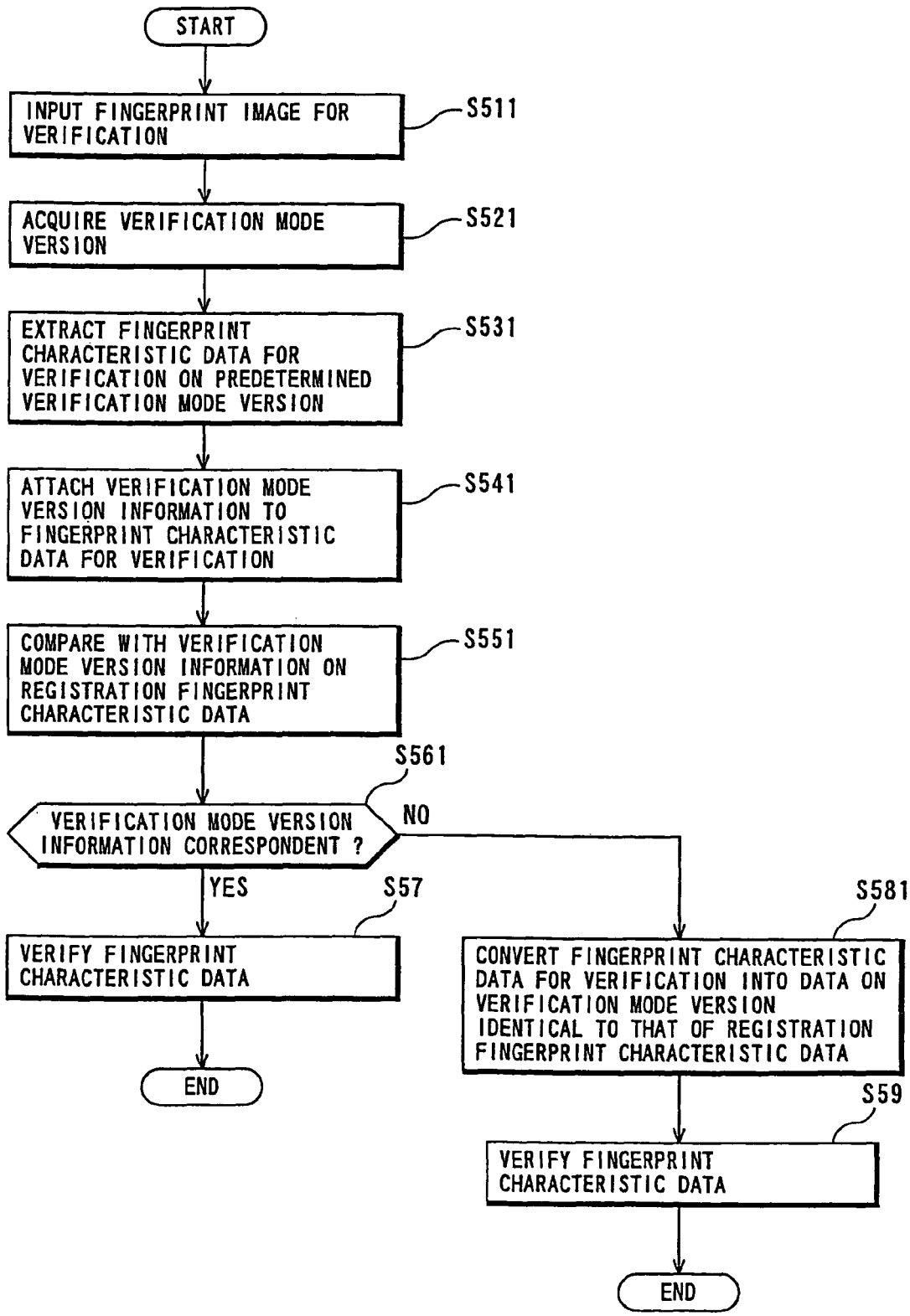

As FIG. 19 shows, the fingerprint characteristic data extracting section 31 receives a fingerprint image and a verification mode version designated from the fingerprint image input control section 23 (step S411) and extracts, from that fingerprint image, fingerprint characteristic data corresponding to the designated and inputted verification mode version (step S421), while the verification mode version attaching section 312 attaches the designated and inputted verification mode version to the fingerprint characteristic data (step S431) and puts that fingerprint characteristic data in the fingerprint characteristic data registering section 32 or the fingerprint characteristic data verifying section 33.

An operation of the personal authentication system according to the seventh embodiment will be described hereinbelow in detail with reference to FIG. 20. When a verification fingerprint image is inputted to the fingerprint characteristic data extracting section 31. (step S511) and the verification mode version is given thereto (step S521), fingerprint characteristic data corresponding to the aforesaid verification mode version is extracted from that verification fingerprint image (step S531). Furthermore, the verification mode version attaching section 312 attaches the verification mode version acquired in the step S521 to the verification fingerprint characteristic data (step S541) and puts that verification fingerprint characteristic data in the fingerprint characteristic data verifying section 33.

The fingerprint characteristic data verifying section 33 reads registration fingerprint characteristic data on a person forming a subject of verification, registered and preserved in advance in the fingerprint characteristic data registering section 32 to compare the verification mode version attached to the registration fingerprint characteristic data with the verification mode version attached to the verification fingerprint characteristic data (step S551), and the verification mode version correspondence deciding section 333 makes a decision on whether or not these verification mode versions correspond with each other (step S561).

If these verification mode version correspond with each other (YES route from step S561), the comparison between the registration fingerprint characteristic data and the verification fingerprint characteristic data are made without conducting the conversion processing in the fingerprint characteristic data converter 334 (step S57). On the other hand, if they do not correspond with each other (NO route from step S561), the fingerprint characteristic data converter 334 converts the verification fingerprint characteristic data into data corresponding to the verification mode version of the registration fingerprint characteristic data so that the verification mode version of the verification fingerprint characteristic data corresponds with the verification mode version of the registration fingerprint characteristic data (step S581), thereafter performing the comparison between the registration fingerprint characteristic data and the verification fingerprint characteristic data (step S59).

Thus, in the seventh embodiment, the verification mode version is used in place of the resolution information in the sixth embodiment and the verification is made in a state where the verification fingerprint characteristic data is converted into data corresponding to the verification mode version of the registration fingerprint characteristic data, so the verification interchangeability is maintainable.

Accordingly, even if the verification mode undergoes a change, there is no need for fingerprint (biometrics information) re-registration work to a user, which facilitates update of system version.

Incidentally, although the description of the seventh embodiment has been made in the case in which the personal authentication system is realized as a personal computer connected type fingerprint verifying apparatus shown in FIG. 1, it is also possible that the personal authentication system according to the seventh embodiment is designed as a client-server type system. In the case of the client-server type, it is considered that the verification mode version of verification fingerprint characteristic data sent from the client side does not correspond with the verification mode version of the registered fingerprint characteristic data. In this case, before the verifying operation, the verification mode version of the verification fingerprint characteristic data sent is converted into the verification mode version of the registration fingerprint characteristic data in the fingerprint characteristic data converter 334. Additionally, it is also preferred that the client side inquires the verification mode version of the registration characteristic data registered previously in the server and, thereafter, the client side makes the fingerprint characteristic data verification using the same verification mode version.

[8] Description of Eighth Embodiment

Figure 21:
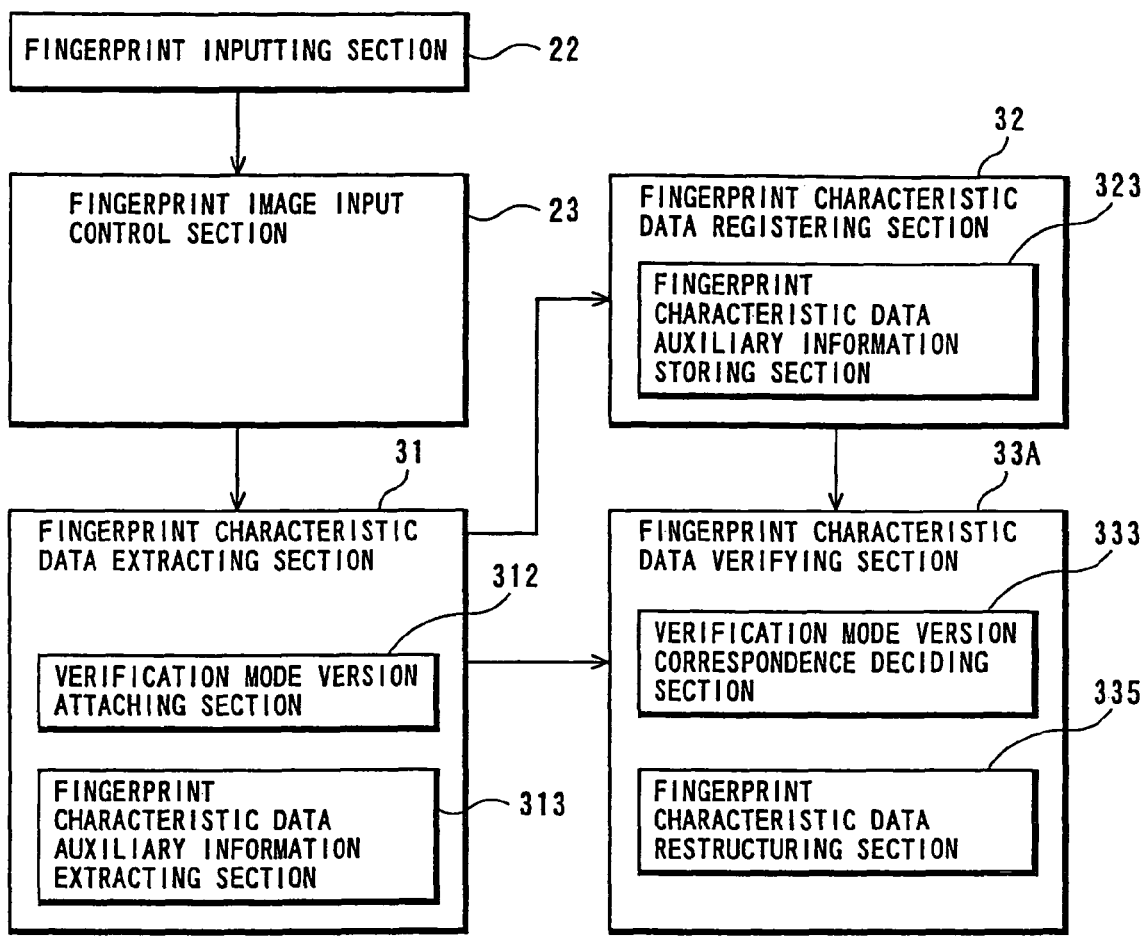
FIG. 21 is a block diagram showing a configuration of an essential part of a personal authentication system using biometrics information according to the eighth embodiment of the invention.

FIG. 21 is a block diagram showing a configuration of an essential part of a personal authentication system using biometrics information according to the eighth embodiment of the present invention. In FIG. 21, the same reference numerals as those used above designate the same or almost same parts, and the description thereof will be omitted for brevity. Similarly, the control section 21, the I/O control section 24 and the fingerprint verification result outputting section 34 shown in FIG. 1 are omitted from the illustration of FIG. 21.

In the personal authentication system according to the eighth embodiment, as FIG. 21 shows, a fingerprint characteristic data extracting section 31 incorporates a fingerprint characteristic data auxiliary information extracting section 313, in addition to a verification mode version attaching section 312 similar to that of the seventh embodiment, while a fingerprint characteristic data registering section 32 incorporates a fingerprint characteristic data auxiliary information storing section 323, and even a fingerprint characteristic data verifying section 33A incorporates a fingerprint characteristic data restructuring section (biometrics characteristic data restructuring section) 335, in addition to a verification mode version correspondence deciding section 333 similar to that of the seventh embodiment.

The fingerprint characteristic data auxiliary information extracting section 313 is for, when registration fingerprint characteristic data to be registered in the fingerprint characteristic data registering section 32 is extracted from a fingerprint image, extracting, from an fingerprint image, fingerprint characteristic data essential for the verification mode in the fingerprint characteristic data verifying section 33A and further auxiliary fingerprint characteristic data (fingerprint characteristic data needed for a different verification mode; fingerprint characteristic data auxiliary information) other than the essential fingerprint characteristic data.

The fingerprint characteristic data auxiliary information storing section 323 is for previously preserving and storing the fingerprint characteristic data auxiliary information extracted in the fingerprint characteristic data auxiliary information extracting section 313 and sent together with registration fingerprint characteristic data.

The fingerprint characteristic data verifying section 33A is constructed to handle a plurality of verification modes, and the fingerprint characteristic data restructuring section 335 of the fingerprint characteristic data verifying section 33A, when a change of kind of fingerprint characteristic data to be used for verification (identification, authentication) takes place with a change of verification mode, uses the registration fingerprint characteristic data (the aforesaid essential fingerprint characteristic data) registered previously in the fingerprint characteristic data registering section 32 and the fingerprint characteristic data auxiliary information preserved in the fingerprint characteristic data auxiliary information storing section 323 to restructure new registration fingerprint characteristic data according to the aforesaid change.

More concretely, in the eighth embodiment, when the verification mode version correspondence deciding section 333 decides that the verification mode versions of the verification fingerprint characteristic data and the registration fingerprint characteristic data to be verified in the fingerprint characteristic data verifying section 33A do not correspond with each other, the fingerprint characteristic data restructuring section 335 reconfigures the registration fingerprint characteristic data to create fingerprint characteristic data to be needed for a verification mode corresponding to the verification mode version of the verification fingerprint characteristic data.

Secondly, referring to a flow chart of FIG. 22, a description will be given hereinbelow of an operation (registration fingerprint characteristic data registering operation) of the personal authentication system according to the eighth embodiment.

Figure 22:
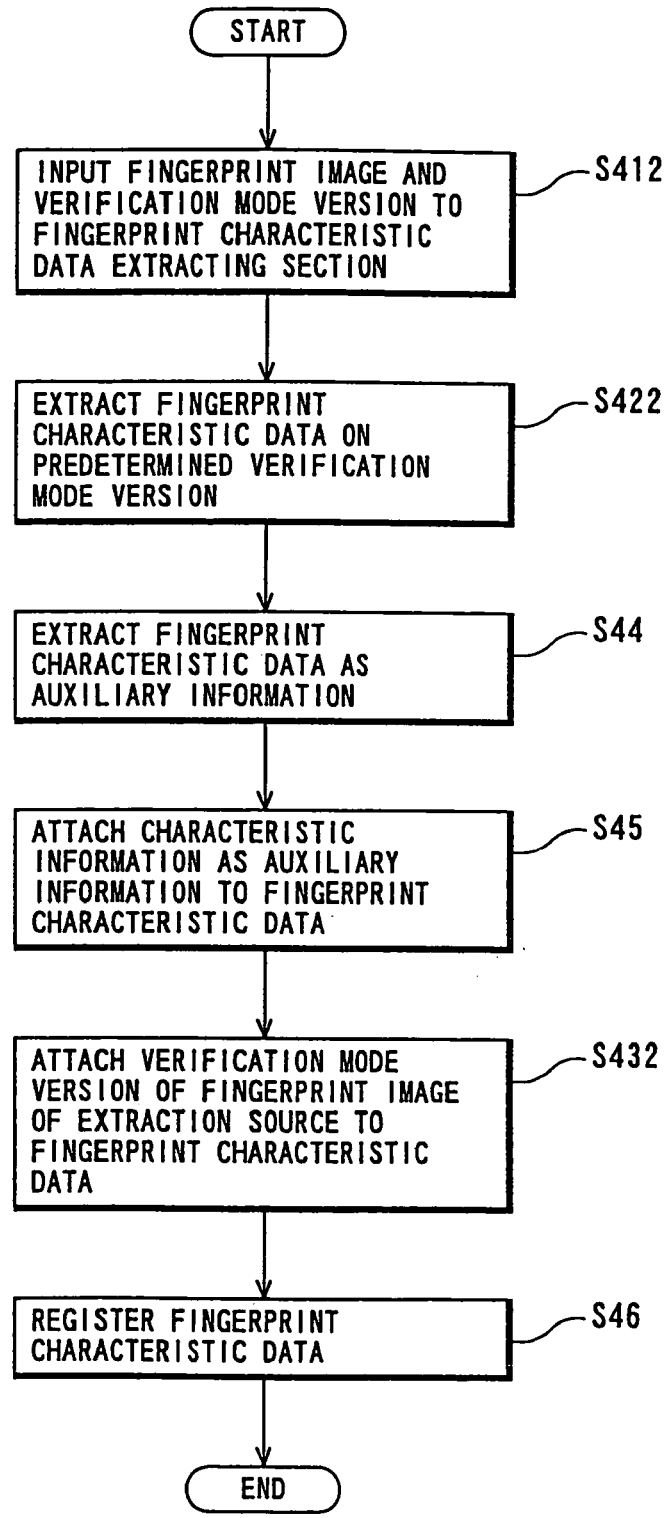
FIG. 22 is a flowchart useful for explaining an operation of the personal authentication system according to the eighth embodiment.

In the fingerprint characteristic data extracting section 31, as FIG. 22 shows, when a registration fingerprint image is inputted from the fingerprint image input control section 23 and a verification mode version is designated and inputted (step S412), registration fingerprint characteristic data corresponding to the designated and inputted verification mode version is extracted from the registration fingerprint image (step S422) and fingerprint characteristic data auxiliary information is extracted from the registration fingerprint image in the fingerprint characteristic data auxiliary information extracting section 313 (step S44).

Furthermore, the fingerprint characteristic data auxiliary information extracted in the step S44 is attached to the registration fingerprint characteristic data extracted in the step S422 (step S45), and the designated and inputted verification mode version is attached to the registration fingerprint characteristic data in the verification mode version attaching section 312 (step S432), and further that fingerprint characteristic data is inputted to the fingerprint characteristic data registering section 32 (step S46). The fingerprint characteristic data auxiliary information attached to the registration fingerprint characteristic data is registered and preserved in the fingerprint characteristic data auxiliary information storing section 323.

Thus, after the registration fingerprint characteristic data and the fingerprint characteristic data auxiliary information, together with the verification mode version, are registered previously in the fingerprint characteristic data registering section 32, the verification processing is conducted nearly like the seventh embodiment.

That is, when a verification fingerprint image is inputted to the fingerprint characteristic data extracting section 31 and a verification mode version is obtained, fingerprint characteristic data corresponding to the verification mode version is extracted from the verification fingerprint image. Additionally, the verification mode version is attached to the verification fingerprint characteristic data in the verification mode version attaching section 312, and this verification fingerprint characteristic data is inputted to the fingerprint characteristic data verifying section 33A.

The fingerprint characteristic data verifying section 33A reads out the registration fingerprint characteristic data on a person forming a subject of verification previously registered and preserved in the fingerprint characteristic data registering section 32 to compare the verification mode version attached to this registration fingerprint characteristic data with the verification mode version attached to the verification fingerprint characteristic data, thereby making a decision, in the verification mode version correspondence deciding section 333, whether or not these verification mode versions correspond with each other.

If these verification mode versions correspond with each other, the comparison between the registration fingerprint characteristic data and the verification fingerprint characteristic data are made without conducting the conversion processing in the fingerprint characteristic data converter 334.

On the other hand, if these verification mode versions do not agree with each other, the fingerprint characteristic data auxiliary information is read out from the fingerprint characteristic data auxiliary information storing section 323, and the fingerprint characteristic data restructuring section 335 uses the registration fingerprint characteristic data and the fingerprint characteristic data auxiliary information to reconfigure the registration fingerprint characteristic data into fingerprint characteristic data needed for a verification mode corresponding to the verification mode version of the verification fingerprint characteristic data, thereafter performing the comparison between the registration fingerprint characteristic data and the verification fingerprint characteristic data.

Thus, in the eighth embodiment, when the verification mode versions of the registration fingerprint characteristic data and the verification fingerprint characteristic data differ from each other, the registration fingerprint characteristic data and the fingerprint characteristic data auxiliary information are used to restructure the registration fingerprint characteristic data into fingerprint characteristic data needed for a verification mode corresponding to the verification mode version of the verification fingerprint characteristic data, so the interchangeability in verification is maintainable.

Furthermore, when the verification mode version is updated (version-up), it is possible to additionally use the fingerprint characteristic data auxiliary information which has not used in the case of the previous verification mode version, which permits update of the fingerprint verification version for the registration fingerprint characteristic data.

Accordingly, even if a change of verification mode takes place, there is no need to request for the finger (biometrics information) re-registration work to a user, which facilitates update of system version.

In the eighth embodiment, although fingerprint characteristic data needed for a different verification mode is extracted as fingerprint characteristic data auxiliary information and registered in advance so that the fingerprint characteristic data is reconfigured using the fingerprint characteristic data auxiliary information at a change of verification mode, it is also appropriate that, in place of the above-mentioned fingerprint characteristic data auxiliary information, a fingerprint image (biometrics information) itself forming an extraction source of registration fingerprint characteristic data, together with the registration fingerprint characteristic data extracted from the fingerprint image, is preserved previously in the fingerprint characteristic data registering section 32.

In this case, when the kind of fingerprint characteristic data to be used for verification (identification and authentication) is changed with a change of verification mode, new registration fingerprint characteristic data according to that change is extracted from the fingerprint image preserved in the fingerprint characteristic data registering section 32 and reconfigured. Accordingly, the effects similar to those of the above-described eighth embodiment are obtainable, and the fingerprint characteristic data corresponding to that verification mode can certainly be extracted and re-configured.

[9] Description of Ninth Embodiment

Figure 23:
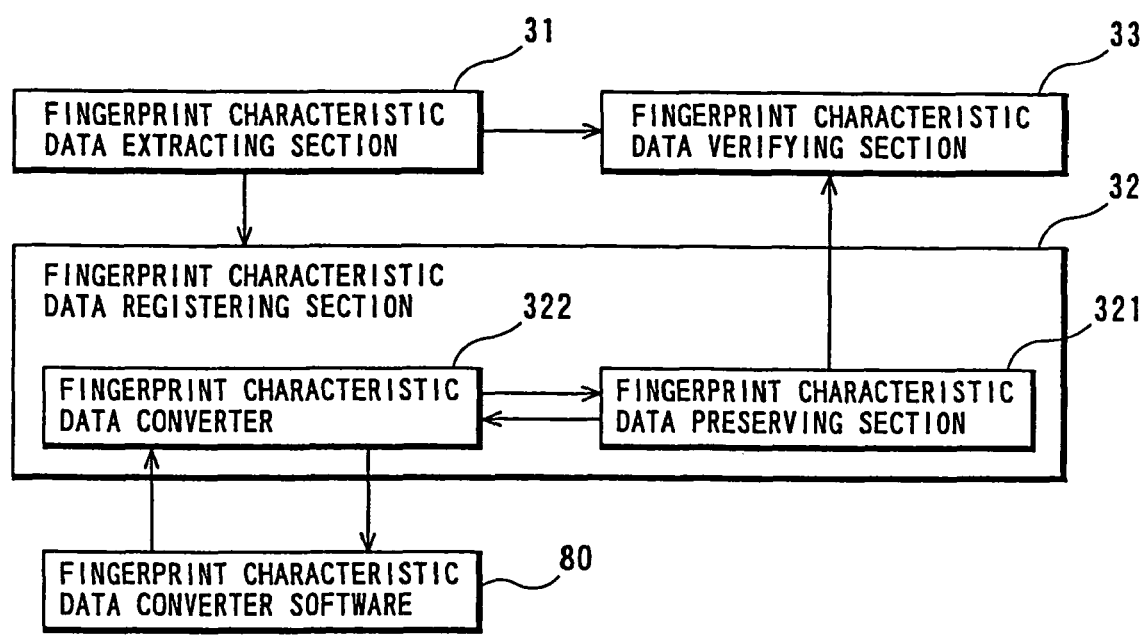
FIG. 23 is a block diagram showing a configuration of an essential part of a personal authentication system using biometrics information according to the ninth embodiment of the invention.

FIG. 23 is a block diagram showing a configuration of an essential part of a personal authentication system using biometrics information according to the ninth embodiment of the present invention. In FIG. 23, the same reference numerals as those used above designate the same or almost same parts, and the detailed description thereof will be omitted for brevity. Additionally, the components in the fingerprint inputting device 20 and the fingerprint verification result outputting section 34, shown in FIG. 1, are omitted from the illustration of FIG. 23. The personal authentication system according to the ninth embodiment can also be constructed as a client-server type system.

In the personal authentication system according to the ninth embodiment, as FIG. 23 shows, a fingerprint characteristic data registering section 32 incorporates a fingerprint characteristic data preserving section 321 and a fingerprint characteristic data converter (biometrics characteristic data converting section) 322.

The fingerprint characteristic data preserving section 321 is for preserving registration fingerprint characteristic data, and this registration fingerprint characteristic data, before the start of verification, is extracted by a fingerprint characteristic data extracting section 31 and retained in the fingerprint characteristic data preserving section 321, while being read out from the fingerprint characteristic data preserving section 321 at the verification in a fingerprint characteristic data verifying section 33.

The fingerprint characteristic data converter 322 operates by reading a fingerprint characteristic data converter software 80 from the external, and when a change of verification mode in the fingerprint characteristic data verifying section 33 (or resolution at fingerprint image acquisition) takes place, converts collectively (in a lump) all the registration fingerprint characteristic data, registered in the fingerprint characteristic data preserving section 321, into fingerprint characteristic data corresponding to the verification mode after the change.

Meanwhile, for example, in a case in which a personal authentication system is constructed such that the client side performs acquisition of a fingerprint image and extraction of fingerprint characteristic data while the server side performs fingerprint authentication (verification), the fingerprint characteristic data of users are registered in advance in the server (fingerprint data preserving section 321). The comparison are made between fingerprint characteristic data sent from the client side to the server and registration fingerprint characteristic data registered in advance in the server, and if the matching rate between these fingerprint characteristic data is equal to or more than a predetermined value, for example, the access to a database or an electronic settlement system is permissible.

Therefore, fingerprint characteristic data on all users are registered in advance in the server (fingerprint characteristic data preserving section 321). If a change of verification mode of fingerprint characteristic data takes place, since the fingerprint characteristic data registered before the change defies the verification, there is a need to conduct some conversion processing to the fingerprint characteristic data preserved in large quantities. Incidentally, not only the verification mode, but also, for example, when the resolution at the acquisition of a fingerprint image undergoes a change, some conversion processing becomes necessary.

For this reason, in the personal authentication system according to the ninth embodiment, as mentioned above, the fingerprint characteristic data registering section 32 is equipped with the fingerprint characteristic data converter 322, and when a change of verification mode takes place, the fingerprint characteristic data converter 322 is linked with the fingerprint characteristic data converter software 80 to collectively convert the fingerprint characteristic data, already registered in the fingerprint characteristic data preserving section 321, into fingerprint characteristic data corresponding to the verification mode after the change. In the case in which the resolution at the fingerprint image acquisition undergoes a change, the fingerprint characteristic data converter 322 is linked with another characteristic data converter software to collectively convert the fingerprint characteristic data, already registered in the fingerprint characteristic data preserving section 321, into data with a resolution after the change.

Figure 24:
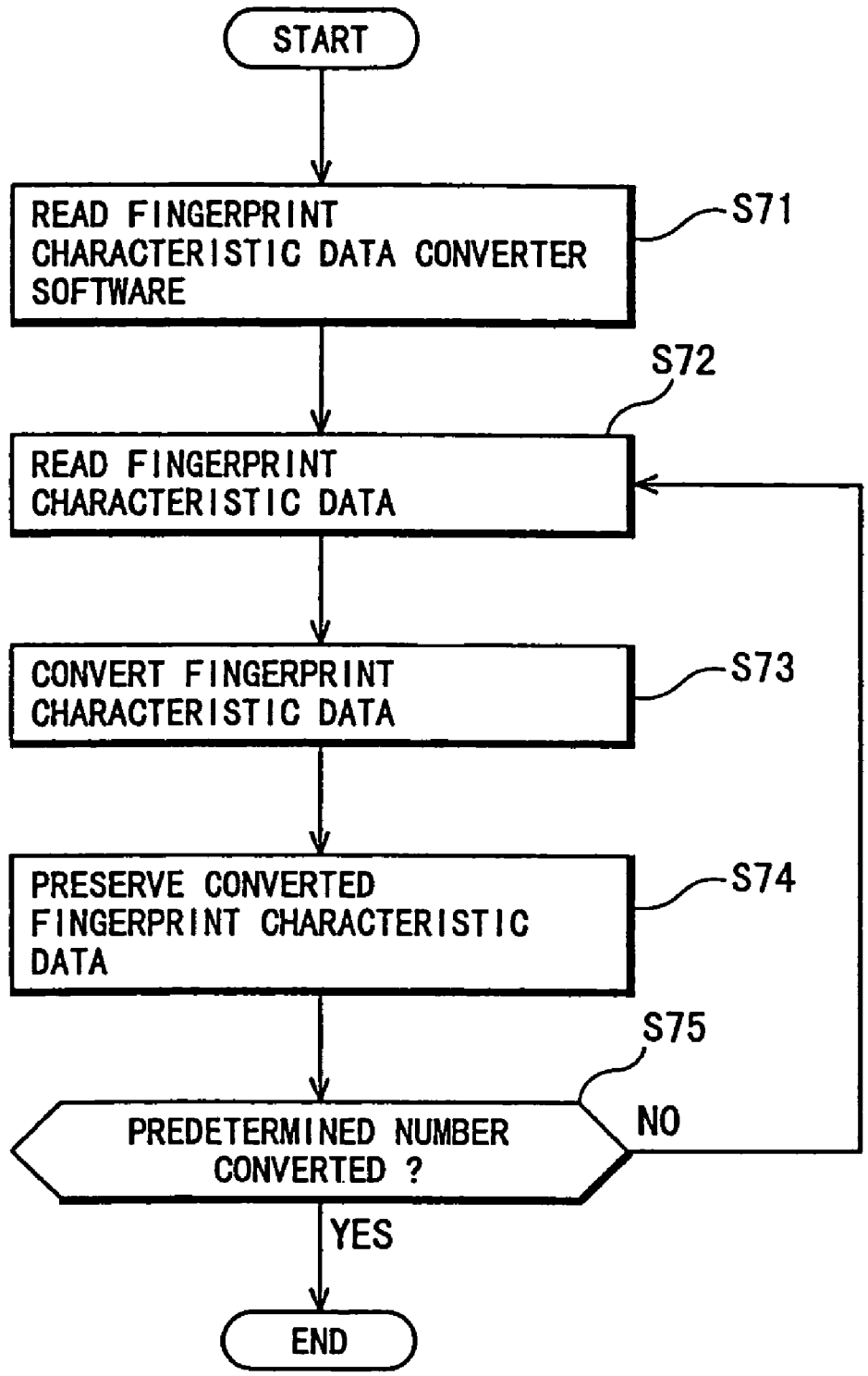
FIG. 24 is a flowchart useful for explaining an operation of the personal authentication system according to the ninth embodiment.

Secondly, referring to a flow chart of FIG. 24, a description will be given hereinbelow of a collectively converting operation of the fingerprint characteristic data converter 322 in the personal authentication system according to the ninth embodiment.

When a change of verification mode (or resolution) takes place, the fingerprint characteristic data converter 322 reads the fingerprint characteristic data converter software 80 (step S71) and then reads one by one the fingerprint characteristic data preserved in the fingerprint characteristic data preserving section 321 (step S72) to convert the read fingerprint characteristic data into data corresponding to the verification mode (or resolution) after the change (step S73), further preserving the fingerprint characteristic data after the conversion in the fingerprint characteristic data preserving section 321 (step S74). The above-mentioned processing in the steps S72 to S74 are repeatedly conducted until the processing on a predetermined number of fingerprint characteristic data preserved in the fingerprint characteristic data preserving section 221 runs to completion (until the decision of step S75 show "YES").

As stated above, in the ninth embodiment, when a change of verification mode (or resolution) takes place, all the registration fingerprint characteristic data are collectively converted into fingerprint characteristic data corresponding to the verification mode (or resolution) after the change, so the collative interchangeability is maintainable and the fingerprint (biometrics information) re-registration work by a user is eliminable to facilitate update of system version.

[10] Description of Tenth Embodiment

Figure 25:
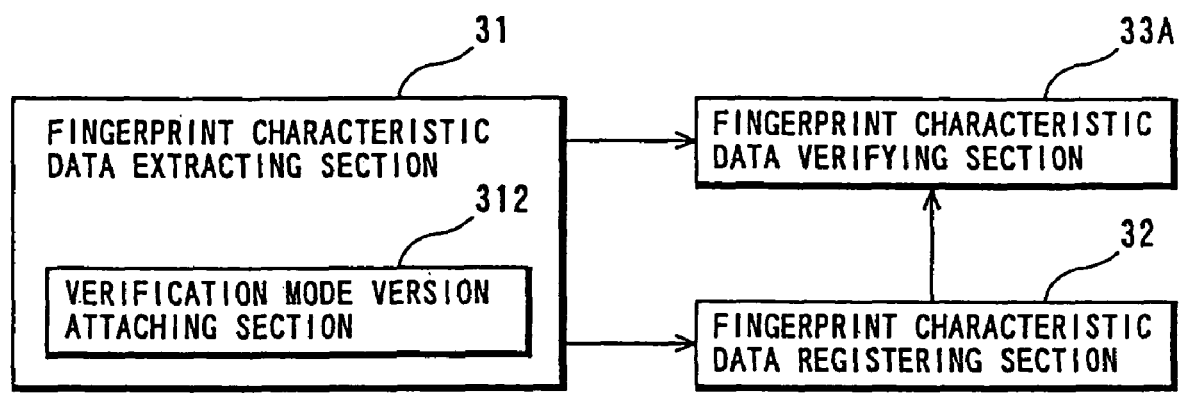
FIG. 25 is a block diagram showing a configuration of an essential part of a personal authentication system using biometrics information according to the tenth embodiment of the invention.

FIG. 25 is a block diagram showing a configuration of an essential part of a personal authentication system using biometrics information according to the tenth embodiment of the present invention. In FIG. 25, the same reference numerals as those used above designate the same or almost same parts, the detailed description thereof will be omitted for brevity. Likewise, the components of the fingerprint inputting device 20 and the fingerprint verification result outputting section 34, shown in FIG. 1, are omitted from the illustration of FIG. 25.

In the personal authentication system according to the tenth embodiment, as FIG. 25 shows, a fingerprint characteristic data extracting section 31 includes a verification mode version attaching section 312 similar to that in the seventh embodiment, while a fingerprint characteristic data verifying section 33A is designed to handle a plurality of verification modes as in the case of the eighth embodiment, and is made to conduct the verification processing according to a verification mode corresponding to the verification mode versions attached to registration fingerprint characteristic data and verification fingerprint characteristic data.

With the foregoing configuration, in the personal authentication system according to the tenth embodiment, the verification mode version attaching section 312 attaches, to fingerprint characteristic data to be inputted from the fingerprint characteristic data extracting section 31 to the fingerprint characteristic data registering section 32 or the fingerprint characteristic data verifying section 33A, a verification mode version related to that fingerprint characteristic data. Additionally, when the verification processing is conducted in the fingerprint characteristic data verifying section 33A, if the verification mode version of the verification fingerprint characteristic data from the fingerprint characteristic data extracting section 31 agrees with the verification mode version of the registration fingerprint characteristic data from the fingerprint characteristic data registering section 32, the verification processing is conducted according to the verification mode corresponding to the verification mode version. On the other hand, if these verification mode versions do not correspond with each other, this fact of no correspondence is communicated to a user, before the processing comes to an end.

In this way, in the tenth embodiment, when the verification mode version of the verification fingerprint characteristic data and the verification mode version of the registration fingerprint characteristic data correspond with each other, in any verification mode, the verification processing can be done in the fingerprint characteristic data verifying section 33A.

[11] Description of Eleventh Embodiment

FIG. 26 is a block diagram showing a configuration of an essential part of a personal authentication system using biometrics information according to the eleventh embodiment of the present invention. In FIG. 26, the same reference numerals as those used above designate the same or almost same parts, and the detailed description thereof will be omitted for brevity. Likewise, the control section 21, the I/O control section 24 and the fingerprint verification result outputting section 34, shown in FIG. 1, are omitted from the illustration of FIG. 26.

In the personal authentication system according to the eleventh embodiment, as FIG. 26 shows, a fingerprint characteristic data extracting section 31A includes a verification mode version attaching section 312 similar to that in the seventh embodiment, while a fingerprint characteristic data verifying section 33A includes a registration data verification mode version retrieving section 336.

The fingerprint characteristic data extracting section 31A is capable of extracting fingerprint characteristic data, needed for a plurality of different verification modes, from a fingerprint image, and the verification mode version attaching section 312 of the fingerprint characteristic data extracting section 31A is for attaching, to registration fingerprint characteristic data to be inputted from the fingerprint characteristic data extracting section 31 to the fingerprint characteristic data registering section 32, a verification mode version related to that registration fingerprint characteristic data.

Furthermore, the fingerprint characteristic data extracting section 31A has a function to make an inquiry at the fingerprint characteristic data verifying section 33A about a verification mode version attached to registration fingerprint data of a person forming a subject of verification, and is operative to, when receiving an answer about the verification mode version from the fingerprint characteristic data verifying section 33A, extract fingerprint characteristic data, needed for a verification mode corresponding to that verification mode version, as verification fingerprint characteristic data from a verification fingerprint image.

The fingerprint characteristic data verifying section 33A is designed to be capable of handling a plurality of verification modes as in the case of the eighth embodiment, and the registration data verification mode version retrieving section 336 of the fingerprint characteristic data verifying section 33A, when the fingerprint characteristic data extracting section 31A makes the aforesaid inquiry about the verification mode version, search the fingerprint characteristic data registering section 32 to retrieve the registration fingerprint characteristic data on a person forming a subject of verification for reading out the verification mode version attached to that registration fingerprint characteristic data, then returning the read verification mode version to the fingerprint characteristic data extracting section 31A.

Furthermore, the fingerprint characteristic data extracting section 31A, when the verification result by the fingerprint characteristic data verifying section 33A shows a matching rate equal to or more than a predetermined value and the aforesaid verification mode version is older than a predetermined version, extracts fingerprint characteristic data corresponding to the newest verification mode from a verification fingerprint image, and re-registers the extracted fingerprint characteristic data as new registration fingerprint characteristic data in the fingerprint characteristic data registering section 32.

Figure 27:
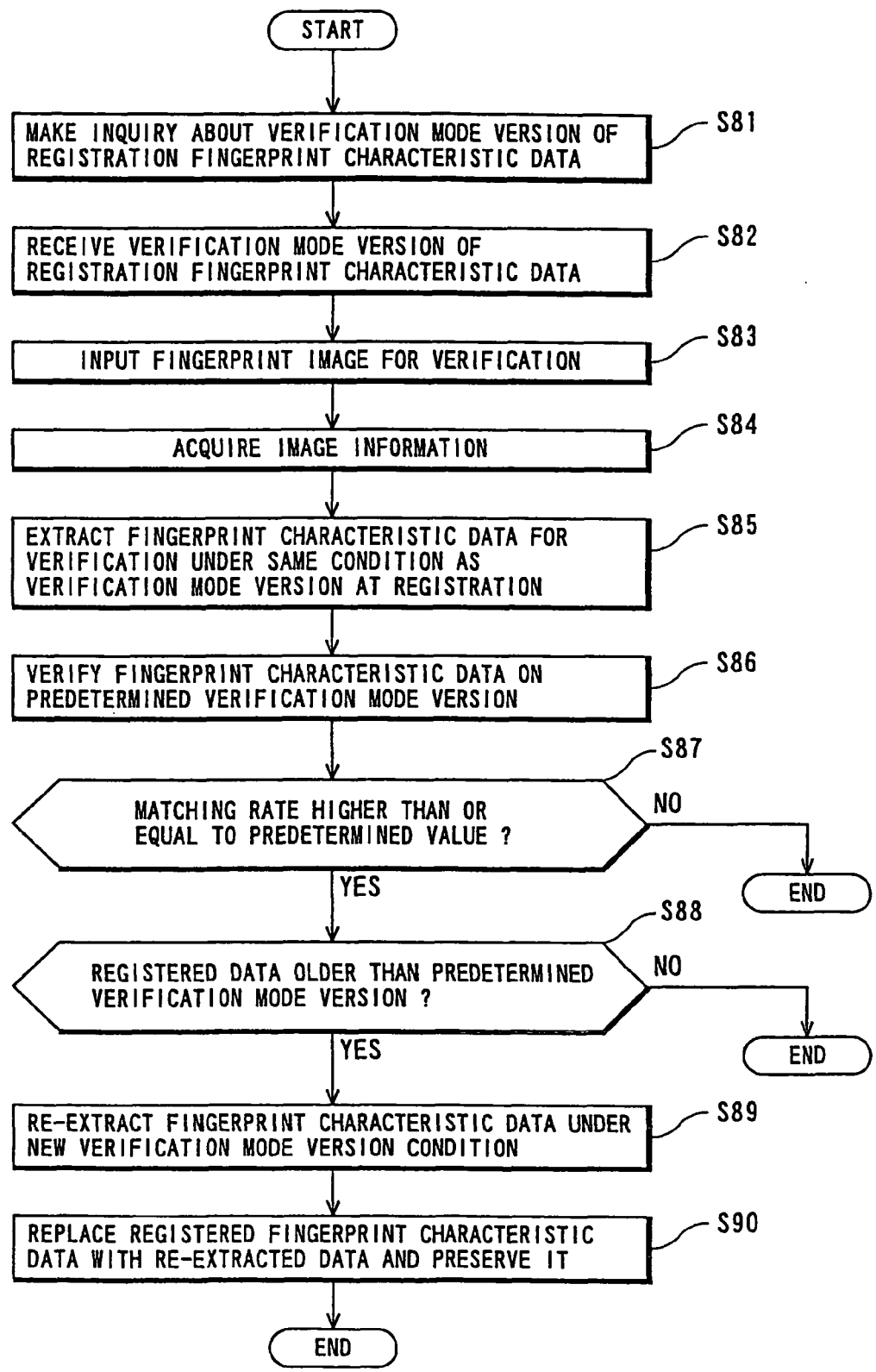
FIG. 27 is a flow chart useful for explaining an operation of the personal authentication system according to the eleventh embodiment.

Secondly, referring to a flow chart of FIG. 27, a description will be given hereinbelow of an operation of the personal authentication system according to the eleventh embodiment.

First, the fingerprint characteristic data extracting section 31A makes an inquiry at the fingerprint characteristic data verifying section 33A about a verification mode version attached to the registration fingerprint characteristic data on a person forming a subject of verification (step S81), while the registration data verification mode version retrieving section 336 of the fingerprint characteristic data verifying section 33A, when receiving that inquiry, searches the fingerprint characteristic data registering section 32 to retrieve registration fingerprint characteristic data on that verification subject person for reading out the verification mode version attached to that registration fingerprint characteristic data, then returning the read verification mode version to the fingerprint characteristic data extracting section 31A.

The fingerprint characteristic data extracting section 31A receives a response about the verification mode version from the fingerprint characteristic data verifying section 33A (step S82) and then receives a verification fingerprint image (step S83) and further acquires image information (step S84), thereby extracting verification fingerprint characteristic data under the same condition as the verification mode version at the registration. That is, in the step S85, the fingerprint characteristic data extracting section 31A extracts fingerprint characteristic data, needed for a verification mode corresponding to that verification mode version, as verification fingerprint characteristic data from the verification fingerprint image (step S85).

Following this, the fingerprint characteristic data verifying section 33A verifies that the registration fingerprint characteristic data matches the verification fingerprint characteristic data in a verification mode corresponding to the verification mode version at the registration (step S86). If the verification result shows a matching rate smaller than a predetermined value (NO route from step S87), the processing comes to an end because of no correspondence between the registration fingerprint characteristic data and the verification fingerprint characteristic data. On the other hand, if the verification result shows a matching rate equal to or larger than the predetermined value (YES route from step S87), a decision is made as to whether or not the verification mode version of the registration fingerprint characteristic data is older than a predetermined version (step S88).

If the verification mode version of the registration fingerprint characteristic data is not older than the predetermined version (NO route from step S88), the processing comes to an end. On the other hand, if the verification mode version of the registration fingerprint characteristic data is older than the predetermined version (YES route from step S88), the fingerprint characteristic data extracting section 31A re-extracts fingerprint characteristic data corresponding to the newest verification mode from the verification fingerprint image under a new verification mode version condition (step S89). Additionally, the registered fingerprint characteristic data is replaced with the re-extracted fingerprint characteristic data which in turn is preserved so that the re-extracted data is re-registered as new registration fingerprint characteristic data in the fingerprint characteristic data registering section 32 (step S90).

As described above, in the personal authentication system according to the eleventh embodiment, the process for verifying that registration fingerprint characteristic data matches verification fingerprint characteristic data is conducted in a verification mode corresponding to a verification mode version at registration. And if the matching rate being the verification result is equal to or larger than a predetermined value, the subject of verification is recognized as the said person.

At this time, if the verification mode version of the fingerprint characteristic data registered is older than a predetermined version, fingerprint characteristic data for a verification mode corresponding to the latest version is extracted from a verification fingerprint image, and is made into registration fingerprint characteristic data.

That is, if the fingerprint characteristic data verifying section 33A is capable of dealing with at least two types of verification modes of an old version and a new version, when the subject of verification is recognized as the said person on the basis of the registered fingerprint characteristic data corresponding to the verification mode of the old version, the fingerprint characteristic data corresponding to the verification mode of the new version is extracted from a verification fingerprint image and registered.

At this time, if the criterion of the replacement of registration fingerprint characteristic data is set independently of a common said person confirmation threshold (a predetermined value in step S87 shown in FIG. 27) to make a decision on the permission of replacement with respect to a higher threshold, then it is possible to more certainly prevent another person from impersonating the said person at the replacement of registration fingerprint characteristic data.

In this way, in the eleventh embodiment, when verification processing has been conducted using registration fingerprint characteristic data registered with the verification mode of the old version and the said person has been confirmed as the result of the verification, the fingerprint characteristic data corresponding to the verification mode of the new version is extracted and registered instead in the fingerprint characteristic data registering section 32. Accordingly, it is possible to automatically re-register fingerprint characteristic data corresponding to a new version while certainly preventing another person from impersonating the said person, which facilitates update of system version.

[12] Description of Twelfth Embodiment

Figure 28:
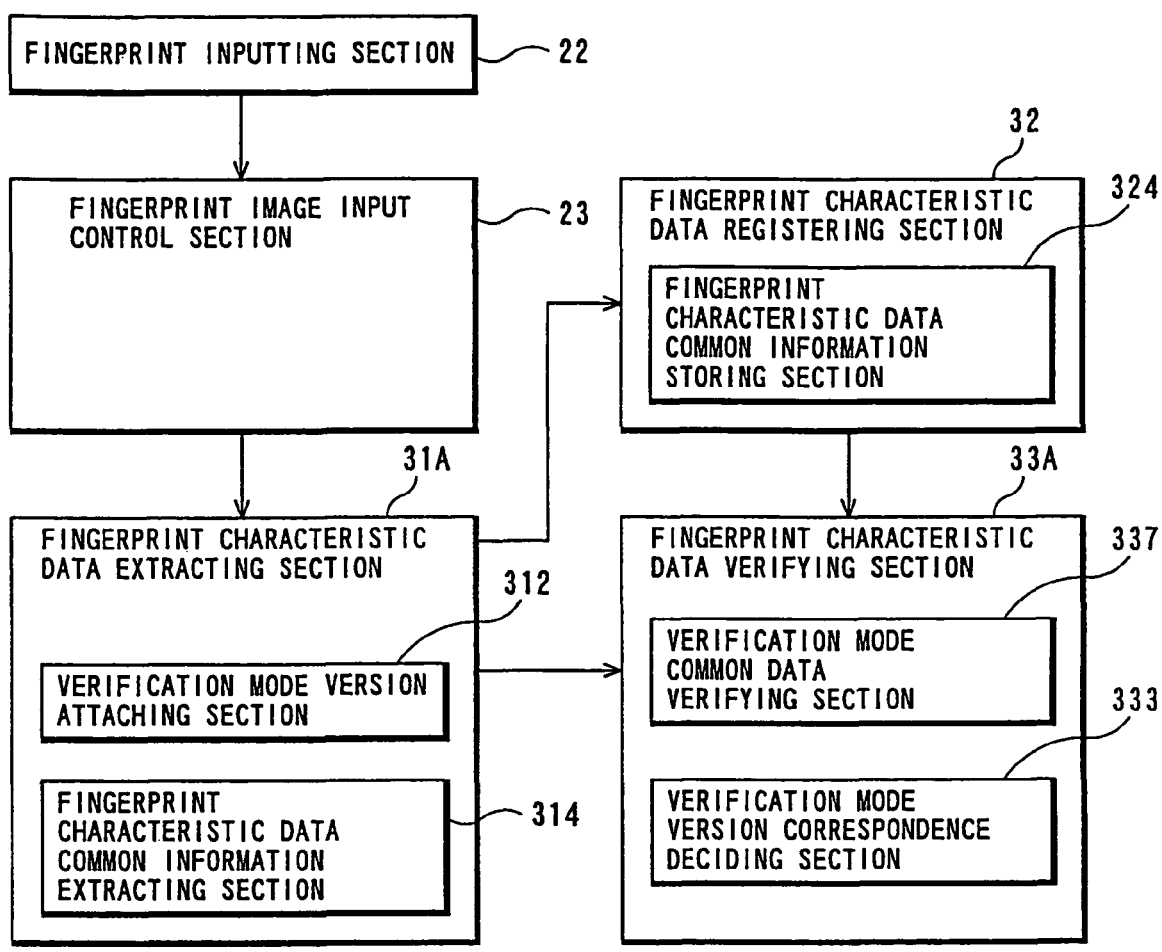
FIG. 28 is a block diagram showing a configuration of an essential part of a personal authentication system using biometrics information according to the twelfth embodiment of the invention.

FIG. 28 is a block diagram showing a configuration of an essential part of a personal authentication system using biometrics information according to the twelfth embodiment of the present invention. In FIG. 28, the same reference numerals as those used above designate the same or almost same parts, and the detailed description will be omitted for brevity. Likewise, the control section 21, the I/O control section 24 and the fingerprint verification result outputting section 34, shown in FIG. 1, are omitted from the illustration of FIG. 28.

In the personal authentication system according to the twelfth embodiment, as FIG. 28 shows, a fingerprint characteristic data extracting section 31A includes, in addition to a verification mode version attaching section 312 similar to that of the seventh embodiment, a fingerprint characteristic data common information extracting section 314, while a fingerprint characteristic data registering section 32 includes a fingerprint characteristic data common information storage section 324, and even a fingerprint characteristic data verifying section 33A includes, in addition to a verification mode version correspondence deciding section 333 similar to that of the seventh embodiment, a verification mode version common data verifying section 337.

The fingerprint characteristic data extracting section 31A is capable of extracting fingerprint characteristic data needed for a plurality of different verification modes, from a fingerprint image, and the verification mode version attaching section 312 of the fingerprint characteristic data extracting section 31A is for attaching, to fingerprint characteristic data to be inputted from the fingerprint characteristic data extracting section 31A to a fingerprint characteristic data registering section 32 or a fingerprint characteristic data verifying section 33A, a verification mode version related to that fingerprint characteristic data.

Figure 30:
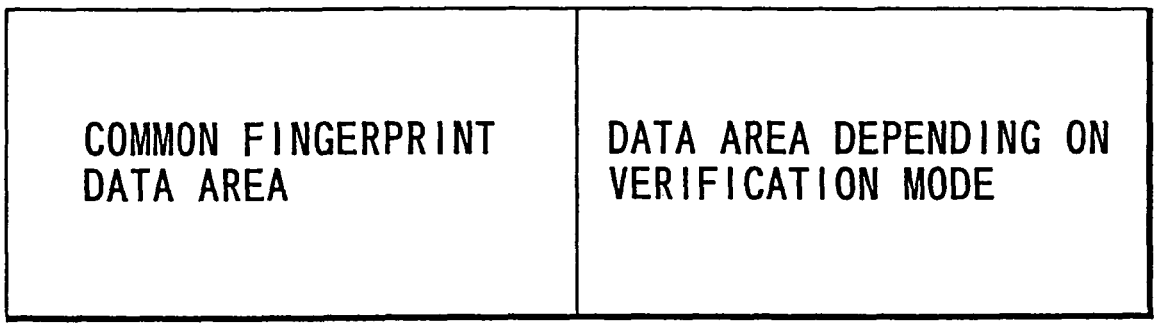
FIG. 30 is an illustration available for describing a structure of fingerprint characteristic data in the twelfth embodiment.

The fingerprint characteristic data common information extracting section 314 is for extracting common data (fingerprint characteristic data common information), to be used in common among all verification modes but not depending on a verification mode, from the fingerprint characteristic data extracted by the fingerprint characteristic data extracting section 31A to classify the fingerprint characteristic data into dependency data depending on a verification mode at extraction and common data as shown in FIG. 30. In this case, the "common data" may be characteristic information, such as fingerprint characteristic point coordinates, fingerprint center coordinates and fingerprint characteristic point directions, to be used generally for fingerprint verification.

The fingerprint characteristic data common information storing section 324 is for storing, of the registration fingerprint characteristic data extracted by the fingerprint characteristic data extracting section 31A, the common data (fingerprint characteristic data common information) extracted by the fingerprint characteristic data common information extracting section 314 as mentioned above. In fact, this fingerprint characteristic data common information storing section 324 is realized as a verification version common data area secured previously in the interior of a fingerprint characteristic data format, in the fingerprint characteristic data registering section 32.

Furthermore, the fingerprint characteristic data verifying section 33A is designed to deal with a plurality of verification modes as in the case of the eighth embodiment, and the verification mode common data verifying section 337 of the fingerprint characteristic data verifying section 33A is for, when the verification mode version attached verification fingerprint characteristic data differs from the verification mode version on a person forming a subject of verification attached to registration fingerprint characteristic data, performing verification processing through the use of common data of these fingerprint characteristic data.

Still furthermore, the fingerprint characteristic data extracting section 31A, when the verification result of the verification mode common data verifying section 337 shows a matching rate equal to or larger than a predetermined value, extracts fingerprint characteristic data, corresponding to the newest verification mode, from a verification fingerprint image and re-registers the extracted fingerprint characteristic data as new registration fingerprint characteristic data in the fingerprint characteristic data registering section 32.

Figure 29:
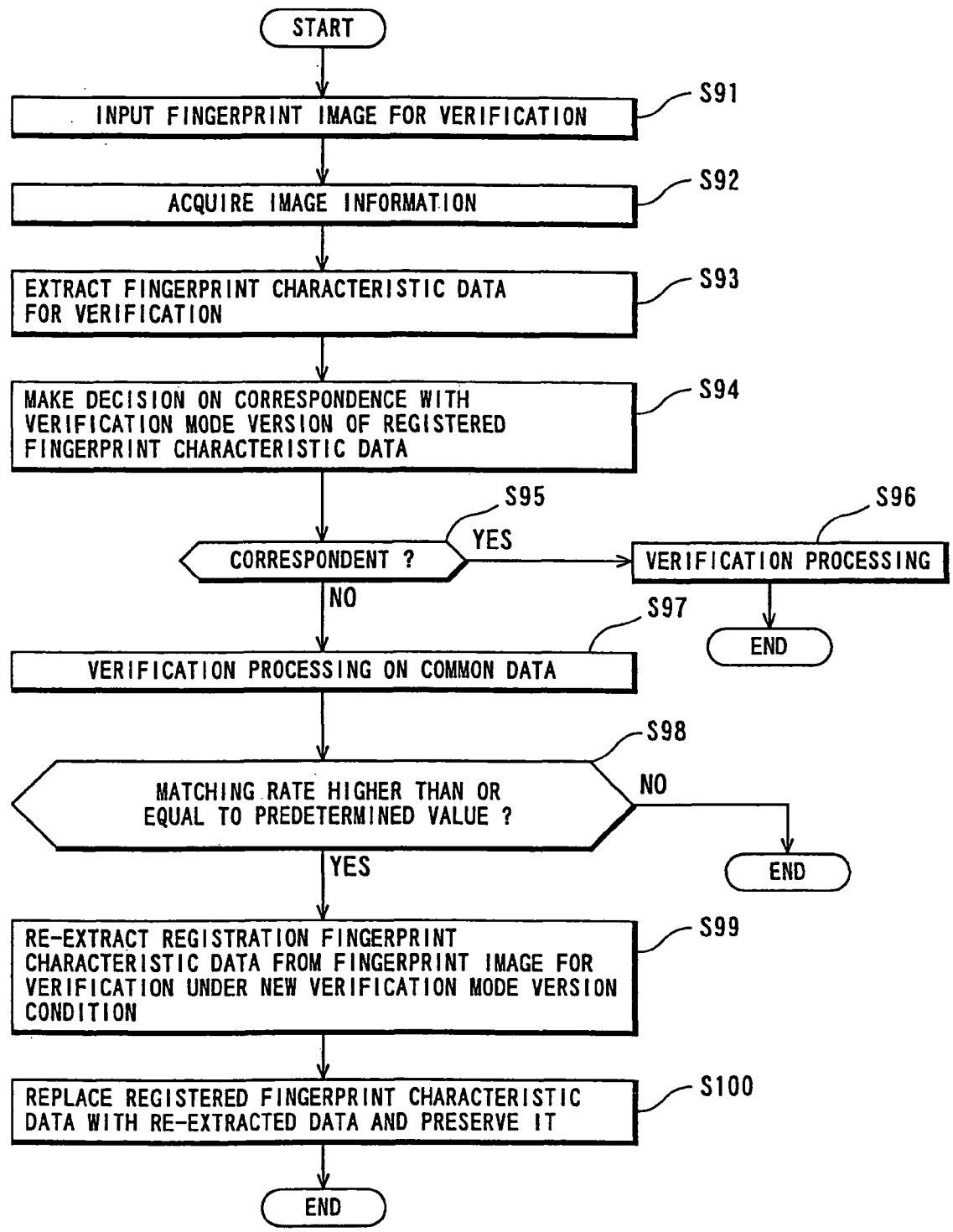
FIG. 29 is a flow chart useful for explaining an operation of the personal authentication system according to the twelfth embodiment.

Secondly, referring to a flow chart of FIG. 29, a description will be given hereinbelow of an operation of the personal authentication system according to the twelfth embodiment.

First, the fingerprint characteristic data extracting section 31A receives a verification fingerprint image (steps 91) and acquires image information (step S92) to extract verification fingerprint characteristic data under the same condition as a predetermined verification mode version (step S93), while the verification mode version attaching section 312 attaches that verification mode version to the verification fingerprint characteristic data, and puts the resultant verification fingerprint characteristic data in the fingerprint characteristic data verifying section 33A.

In the fingerprint characteristic data verifying section 33A, the registration fingerprint characteristic data on a person being a subject of verification, previously registered and preserved, is read out from the fingerprint characteristic data registering section 32 so that the verification mode version attached to this registration fingerprint characteristic data is compared with the verification mode version attached to the verification fingerprint characteristic data, while the verification mode version correspondence deciding section 333 makes a decision on whether or not these verification mode versions correspond with each other (steps S94 and S95).

If these verification mode versions correspond with each other (YES route from step S95), the comparison between the registration fingerprint characteristic data and the verification fingerprint characteristic data are made as ordinary (step S96).

On the other hand, if the verification mode versions are different from each other (NO route from step S95), the verification mode common data verifying section 337 reads out common data of registration fingerprint characteristic data from the fingerprint characteristic data common information storing section 324 to make comparison between that common data and the common data in the verification fingerprint characteristic data (step S97).

If the verification result shows a matching rate smaller than a predetermined value (NO route from step S98), the processing comes to an end because of no correspondence between the registration fingerprint characteristic data and the verification fingerprint characteristic data. On the other hand, if the verification result shows a matching rate equal to or larger than the predetermined value (YES route from step S98), the fingerprint characteristic data extracting section 31A re-extracts fingerprint characteristic data, corresponding to the newest verification mode, from a verification fingerprint image under a condition of a new verification mode version (step S99). Additionally, the re-extracted fingerprint characteristic data is substituted for the registered fingerprint characteristic data and is preserved so that the re-extracted data is re-registered as new registration fingerprint characteristic data in the fingerprint characteristic data registering section 32 (step S100).

In this way, in the twelfth embodiment, for example, in the case in which the registration fingerprint characteristic data corresponding to an old version (old verification mode) while the verification fingerprint characteristic data corresponds to a new version (new verification mode), the verification is made on the basis of the common data of these fingerprint characteristic data as a temporary measure. Furthermore, if a predetermined matching rate arises (if the said person is confirmed), fingerprint characteristic data corresponding to a verification mode of a new version is extracted from a verification fingerprint image. Accordingly, it is possible to automatically re-register fingerprint characteristic data corresponding to a new version while certainly preventing another person from impersonating the said person, which facilitates update of system version.

[13] Description of Thirteenth Embodiment

Figure 31:
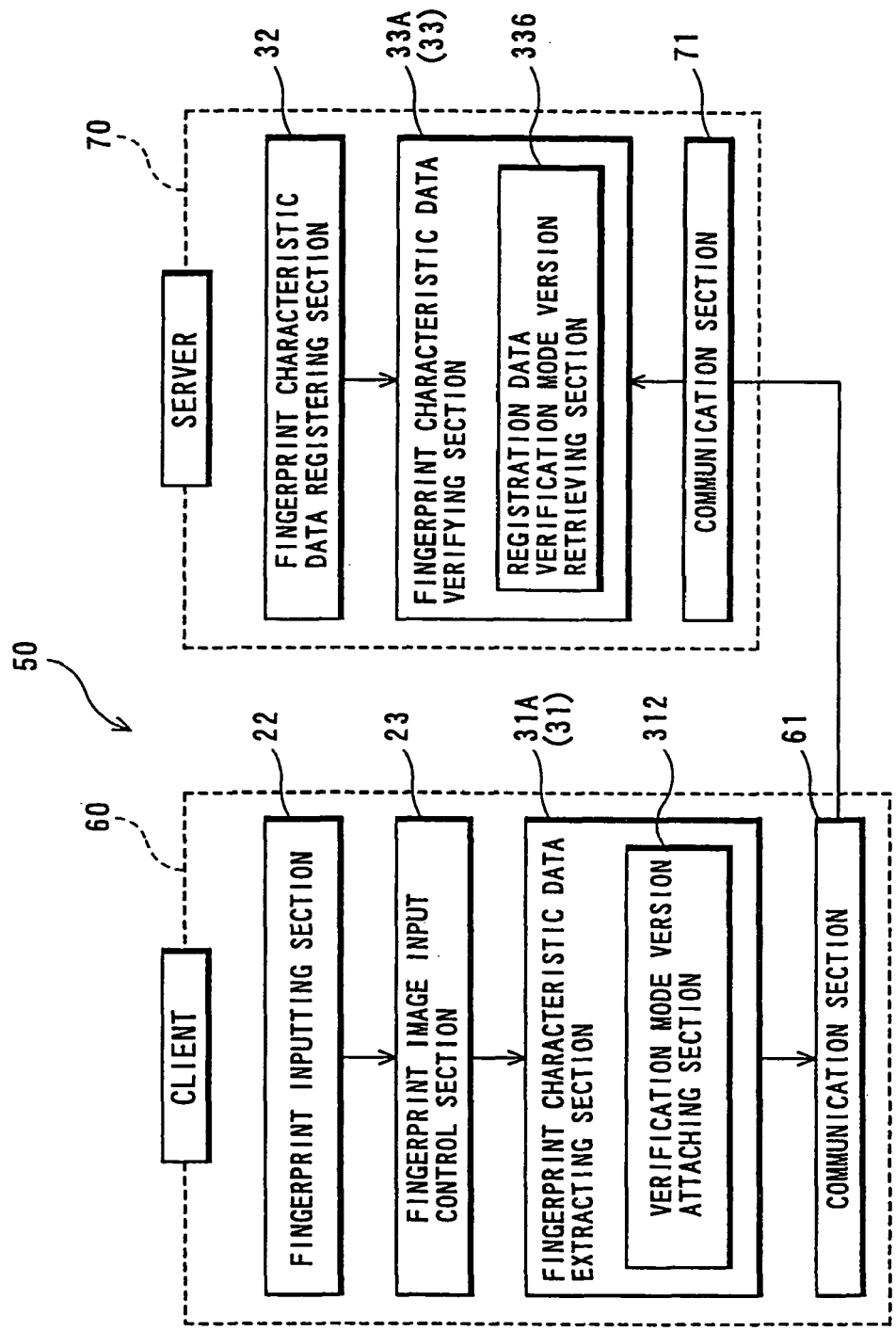
FIG. 31 is a block diagram showing a configuration of an essential part of a personal authentication system using biometrics information according to a thirteenth embodiment of the invention.

FIG. 31 is a block diagram showing a configuration of an essential part of a personal authentication system using biometrics information according to the thirteenth embodiment of the present invention. In FIG. 31, the same reference numerals as those used above designate the same or almost same parts, and detailed description thereof will be omitted for brevity. As FIG. 31 shows, a personal authentication system 50 according to the thirteenth embodiment is of a client-server type in which a client 60 and a server 70 are mutually connected through a communication section 61 and a communication section 71 so that communications therebetween becomes possible.

The client 60 side includes a fingerprint inputting section 22, a fingerprint image input control section 23, a fingerprint characteristic data extracting section 31A and the aforesaid communication section 61 so that verification fingerprint characteristic data is extracted from fingerprint image data and transmitted through the communication section 61 to the server 70. The server 70 side includes a fingerprint characteristic data registering section 32, a fingerprint characteristic data verifying section 33A and the aforesaid communication section 71 so that verification processing is conducted with respect to the verification fingerprint characteristic data received through the communication section 71.

Furthermore, also in the personal authentication system 50 according to the thirteenth embodiment, as well as the eleventh embodiment, the fingerprint characteristic data extracting section 31A is provided with a verification mode version attaching section 312, while the fingerprint characteristic data verifying section 33A is equipped with a registration data verification mode version retrieving section 336.

The fingerprint characteristic data extracting section 31A is capable of extracting fingerprint characteristic data, needed for a plurality of different verification modes, from a fingerprint image, and the verification mode version attaching section 312 of the fingerprint characteristic data extracting section 31A is operative to attach, to registration fingerprint characteristic data to be inputted from the fingerprint characteristic data extracting section on the client 60 side to the fingerprint characteristic data registering section 32 on the server 70 side, a verification mode version corresponding to that registration fingerprint characteristic data.

In addition, the fingerprint characteristic data extracting section 31A has a function to make an inquiry at the server 70 about the verification mode version attached to registration fingerprint characteristic data on a person forming a subject of verification, and is operative to, when receiving a response about the verification mode version from the server 70, extract fingerprint characteristic data needed for verification mode corresponding to that verification mode version, as verification fingerprint characteristic data from a verification fingerprint image.

The fingerprint characteristic data verifying section 33A is designed to deal with a plurality of verification modes, and the registration data verification mode version retrieving section 336 of the fingerprint characteristic data verifying section 33A is operative to, when receiving the aforesaid inquiry about verification mode version from the fingerprint characteristic data extracting section 31A on the client 60 side, search the fingerprint characteristic data registering section 32 to retrieve registration fingerprint characteristic data on the person being the subject of verification, and further to read out the verification mode version attached to that registration fingerprint characteristic data for returning the verification mode version to the client 60.

Secondly, referring to a flow chart of FIG. 32, a description will be given hereinbelow of an operation of the personal authentication system 50 according to the thirteenth embodiment.

First, the fingerprint characteristic data extracting section 31A on the client 60 side makes an inquiry at the server 70 about the verification mode version attached to the registration fingerprint characteristic data on the person being the subject of verification (step S61), while the registration data verification mode version retrieving section 336 of the fingerprint characteristic data verifying section 33A on the server 70 side, when receiving that inquiry, searches the fingerprint characteristic data registering section 32 to retrieve the registration fingerprint characteristic data on the person being the subject of verification, and reads out the verification mode version attached to that registration fingerprint characteristic data to return the verification mode version to the client 60.

The fingerprint characteristic data extracting section 31A, after receiving a response about a verification mode version from the server 70 (step S62), receives a verification fingerprint image (step S63) and acquires image information (step S64), thereby extracting verification fingerprint characteristic data under the same condition as the verification mode version at the registration. That is, in the step S65, the fingerprint characteristic data extracting section 31A extracts fingerprint characteristic data needed for a verification mode corresponding to that verification mode version, as verification fingerprint characteristic data from a verification fingerprint image (step S65), then returning the extracted fingerprint characteristic data to the server 70 (step S66).

Thereafter, on the server 70 side, the fingerprint characteristic data verifying section 33A conducts the verification processing between the registration fingerprint characteristic data and the verification characteristic data in a verification mode corresponding to the verification mode version at the registration (step S67).

As described above, in the personal authentication system 50 according to the thirteenth embodiment, the verification mode version of the fingerprint characteristic data registered in advance at the start of a verification procedure is retrieved and communicated from the server 70 to the client 60, and the fingerprint characteristic data extracting section 31A extracts verification fingerprint characteristic data in the form conforming to that verification mode version so that the extracted verification fingerprint characteristic data is transmitted from the client 60 to the server 70. At this time, it is also possible that, if the fingerprint characteristic data extracting section 31A on the client 60 side cannot handle a verification mode version of registration fingerprint characteristic data, the client 60 side outputs display or the like describing the fact of its being incapable of handling the verification mode version.

Accordingly, with the personal authentication system 50 according to the thirteenth embodiment, in a case in which the registration fingerprint characteristic data registered in the fingerprint characteristic data registering section 32 has been extracted with an old version (in an old verification mode), since verification fingerprint characteristic data is extracted in the form conforming to that verification mode, even if the version of the verification mode is updated, the verification can be made using the registration fingerprint characteristic data of the old version, and there is no need to re-register fingerprint characteristic data.

Incidentally, in the above-described thirteenth embodiment, although in the client-server type personal authentication system 50 the client 60 makes an inquiry at the server 70 about a verification mode version and the fingerprint characteristic data extracting section 31A extracts verification fingerprint characteristic data in the form conforming to the verification mode version, it is also appropriate to use a resolution of registration fingerprint characteristic data in place of the verification mode version.

In this case, on the client 60 side, instead of the verification mode version attaching section 312, a fingerprint characteristic data resolution information attaching section (acquisition condition attaching section) is provided which attaches, to registration fingerprint characteristic data to be sent from the fingerprint characteristic data extracting section 31A of the client 60 to the server 70, a resolution (acquisition condition) for that registration fingerprint characteristic data.

In addition, the fingerprint characteristic data extracting section 31A has a function to make an inquiry at the server 70 about a resolution of registration fingerprint characteristic data on a person being a subject of verification, and is operative to, when receiving a response about the resolution from the server 70, extract verification fingerprint characteristic data from a verification fingerprint image under the same condition as that resolution.

Furthermore, on the server 70 side, a registration data resolution information retrieving section is provided in place of the registration data verification mode version retrieving section 336. This registration data resolution information retrieving section, when receiving the aforesaid inquiry about the resolution from the fingerprint characteristic data extracting section 31A on the client 60 side, searches the fingerprint characteristic data registering section 32 to retrieve the registration fingerprint characteristic data on the person forming the subject of verification, and reads out the resolution attached to that registration fingerprint characteristic data to return it to the client 60.

Figure 33:
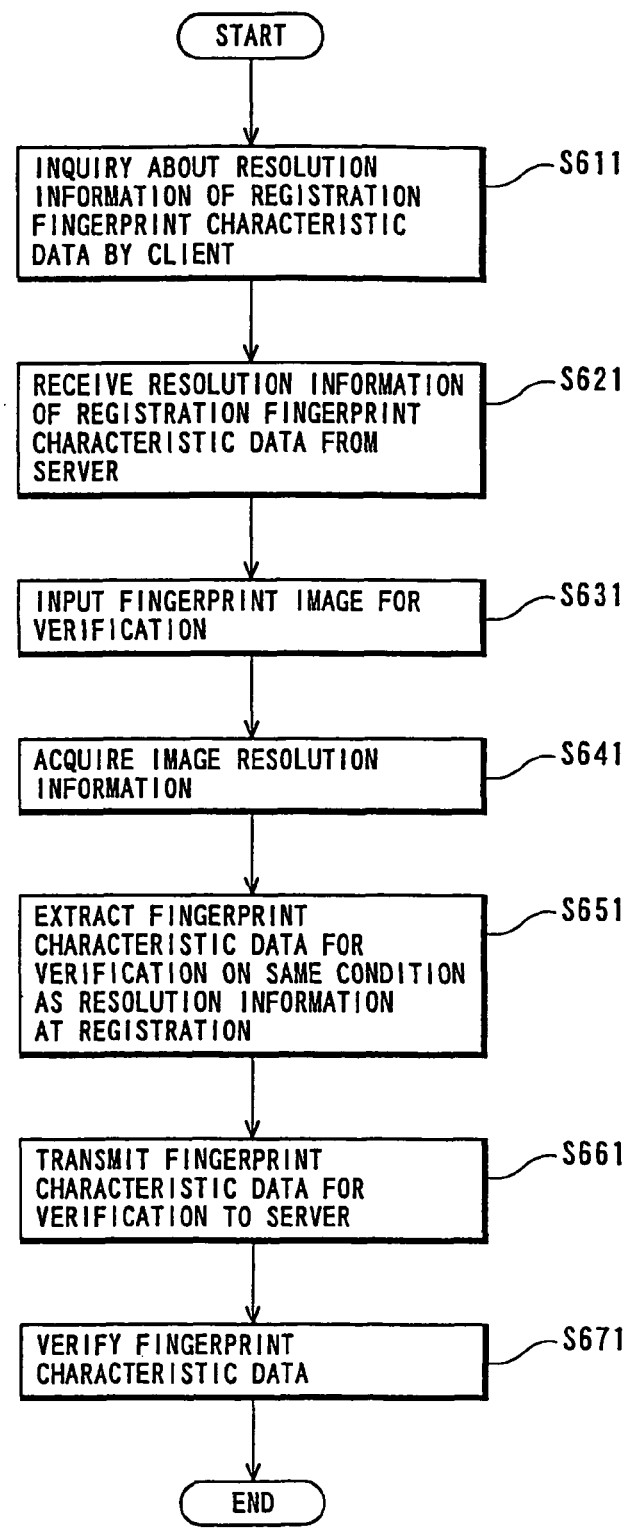
FIG. 33 is a flow chart available for describing an operation of a modification of the personal authentication system according to the thirteenth embodiment.
Figure 34:
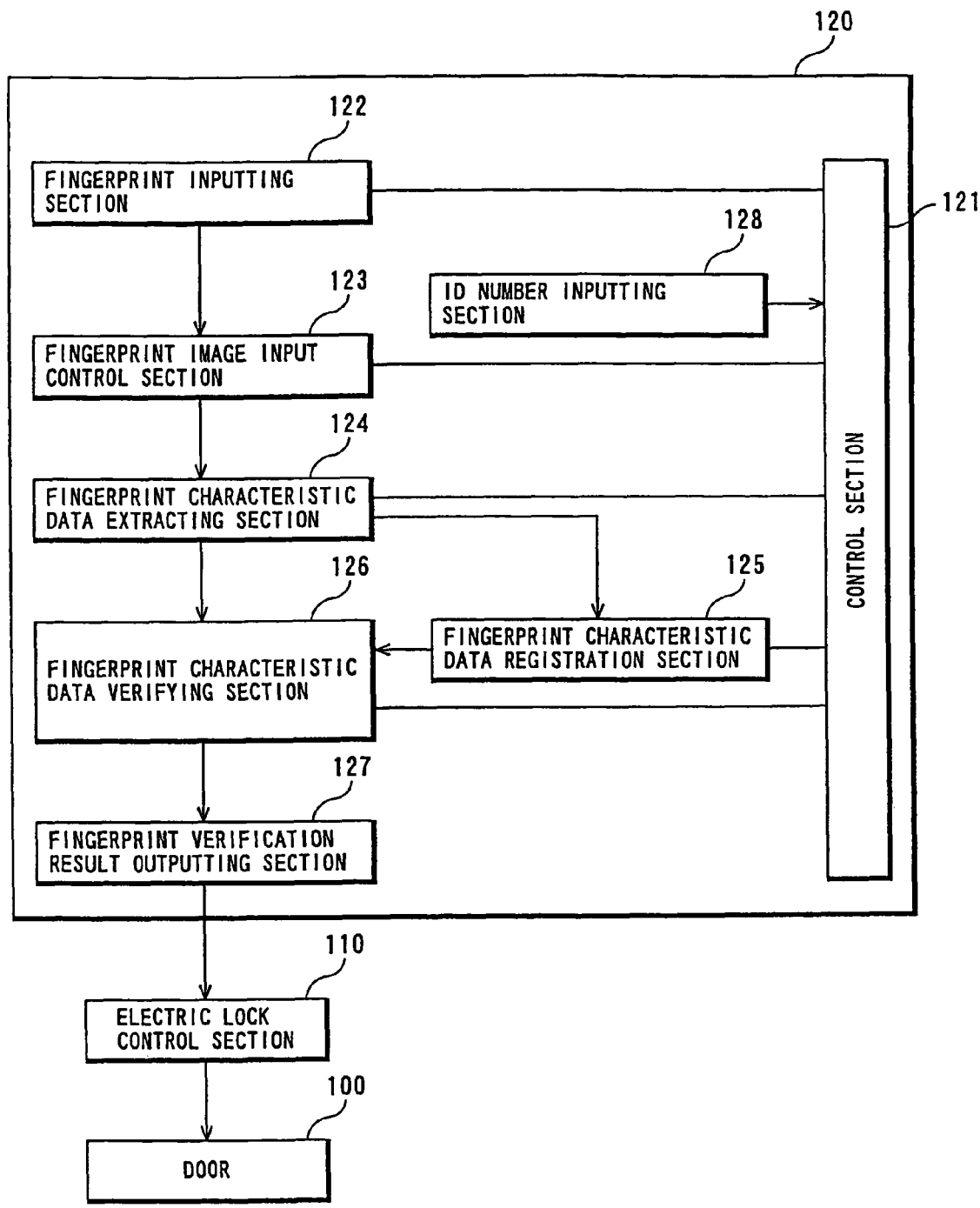
FIG. 34 is a block diagram showing a common configuration of a personal authentication system (for entrance/exit management using biometrics information.
Figure 35:
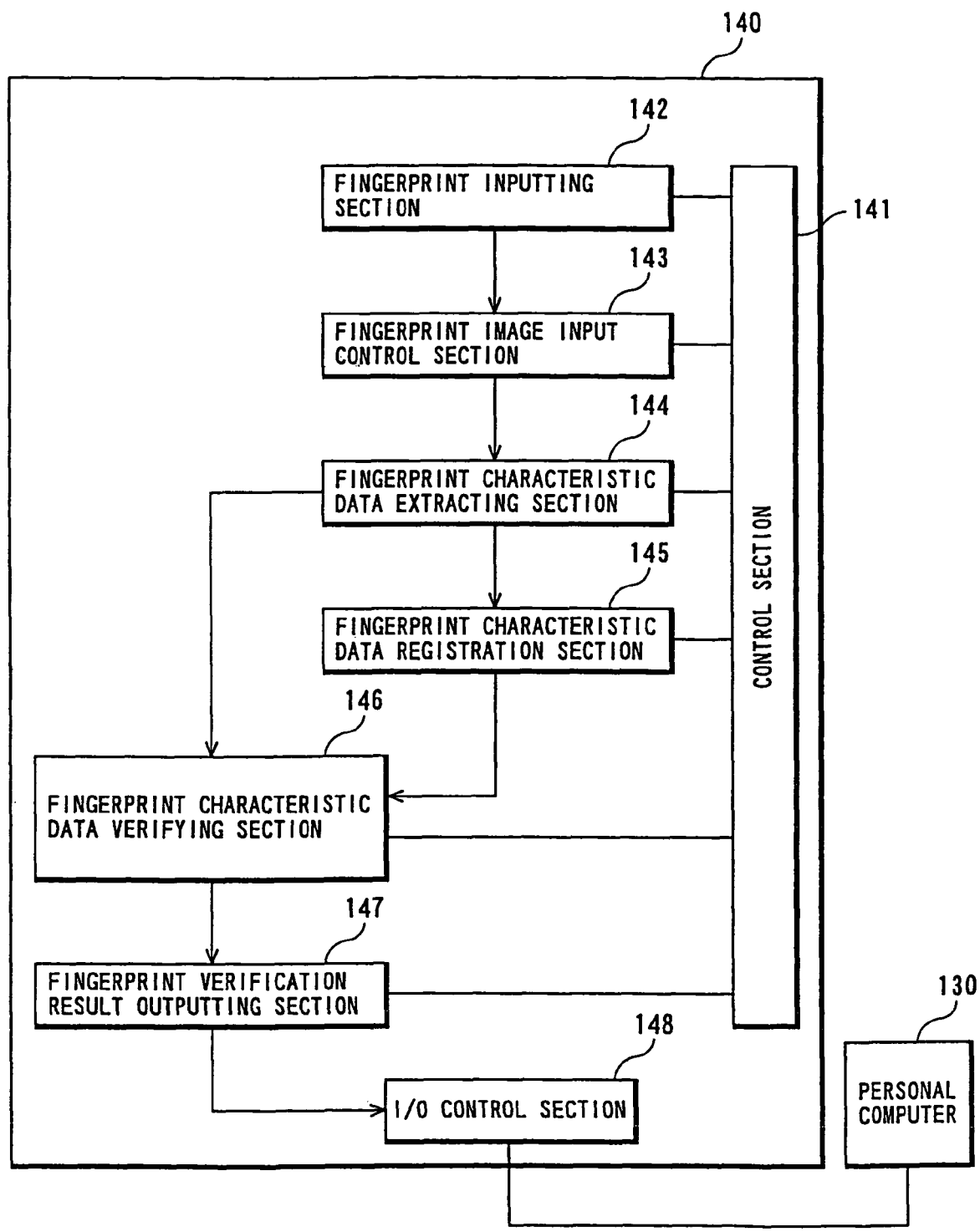
FIG. 35 is a block diagram showing a common configuration of a personal authentication system (personal computer connected type) using biometrics information.

An operation of such a modification of the personal authentication system according to the thirteenth will be described hereinbelow with reference to a flow chart of FIG. 33.

First, the fingerprint characteristic data extracting section 31A on the client 60 side makes an inquiry at the server 70 about the resolution information attached to the registration fingerprint characteristic data on a person, forming a subject of verification (step S611), while the registration data resolution information retrieving section of the fingerprint data verifying section 33A on the server 70 side, when receiving that inquiry, searches the fingerprint characteristic data registering section 32 to retrieve the registration fingerprint characteristic data on the person forming the subject of verification and reads out the resolution information attached to that registration fingerprint characteristic data for returning it to the client 60.

The fingerprint characteristic data extracting section 31A, after receiving a response about the resolution information from the server 70 (step S621), receives a verification fingerprint image (step S631) and acquires image information (step S641), thereby extracting verification fingerprint characteristic data under the same condition as the resolution information at the registration. That is, in the step S651, the fingerprint characteristic data extracting section 31A extracts the fingerprint characteristic data corresponding to that resolution, as verification fingerprint characteristic data from the verification fingerprint image (step S651), then returning it to the server 70 (step S661).

Following this, on the server 70 side, the fingerprint characteristic data verifying section 33A conducts the verification processing between the registration fingerprint characteristic data and the verification fingerprint characteristic data in a predetermined verification mode (step S671).

As described above, in the modification of the personal authentication system 50 according to the thirteenth embodiment, the resolution information of fingerprint characteristic data registered in advance at the start of the verification procedure is retrieved and communicated from the server 70 to the client 60, and the fingerprint characteristic data extracting section 31A extracts verification fingerprint characteristic data in the form conforming to that resolution information, with the extracted verification characteristic data being transmitted from the client 60 to the server 70. At this time, it is also possible that, if the fingerprint characteristic data extracting section 31A on the client 60 side cannot deal with the resolution of the registration fingerprint characteristic data, the client 60 side outputs a display or the like describing the fact of its being incapable of dealing with that resolution.

Thus, with the modification of the personal authentication system 50 according to the thirteenth embodiment, in the case in which the registration fingerprint characteristic data registered in the fingerprint characteristic data registering section 32 has been extracted on the basis of an old resolution, the verification fingerprint characteristic data is extracted in the form conforming to that old resolution, and even if a change of resolution in the fingerprint inputting section 22 takes place with update of version, the verification can be made using the registration fingerprint characteristic data of the old resolution, which eliminates the need for the re-registration of fingerprint characteristic data.

Incidentally, in the personal authentication system 50 according to the thirteenth embodiment, although the fingerprint characteristic data verifying section 33A is provided on the server 70 side, it is also appropriate that this fingerprint characteristic data verifying section 33A is provided on the client 60 side to conduct the verification processing on the client 60 side. In this case, the server 70 is designed to perform only the preservation of the registration fingerprint characteristic data.

[14] Effects of Embodiments of the Invention

The above-described personal authentication systems according to the embodiments can offer the following effects and advantages.

(1) It is possible to eliminate the need for the re-registration work of fingerprint information by a user, which has been done in conjunction with a change of fingerprint scanner (biometrics information inputting device), a change of fingerprint image acquisition mode (resolution, image aspect, gradation, relationship in brightness between ridge lines and trough lines, and others) or a change of fingerprint characteristic data to be used at verification. Accordingly, update of system version becomes easy, and a chance of a dishonest act such as registration by impersonation of another person, which can improve significantly the system security ability (safety).

(2) It is possible to use fingerprint scanners according to different acquisition modes in the same system, which considerably facilitates the system extension.

(3) Since a change of type of fingerprint scanner becomes easy, the employment of a new low-cost fingerprint scanner becomes easy in expansion, which lowers the system cost.

(4) It is possible to eliminate the need for re-registration of fingerprints involved in update of version of fingerprint characteristic data verification mode, which cuts the maintenance cost.

(5) Since the re-registration work becomes unnecessary and the update of version of verification mode is facilitated, the replacement with the newest verification mode becomes easy so that the user side can obtain the latest authentication function at all times.

[15] Others

It should be understood that the present invention is not limited to the above-described embodiment, and that it is intended to cover all changes and modifications of the embodiments of the invention herein which do not constitute departures from the spirit and scope of the invention.

What is claimed is:

1. A personal authentication system using biometrics information, which identifies or authenticates an individual using biometrics information by verifying to-be-verified biometrics characteristic data obtained from to-be-verified biometrics information acquired at the time of the identification or authentication against previously registered biometrics characteristic data previously extracted from to-be-registered biometrics information acquired at a time of user registration, comprising:

a biometrics information inputting section having a function to acquire the to-be-verified biometrics information;

a biometrics characteristic data extracting section for extracting to-be-verified biometrics characteristic data from the to-be-verified biometrics information acquired through said biometrics information inputting section;

an acquisition condition attaching section for attaching, to said to-be-verified biometrics information to be inputted from said biometrics information inputting section to said biometrics characteristic data extracting section, an acquisition condition related to a specification of said biometrics data inputting section, which has acquired said to-be-verified biometrics information; and a biometrics information converting section for converting, before the extraction of said to-be-verified biometrics characteristic data from said to-be-verified biometrics information in said biometrics characteristic data extracting section when a specification of the biometrics information inputting section is changed due to version-up of the personal authentication system after registering of the registered biometrics characteristics data, said to-be-verified biometrics information into a state to be acquired on a predetermined acquisition condition related to a specification of another biometrics data inputting section, which previously acquired the registered biometrics information, in accordance with said acquisition condition attached to said to-be-verified biometrics information, wherein before the converting by the converting section, the biometrics information inputting section acquires the to-be-verified biometrics information in a state according to another predetermined acquisition condition that is different than the predetermined acquisition condition under which the registered biometrics information was previously acquired, and where after being converted the state of the acquired to-be-verified biometrics information is a same state as the previously registered biometrics characteristics data, wherein said biometrics information inputting section is of a type acquiring fingerprint information as said to-be-verified biometrics information in the form of image data, and said acquisition condition attaching section attaches, to said fingerprint information as said acquisition condition, a relationship in brightness between ridge lines and trough lines in said fingerprint information, and said biometrics information converting section converts said fingerprint information into image data with a predetermined brightness relationship, on the basis of said brightness relationship attached to said fingerprint information.

* * * * *

UNITED STATES PATENT AND TRADEMARK OFFICE
CERTIFICATE OF CORRECTION

| | | |
|---|---|---|
| PATENT NO. | : 7,974,448 B2 | Page 1 of 1 |
| APPLICATION NO. | : 11/336927 | |
| DATED | : July 5, 2011 | |
| INVENTOR(S) | : Takashi Shinzaki et al. | |

It is certified that error appears in the above-identified patent and that said Letters Patent is hereby corrected as shown below:

First Page Column 1 (Assignee), Line 1, Delete "Limted," and insert -- Limited, --, therefor.

Signed and Sealed this
Thirteenth Day of September, 2011

David J. Kappos
*Director of the United States Patent and Trademark Office*